(12) United States Patent
Park et al.

(10) Patent No.: US 10,712,889 B2
(45) Date of Patent: Jul. 14, 2020

(54) DISPLAY APPARATUS

(71) Applicant: Samsung Display Co., Ltd., Yongin-si, Gyeonggi-do (KR)

(72) Inventors: Yong-hwan Park, Cheonan-si (KR); Seongjun Lee, Seoul (KR); Sunghyun Park, Seongnam-si (KR); Changyong Jung, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/224,585

(22) Filed: Dec. 18, 2018

(65) Prior Publication Data

US 2019/0146611 A1 May 16, 2019

Related U.S. Application Data

(63) Continuation of application No. 15/658,178, filed on Jul. 24, 2017.

(51) Int. Cl.
*G06F 3/044* (2006.01)
*G06F 3/041* (2006.01)
*G02F 1/1333* (2006.01)

(52) U.S. Cl.
CPC ............ *G06F 3/044* (2013.01); *G06F 3/0412* (2013.01); *G06F 3/0416* (2013.01);
(Continued)

(58) Field of Classification Search
CPC ........ G06F 3/0412; G06F 3/044; G06F 3/047; G06F 3/0416; G06F 2203/04102; G06F 2203/04112; G06F 2203/04111
See application file for complete search history.

(56) References Cited

U.S. PATENT DOCUMENTS 9,041,869 B2 5/2015 Kim et al.
9,519,174 B2 12/2016 Kim et al.
(Continued)

FOREIGN PATENT DOCUMENTS

CN 102004572 A 4/2011
CN 102402052 A 4/2012
(Continued)

OTHER PUBLICATIONS

European Examination Report dated Feb. 14, 2019 issued by the EPO for European Patent Application No. 17 182 547.4, 5 pages.
(Continued)

*Primary Examiner* — Dennis P Joseph
(74) *Attorney, Agent, or Firm* — Lewis Roca Rothgerber Christie LLP

(57) ABSTRACT

A display apparatus includes a display panel and a touch sensing unit on the display panel. The touch sensing unit includes a plurality of first touch sensing parts arranged with each other along a first direction and having a mesh shape, a first connection part configured to connect adjacent ones of the first touch sensing parts to each other along the first direction, a plurality of second touch sensing parts arranged with each other along a second direction crossing the first direction and having the mesh shape, and a second connection part configured to connect adjacent ones of the second touch sensing parts to each other along the second direction. An insulation layer is located between the first connection part and the second connection part, and the first connection part extends to cross the adjacent ones of the second touch sensing parts.

30 Claims, 37 Drawing Sheets

(52) U.S. Cl.
CPC .................. *G02F 1/13338* (2013.01); *G06F 2203/04102* (2013.01); *G06F 2203/04111* (2013.01); *G06F 2203/04112* (2013.01)

(56) References Cited

U.S. PATENT DOCUMENTS

| | | | |
|---|---|---|---|
| 10,025,436 | B2 | 7/2018 | Kim et al. |
| 2012/0033168 | A1 | 2/2012 | Hwang et al. |
| 2012/0081300 | A1 | 4/2012 | Chan et al. |
| 2012/0234663 | A1 | 9/2012 | Hwang et al. |
| 2012/0262412 | A1 | 10/2012 | Guard et al. |
| 2014/0098305 | A1 | 4/2014 | Mo et al. |
| 2014/0111709 | A1 | 4/2014 | Kim et al. |
| 2014/0160372 | A1* | 6/2014 | Li .................... G06F 3/044 349/12 |
| 2014/0198267 | A1 | 7/2014 | Jeong et al. |
| 2015/0169116 | A1 | 6/2015 | Masuda |
| 2015/0301632 | A1 | 10/2015 | Hirata |
| 2015/0346866 | A1 | 12/2015 | Kusunoki et al. |
| 2016/0109741 | A1 | 4/2016 | Lee et al. |
| 2016/0370945 | A1 | 12/2016 | Qu |

FOREIGN PATENT DOCUMENTS

| | | |
|---|---|---|
| CN | 102768443 A | 11/2012 |
| CN | 103677399 A | 3/2014 |
| CN | 103777810 A | 5/2014 |
| CN | 103870047 A | 6/2014 |
| EP | 2410411 A1 | 1/2012 |
| EP | 2 447 816 A2 | 5/2012 |
| EP | 2725463 A2 | 4/2014 |
| KR | 1020120084206 | 7/2012 |
| KR | 1020150006228 | 1/2015 |
| KR | 1020150124907 | 11/2015 |
| KR | 10-2015-0138030 A | 12/2015 |
| KR | 1020160072336 | 6/2016 |
| TW | 201546695 A | 12/2015 |
| TW | 201610794 A | 3/2016 |
| TW | 201616308 A | 5/2016 |

OTHER PUBLICATIONS

European Patent Office Action for corresponding European Patent Application No. 17 182 547.4, dated Sep. 12, 2019, 5 pages.
U.S. Final Office Action dated Sep. 12, 2019, issued in U.S. Appl. No. 15/658,178 (17 pages).
EPO Extended Search Report dated Dec. 1, 2017, for corresponding European Patent Application No. 17182547.4, 18 pages.

* cited by examiner

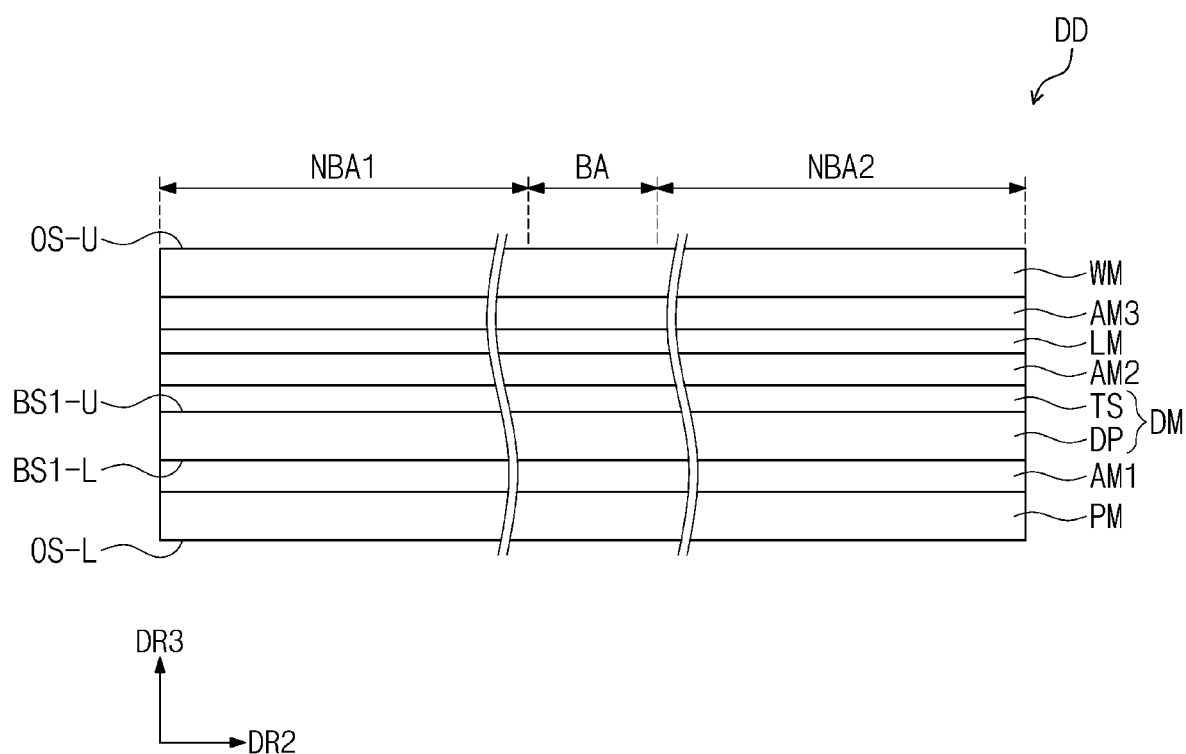

FIG. 4A
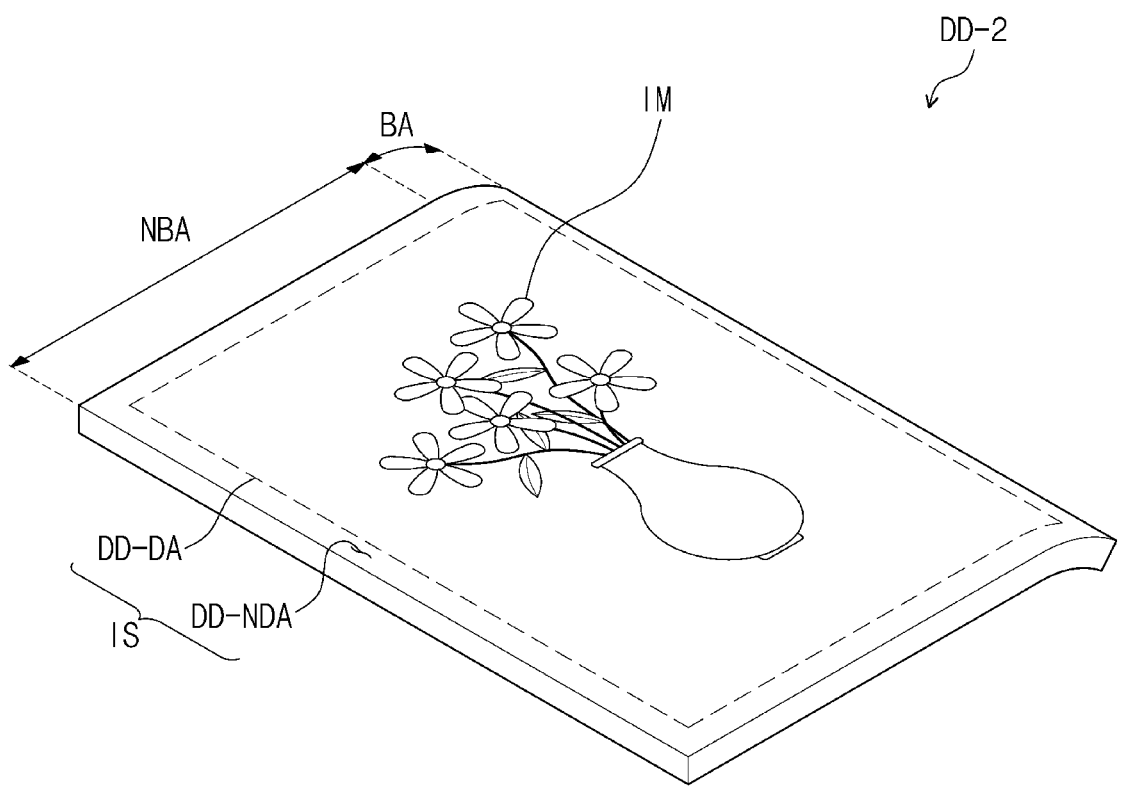
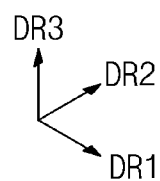

DISPLAY APPARATUS

CROSS-REFERENCE TO RELATED APPLICATION

This patent application is a continuation of U.S. patent application Ser. No. 15/658,178, filed Jul. 24, 2017, which claims priority to and the benefit of Korean Patent Application No. 10-2016-0097488, filed on Jul. 29, 2016, the entire content of which is hereby incorporated by reference.

BACKGROUND

1. Field

Embodiments of the present disclosure relate to a display apparatus.

2. Description of the Related Art

Electronic equipment for providing an image to a user (such as smartphones, digital cameras, laptop computers, navigation units, and smart televisions), includes a display apparatus for displaying an image. The display apparatus may include a display panel that generates and displays an image and an input device, such as a keyboard, a mouse, or a touch panel.

The touch panel is disposed above the display panel to generate an input signal when a user touches the touch panel. The input signal generated in the touch panel is provided to the display panel, and the display panel provides an image corresponding to the input signal in response to the input signal received from the touch panel.

In recent years, display apparatuses having various shapes have been developed with an advance in related technologies. For example, a flexible display apparatus that is deformed in a curved shape or is foldable or rollable is being developed. Also, a method for improving reliability of the touch panel used in the flexible display apparatus is desired.

SUMMARY

Aspects of embodiments of the present disclosure are directed toward a display apparatus having improved reliability.

According to an embodiment of the inventive concept, a display apparatus includes a display panel and a touch sensing unit on the display panel. The touch sensing unit includes a plurality of first touch sensing parts arranged with each other along a first direction and having a mesh shape, a first connection part configured to connect adjacent ones of the first touch sensing parts to each other along the first direction, a plurality of second touch sensing parts arranged with each other along a second direction crossing the first direction and having the mesh shape, and a second connection part configured to connect adjacent ones of the second touch sensing parts to each other along the second direction. An insulation layer is located between the first connection part and the second connection part, in some areas of the adjacent ones of the second touch sensing parts, and the first connection part extends parallel to a part of mesh lines of the adjacent ones of the second touch sensing parts and to cross another part of the mesh lines of the adjacent ones of the second touch sensing parts.

In an embodiment, the first connection part may not overlap the second connection part.

In an embodiment, the insulation layer may be on the first connection part, and the plurality of first touch sensing parts, the plurality of second touch sensing parts, and the second connection part may be on the insulation layer.

In an embodiment, the adjacent ones of the second touch sensing parts may include a third sub-touch sensing part, and a fourth sub-touch sensing part, the first connection part may include a first extension part crossing the third sub-touch sensing part to connect the adjacent ones of the first touch sensing parts to each other, and a second extension part having a structure that is substantially symmetrical to the first extension part and crossing the fourth sub-touch sensing part to connect the adjacent ones of the first touch sensing parts to each other. The second connection part may be located between the first extension part and the second extension part.

In an embodiment, the adjacent ones of the first touch sensing parts may include a first sub-touch sensing part, and a second sub-touch sensing part with the first sub-touch sensing part on a plane that is parallel to the first and second directions.

In an embodiment, the second connection part may have a mesh structure and may connect the third sub-touch sensing part to the fourth sub-touch sensing part.

In an embodiment, an area of the first extension part near a first end of the first extension part may be connected to the first sub-touch sensing part, an area of the first extension part near a second end opposite to the first end of the first extension part may be connected to the second sub-touch sensing part, and the first extension part may extend to cross the third sub-touch sensing part.

In an embodiment, an area of the second extension part near a first end of the second extension part may be connected to the first sub-touch sensing part, an area of the second extension part near a second end opposite to the first end of the second extension part may be connected to the second sub-touch sensing part, and the second extension part may extend to cross the fourth sub-touch sensing part.

In an embodiment, each of the first and second sub-touch sensing parts may include a plurality of first branch parts extending in a first diagonal direction crossing the first and second directions on the plane, and a plurality of second branch parts extending in a second diagonal direction crossing the first diagonal direction on the plane to cross the first branch parts, the second branch parts being connected to the first branch parts, and each of the third and fourth sub-touch sensing parts may include a plurality of third branch parts extending in the first diagonal direction, and a plurality of fourth branch parts extending in the second diagonal direction to cross the third branch parts, the fourth branch parts being connected to the third branch parts.

In an embodiment, the first extension part may include a first sub-extension part extending in the first diagonal direction, a second sub-extension part extending in the first diagonal direction, the second sub-extension part having a length that is less than a length of the first sub-extension part, a third sub-extension part extending in the second diagonal direction, a fourth sub-extension part extending in the second diagonal direction, the fourth sub-extension part having a length that is less than a length of the third sub-extension part, a first sub-connection part extending in the second diagonal direction, and a second sub-connection part extending in the first diagonal direction. An area of the first sub-extension part near a first end of the first sub-extension part and an area of the second sub-extension part near a first end of the second sub-extension part may be connected to the first sub-touch sensing part, an area of the third sub-extension part near a first end of the third sub-extension part and an area of the fourth sub-extension part near a first end of the fourth sub-extension part may be connected to the second sub-touch sensing part, a second end of the first sub-extension part opposite to the first end of the first sub-extension part may be connected to a second end of the third sub-extension part opposite to the first end of the third sub-extension part, a second end of the second sub-extension part opposite to the first end of the second sub-extension part may be connected to a second end of the fourth sub-extension part opposite to the first end of the fourth sub-extension part, the first sub-connection part may extend from the second end of the fourth sub-extension part in the second diagonal direction and may be connected to the first sub-extension part, and the second sub-connection part may extend from the second end of the second sub-extension part in the first diagonal direction and may be connected to the third sub-extension part.

In an embodiment, the first to fourth sub-extension parts and the first and second sub-connection parts may be integrated with each other.

In an embodiment, the first and second sub-extension parts may extend to cross ones of the fourth branch parts from among the plurality of fourth branch parts of the third sub-touch sensing part, and the third and fourth sub-extension parts may extend to cross ones of the third branch parts from among the plurality of third branch parts of the third sub-touch sensing part.

In an embodiment, the third branch parts of the third sub-touch sensing part may not overlap the first and second sub-extension parts and the second sub-connection part, the fourth branch parts of the third sub-touch sensing part may not overlap the third and fourth sub-extension parts and the first sub-connection part, and the fourth sub-touch sensing part may have a structure that is substantially symmetrical to a structure of the third sub-touch sensing part.

In an embodiment, the second extension part may include a fifth sub-extension part, a sixth sub-extension part, a seventh sub-extension part, an eighth sub-extension part, a third sub-connection part, and a fourth sub-connection part, which respectively have structures that are respectively symmetrical to the first sub-extension part, the second sub-extension part, the third sub-extension part, the fourth sub-extension part, the first sub-connection part, and the second sub-connection part.

In an embodiment, an area of each of the first to eighth sub-extension parts near respective first ends of the first to eighth sub-extension parts may be respectively connected to one of the first sub-touch sensing part or the second sub-touch sensing part through a plurality of contact holes defined in the insulation layer.

In an embodiment, an area of each of the first to eighth sub-extension parts near respective first ends of the first to eighth sub-extension parts may be respectively connected to one of the first sub-touch sensing part or the second sub-touch sensing part through one contact hole defined in the insulation layer.

In an embodiment, the first end of the first sub-extension part may be connected to a first end of the fifth sub-extension part, the first end of the second sub-extension part may be connected to a first end of the sixth sub-extension part, the first end of the third sub-extension part may be connected to a first end of the seventh sub-extension part, and the first end of the fourth sub-extension part may be connected to a first end of the eighth sub-extension part. The first ends of the first and fifth sub-extension parts may share one contact hole defined in the insulation layer and may be connected to the first sub-touch sensing part, the first ends of the second and sixth sub-extension parts may share one contact hole defined in the insulation layer and may be connected to the first sub-touch sensing part, the first ends of the third and seventh sub-extension parts may share one contact hole defined in the insulation layer and may be connected to the second sub-touch sensing part, and the first ends of the fourth and eighth sub-extension parts may share one contact hole defined in the insulation layer and may be connected to the second sub-touch sensing part.

In an embodiment, the area of the first sub-extension part near the first end of the first sub-extension part, the area of the second sub-extension part near the first end of the second sub-extension part, an area of the fifth sub-extension part near the first end of the fifth sub-extension part, and an area of the sixth sub-extension part near the first end of the sixth sub-extension part may be connected to the first sub-touch sensing part through a plurality of contact holes defined in the insulation layer, and the area of the third sub-extension part near the first end of the third sub-extension part, the area of the fourth sub-extension part near the first end of the fourth sub-extension part, an area of the seventh sub-extension part near the first end of the seventh sub-extension part, and an area of the eighth sub-extension part near the first end of the eighth sub-extension part may be connected to the second sub-touch sensing part through a plurality of contact holes defined in the insulation layer.

In an embodiment, the display panel may include a non-bent area and a bent area that is adjacent to the non-bent area, the first connection part may be located in the first bent area and may include a plurality of protrusions, which respectively protrude from a connection portion between the first sub-extension part and the third sub-extension part in each of the first and second diagonal directions, from the first sub-connection part in the second diagonal direction to protrude further outwardly than the first sub-extension part, and from the second sub-connection part in the first diagonal direction to protrude further outwardly than the third sub-extension part, and the protrusions may overlap adjacent third and fourth branch parts.

In an embodiment, the first extension part may include a first sub-extension part extending in a first diagonal direction crossing the first and second directions on the plane, and a second sub-extension part extending in a second diagonal direction crossing the first diagonal direction on the plane. The second extension part may include a third sub-extension part and a fourth sub-extension part, each of which has a structure substantially symmetrical to a structure of the first sub-extension part and the second sub-extension part, respectively. An area of the first sub-extension part near a first end of the first sub-extension part and an area of the third sub-extension part near a first end of the third sub-extension part may be connected to the first sub-touch sensing part, an area of the second sub-extension part near a first end of the second sub-extension part and an area of the fourth sub-extension part near a first end of the fourth sub-extension part may be connected to the second sub-touch sensing part, a second end of the first sub-extension part opposite to the first end of the first sub-extension part may be connected to a second end of the second sub-extension part opposite to the first end of the second sub-extension part, and a second end of the third sub-extension part opposite to the first end of the third sub-extension part may be connected to a second end of the fourth sub-extension part opposite to the first end of the fourth sub-extension part.

In an embodiment, the areas of each of the first to fourth sub-extension parts may be respectively connected to one of the first sub-touch sensing part or the second sub-touch sensing part through one contact hole defined in the insulation layer.

In an embodiment, the areas of each of the first to fourth sub-extension parts may be respectively connected to one of the first sub-touch sensing part or the second sub-touch sensing part through a plurality of contact holes defined in the insulation layer.

In an embodiment, the first end of the first sub-extension part may be connected to the first end of the third sub-extension part, the first end of the second sub-extension part may be connected to the first end of the fourth sub-extension part, the first ends of the first and third sub-extension parts may share one contact hole defined in the insulation layer and are connected to the first sub-touch sensing part, and the first ends of the second and fourth sub-extension parts may share one contact hole defined in the insulation layer and are connected to the second sub-touch sensing part.

In an embodiment, the area of the first sub-extension part and the area of the third sub-extension part may be connected to the first sub-touch sensing part through a plurality of contact holes defined in the insulation layer, and the area of the second sub-extension part and the area of the fourth sub-extension part may be connected to the second sub-touch sensing part through a plurality of contact holes defined in the insulation layer.

In an embodiment, the first extension part may include a first sub-extension part extending in a first diagonal direction crossing the first and second directions on the plane, a second sub-extension part having a length that is less than a length of the first sub-extension part and extending in the first diagonal direction, a third sub-extension part extending in a second diagonal direction crossing the first diagonal direction on the plane, a fourth sub-extension part having a length that is less than a length of the third sub-extension part and extending in the second diagonal direction. The second extension part may include fifth, sixth, seventh, and eighth sub-extension parts, which respectively have structures that are substantially symmetrical to the first, second, third, and fourth sub-extension parts. An area of each of the first, second, fifth, and sixth sub-extension parts near respective first ends of each of the first, second, fifth, and sixth sub-extension parts may be respectively connected to the first sub-touch sensing part, an area of each of the third, fourth, seventh, and eighth sub-extension parts near respective first ends of each of the third, fourth, seventh, and eighth sub-extension parts may be respectively connected to the second sub-touch sensing part, and a second end of the first sub-extension part opposite to the first end of the first sub-extension part may be connected to a second end of the third sub-extension part opposite to the first end of the third sub-extension part, a second end of the second sub-extension part opposite to the first end of the second sub-extension part may be connected to a second end of fourth sub-extension part opposite to the first end of the fourth sub-extension part, a second end of the fifth sub-extension part opposite to the first end of the fifth sub-extension part may be connected to a second end of the seventh sub-extension part opposite to the first end of the seventh sub-extension part, and a second end of the sixth sub-extension part opposite to the first end of the sixth sub-extension part may be connected to a second end of the eighth sub-extension part opposite to the first end of the eighth sub-extension part.

In an embodiment, the areas of each of the first to eighth sub-extension parts may be respectively connected to one of the first sub-touch sensing part or the second sub-touch sensing part through one contact hole defined in the insulation layer.

In an embodiment, the areas of each of the first to eighth sub-extension parts may be respectively connected to one of the first sub-touch sensing part or the second sub-touch sensing part through a plurality of contact holes defined in the insulation layer.

In an embodiment, the first end of the first sub-extension part may be connected to the first end of the fifth sub-extension part, the first end of the second sub-extension part may be connected to the first end of the sixth sub-extension part, the first end of the third sub-extension part may be connected to the first end of the seventh sub-extension part, and the first end of the fourth sub-extension part may be connected to the first end of the eighth sub-extension part, the first ends of the first and fifth sub-extension parts may share one contact hole defined in the insulation layer and are connected to the first sub-touch sensing part, and the first ends of the second and sixth sub-extension parts may share one contact hole defined in the insulation layer and are connected to the first sub-touch sensing part, and the first ends of the third and seventh sub-extension parts may share one contact hole defined in the insulation layer and may be connected to the second sub-touch sensing part, and the first ends of the fourth and eighth sub-extension parts may share one contact hole defined in the insulation layer and may be connected to the second sub-touch sensing part.

In an embodiment, the area of the first sub-extension part, the area of the second sub-extension part, the area of the fifth sub-extension part and the area of the sixth sub-extension part, may be respectively connected to the first sub-touch sensing part through a plurality of contact holes defined in the insulation layer, and the area of the third sub-extension part, the area of the fourth sub-extension part, the area of the seventh sub-extension part, and the area of the eighth sub-extension part may be respectively connected to the second sub-touch sensing part through a plurality of control holes defined in the insulation layer.

In an embodiment, the display panel may include a plurality of pixel areas each of the pixel areas having a parallelogram shape, and a non-pixel area between the pixel areas. The pixel areas may have sizes that are different from each other according to colors to be displayed, and the first and second touch sensing parts having the mesh shape may overlap the non-pixel area.

BRIEF DESCRIPTION OF THE DRAWINGS

The accompanying drawings are included to provide a further understanding of embodiments of the inventive concept, and are incorporated in and constitute a part of this specification. The drawings illustrate exemplary embodiments of the inventive concept and, together with the description, serve to explain principles of the inventive concept. In the drawings:

FIG. 2 is a cross-sectional view of the display apparatus of FIG. 1A;

FIG. 4A is a perspective view of a display apparatus according to an embodiment of the inventive concept;

DETAILED DESCRIPTION

Figure 1A:
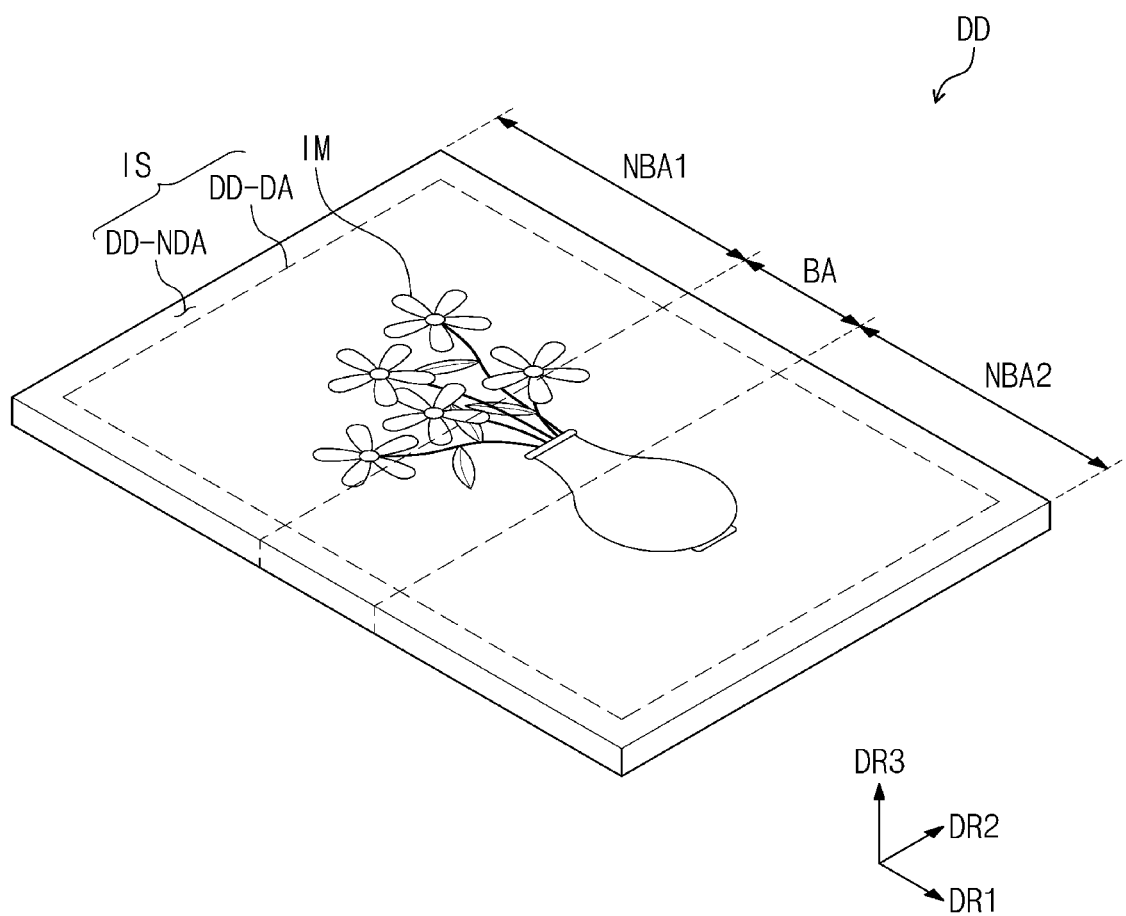
FIG. 1A is a perspective view illustrating a first operation of a display apparatus according to an embodiment of the inventive concept.

Aspects and features of the inventive concept, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the inventive concept to those skilled in the art. Accordingly, processes, elements, and techniques that are not necessary to those having ordinary skill in the art for a complete understanding of the aspects and features of the present disclosure may not be described. Further, the present disclosure is only defined by the scope of the appended claims and their equivalents. Like reference numerals refer to like elements throughout.

It will also be understood that when a layer is referred to as being "on," "connected to," or "coupled to" another element or layer, it can be directly on, connected to, or coupled to the other element or layer, or one or more intervening elements or layers may be present. In contrast, when an element is referred to as being "directly on" another element or layer, there are no intervening elements or layers present. In addition, it will also be understood that when an element or layer is referred to as being "between" two elements or layers, it can be the only element or layer between the two elements or layers, or one or more intervening elements or layers may also be present. As used herein, the term "and/or" includes any and all combinations of one or more of the associated listed items.

Spatially relative terms, such as "lower", "above", "upper," "left," "right," and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that although terms such as "first," "second," etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Accordingly, a first element, a first component, a first region, a first layer, or a first section could be termed a second element, a second component, a second region, a second layer, or a second section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." In addition, the use of alternative language, such as "or," when describing embodiments of the present disclosure, refers to "one or more embodiments of the present disclosure" for each corresponding item listed. As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The embodiments in the detailed description may be described with schematic cross-sectional views and/or plan views as exemplary views of the inventive concept. Accordingly, shapes of the exemplary views may be modified according to manufacturing techniques and/or allowable errors. Therefore, the embodiments of the inventive concept are not limited to the specific shape illustrated in the exemplary views, but may include other shapes that may be created according to manufacturing processes. Areas exemplified in the drawings have general properties, and are used to illustrate a specific shape of a semiconductor package region. Thus, this should not be construed as limiting the scope of the inventive concept.

Hereinafter, exemplary embodiments of the inventive concept are described below in more detail with reference to the accompanying drawings.

Figure 1B:
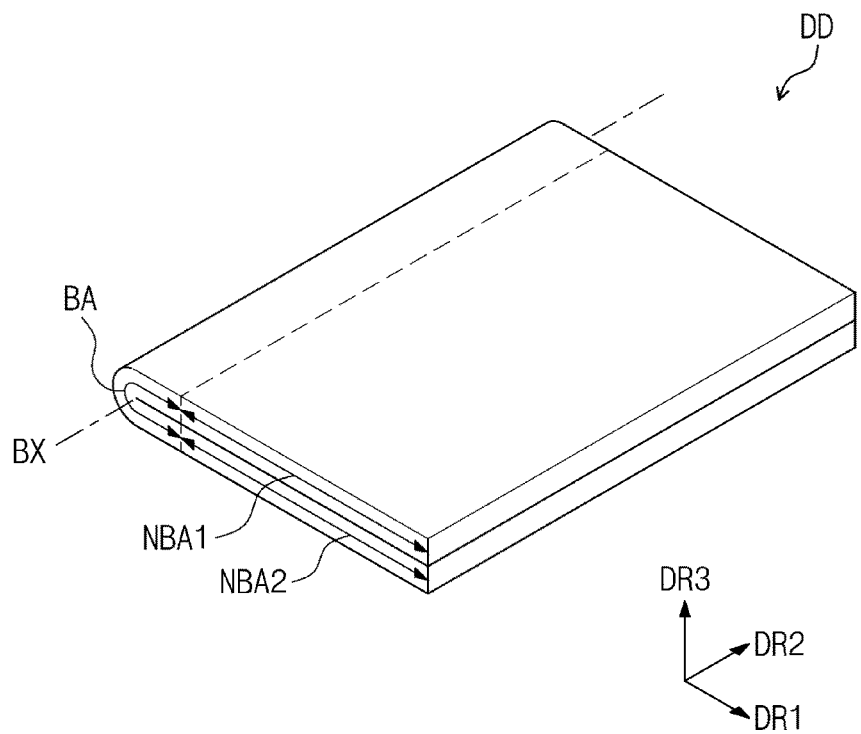
FIG. 1B is a perspective view illustrating a second operation of the display apparatus of FIG. 1A.
Figure 1C:
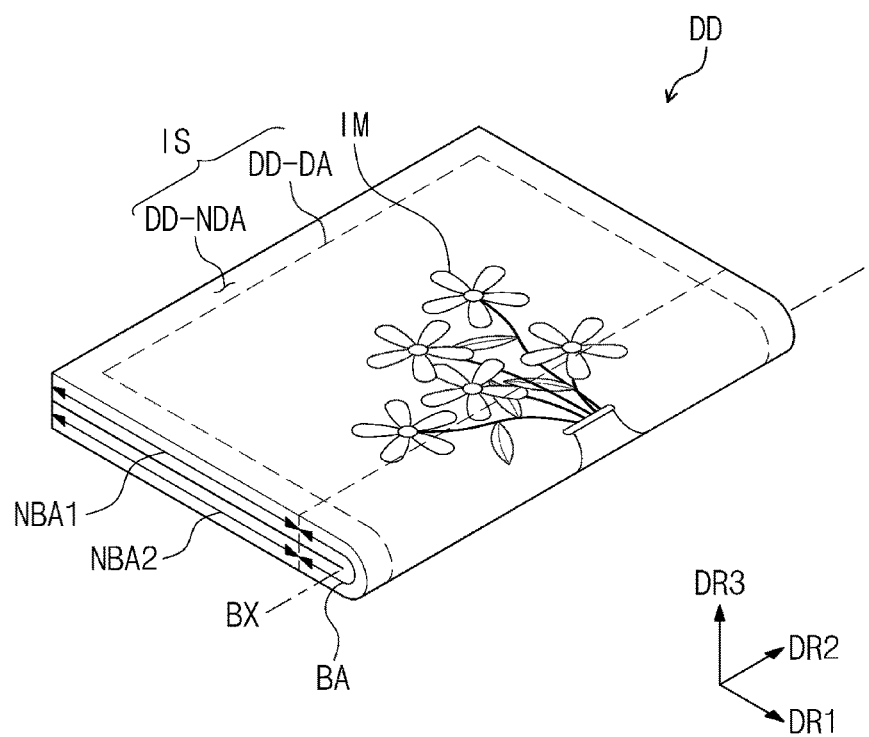
FIG. 1C is a perspective view illustrating a third operation of the display apparatus of FIG. 1A.

FIG. 1A is a perspective view illustrating a first operation of a display apparatus DD according to an embodiment of the inventive concept. FIG. 1B is a perspective view illustrating a second operation of the display apparatus DD of FIG. 1A. FIG. 1C is a perspective view illustrating a third operation of the display apparatus DD of FIG. 1A.

Referring to FIGS. 1A-1C, the display apparatus DD that is capable of being applied to a smartphone is illustrated as an embodiment of the inventive concept. However, embodiments of the inventive concept are not limited thereto. For example, the display apparatus DD according to an embodiment of the inventive concept may be applied to any suitable electronic devices such as, for example, televisions, personal computers, laptop computers, navigation units for vehicles, game consoles, acoustic electronic devices, smart watches, and cameras. The above-described devices are merely exemplary embodiments, and thus, the display apparatus DD may be adopted for (or applied to) other electronic devices without departing from the spirit and scope of the invention.

Referring to FIGS. 1A-1C, in a first operation mode as illustrated in FIG. 1A, a display surface IS on which an image IM is displayed may be parallel to a surface that is defined by a first directional axis DR1 and a second directional axis DR2 crossing the first directional axis DR1. A normal direction of the display surface IS, e.g., a thickness direction of the display apparatus DD, is referred to herein as a third directional axis DR3. A front surface (or first surface or top surface) and a rear surface (or second surface or bottom surface) of components of the display apparatus DD are distinguished by the third directional axis DR3. However, directions indicated as the first to third directional axes DR1, DR2, and DR3 may be a relative concept and thus may be changed into different directions. Hereinafter, the first to third directions may be directions indicated by the first to third directional axes DR1, DR2, and DR3 and designated by the same reference numerals, respectively.

FIGS. 1A-1C illustrate a foldable display apparatus as an example of the flexible display apparatus DD. Alternatively, the display apparatus DD may be a rollable or bendable display apparatus, but embodiments of the inventive concept are not limited thereto. The display apparatus DD according to the present embodiment may be a flat rigid display apparatus, for example.

As illustrated in FIG. 1A, the display surface IS of the flexible display apparatus DD may include a plurality of areas. The flexible display apparatus DD may include a display area DD-DA on which the image IM is displayed (e.g., a display area DD-DA that is configured to display the image IM) and a non-display area DD-NDA that is adjacent to the display area DD-DA. The non-display area DD-NDA may be an area on which an image is not displayed (e.g., the non-display area DD-NDA may be an area that is not configured to display the image IM). FIG. 1A illustrates a flower vase as an example of the image IM. For example, the display area DD-DA may have a rectangular shape. The non-display area DD-NDA may surround the display area DD-DA (e.g., may surround the display area DD-DA along the first and second directional axes DR1 and DR2). However, embodiments of the inventive concept are not limited thereto. For example, the display area DD-DA and the non-display area DD-NDA may be relatively designed in shape.

As illustrated in FIGS. 1A-1C, the display apparatus DD may include a plurality of areas defined according to respective forms of operations. The display apparatus DD may include a bent area BA that is bent along (or on the basis of) a bending axis BX, a first non-bent area NBA1 that is not bent (or is not configured to bend), and a second non-bent area NBA2 that is not bent (or is not configured to bend). As illustrated in FIG. 1B, the display apparatus DD may be bent inwardly to allow the display surface IS of the first non-bent area NBA1 (e.g., a first portion of the display surface IS in the first non-bent area NBA1) and the display surface IS of the second non-bent area NBA2 (e.g., a second portion of the display surface IS in the second non-bent area NBA2) to face each other. As illustrated in FIG. 1C, the display apparatus DD may be bent outwardly to allow the display surface IS to be exposed to the outside.

In an embodiment of the inventive concept, the display apparatus DD may include a plurality of bent areas BA. In addition, the bent areas BA may be defined to correspond to a user's operations for manipulating the display apparatus DD. For example, the bent areas BA may be defined in a direction parallel to the first directional axis DR1 or defined in a diagonal direction, unlike the embodiment illustrated in FIGS. 1B and 1C. The bent area BA may be defined (or determined) according to a curvature radius thereof without fixing an area thereof. In an embodiment of the inventive concept, the display apparatus DD may have a shape in which only an operation mode of FIGS. 1A and 1B is repeated (or repeatable).

FIG. 2 is a cross-sectional view of the display apparatus DD of FIG. 1. FIG. 2 illustrates a cross-section defined by the second directional axis DR2 and the third directional axis DR3.

Referring to FIG. 2, the display apparatus DD includes a protection film PM, a display module DM, an optical member LM, a window WM, a first adhesion member AM1, a second adhesion member AM2, and a third adhesion member AM3. The display module DM is disposed between the protection film PM and the optical member LM. The optical member LM is disposed between the display module DM and the window WM. The first adhesion member AM1 is coupled to the display module DM and the protection film PM, the second adhesion member AM2 is coupled to the display module DM and the optical member LM, and the third adhesion member AM3 is coupled to the optical member LM and the window WM.

The protection film PM protects the display module DM. The protection film PM provides a first outer surface OS-L that is exposed to the outside and an adhesion surface that adheres to the first adhesion member AM1. The protection film PM prevents external moisture from being permeated into the display module DM, or reduces the likelihood thereof, and absorbs an external impact.

The protection film PM may include a plastic film as a base layer. The protection film PM may include a plastic film including one selected from the group consisting of polyethersulfone (PES), polyacrylate (PAR), polyetherimide (PEI), polyethyelene naphthalate (PEN), polyethyelene terepthalate (PET), polyphenylene sulfide (PPS), polyallylate, polyimide (PI), polycarbonate (PC), poly(arylene ether sulfone), and a combination thereof.

A material for forming the protection film PM is not limited to plastic resins. For example, the protection film PM may include an organic/inorganic composite material. The protection film PM may include a porous organic layer and an inorganic material that is filled into pores of the organic layer. The protection film PM may further include a functional layer disposed on a plastic film. The functional layer may include a resin layer. The functional layer may be formed in a coating manner. In an embodiment of the inventive concept, the protection film PM may be omitted.

The window WM protects the display module DM against an external impact and provides an input surface to a user. The window WM provides a second outer surface OS-U that is exposed to the outside and an adhesion surface that adheres to the third adhesion member AM3. The display surface IS of FIGS. 1A-1C may be the second outer surface OS-U.

The window WM may include a plastic film. The window WM may include a multilayered structure. The window WM may have a multilayered structure selected from a glass substrate, a plastic film, and/or a plastic substrate. The window WM may further include a bezel pattern. The multilayered structure may be formed by a continuous process or an adhesion process using an adhesion layer.

The optical member LM may reduce reflectance of external light (e.g., may be configured to reduce reflection of external light). The optical member LM may include at least a polarizing film. The optical member LM may include at least a phase difference film. In an embodiment of the inventive concept, the optical member LM may be omitted.

The display module DM includes an organic light emitting display panel DP and a touch sensing unit TS. The touch sensing unit TS may be on (e.g., directly disposed on) the organic light emitting display panel DP. In this specification, the term "directly disposed" indicates that a component is formed through the continuous process except that the component adheres by using a separate adhesion layer.

The organic light emitting display panel DP generates the image IM (see FIG. 1A) corresponding to inputted image data. The organic light emitting display panel DP provides a first display panel surface BS1-L and a second display panel surface BS1-U, which face each other in the thickness direction DR3. Although the organic light emitting display panel DP is described as an example in the present embodiment, embodiments of the inventive concept are not limited to the above-described display panel.

The touch sensing unit TS acquires coordinate information of an external input. The touch sensing unit TS may sense an external input in a capacitive manner.

The display module DM according to an embodiment of the inventive concept may further include an anti-reflection layer. The anti-reflection layer may include a color filter and/or a laminated structure of a conductive layer/an insulation layer/a conductive layer. The anti-reflection layer may absorb, destructively interfere with, or polarize light incident from the outside to reduce reflectance of external light. The anti-reflection layer and the optical member LM may have the same function (e.g., the anti-reflection layer may substitute for the function of the optical member LM).

Each of the first adhesion member AM1, the second adhesion member AM2, and the third adhesion member AM3 may be an organic adhesion layer such as an optically clear adhesive film (OCA), an optically clear resin (OCR), and/or a pressure sensitive adhesive film (PSA). The organic adhesion layer may include an adhesion material such as a polyurethane-based material, a polyacrylic-based material, a polyester-based material, a polyepoxy-based material, and/or a polyvinyl acetate-based material. As described below, the organic adhesion layer may cause generation of bubbles.

In some embodiments, the display apparatus DD may further include a frame structure to support the functional layers and to maintain the state (or configurations) illustrated in FIGS. 1A-1C. The frame structure may include a joint structure and/or a hinge structure.

Figure 3A:
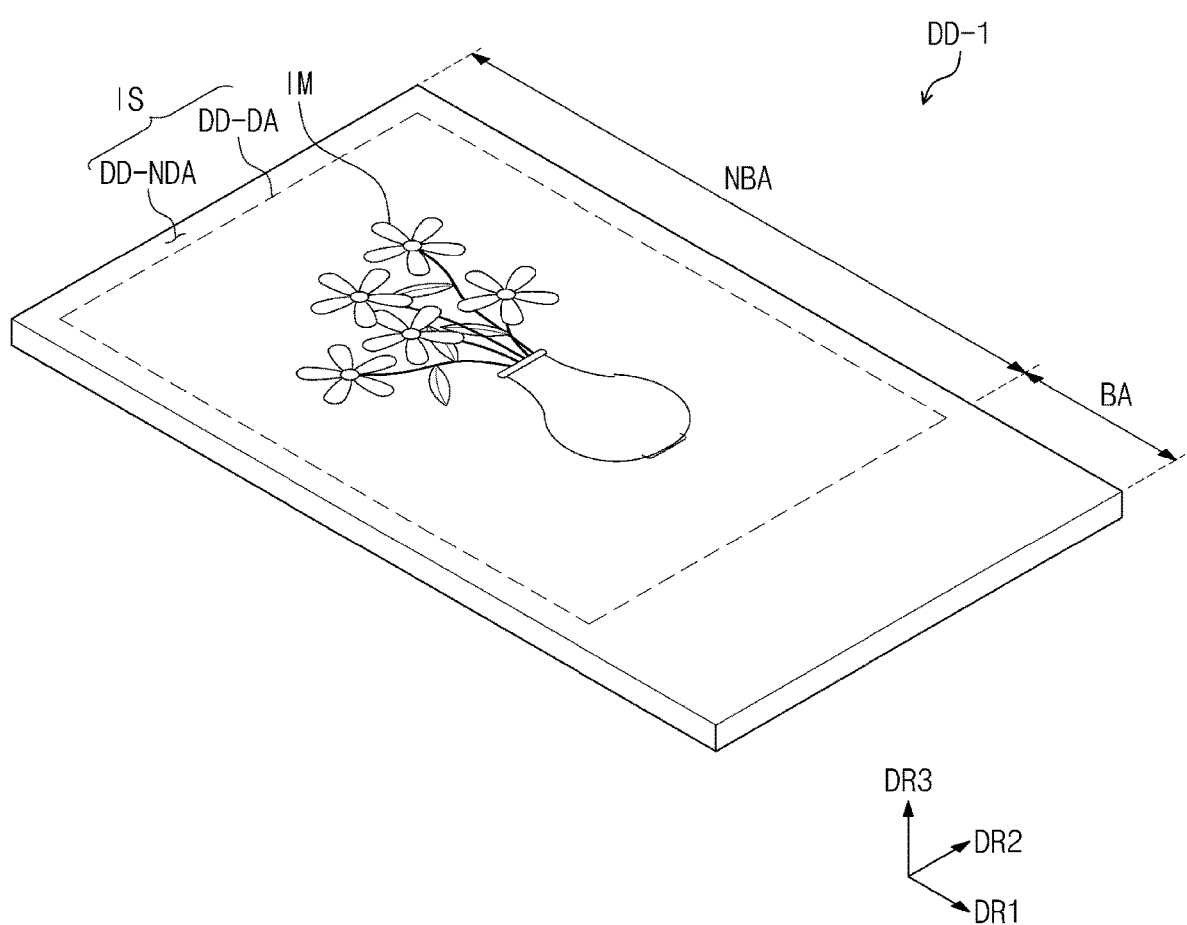
FIGS. 3A-3B are perspective views of a display apparatus according to an embodiment of the inventive concept.
Figure 3B:
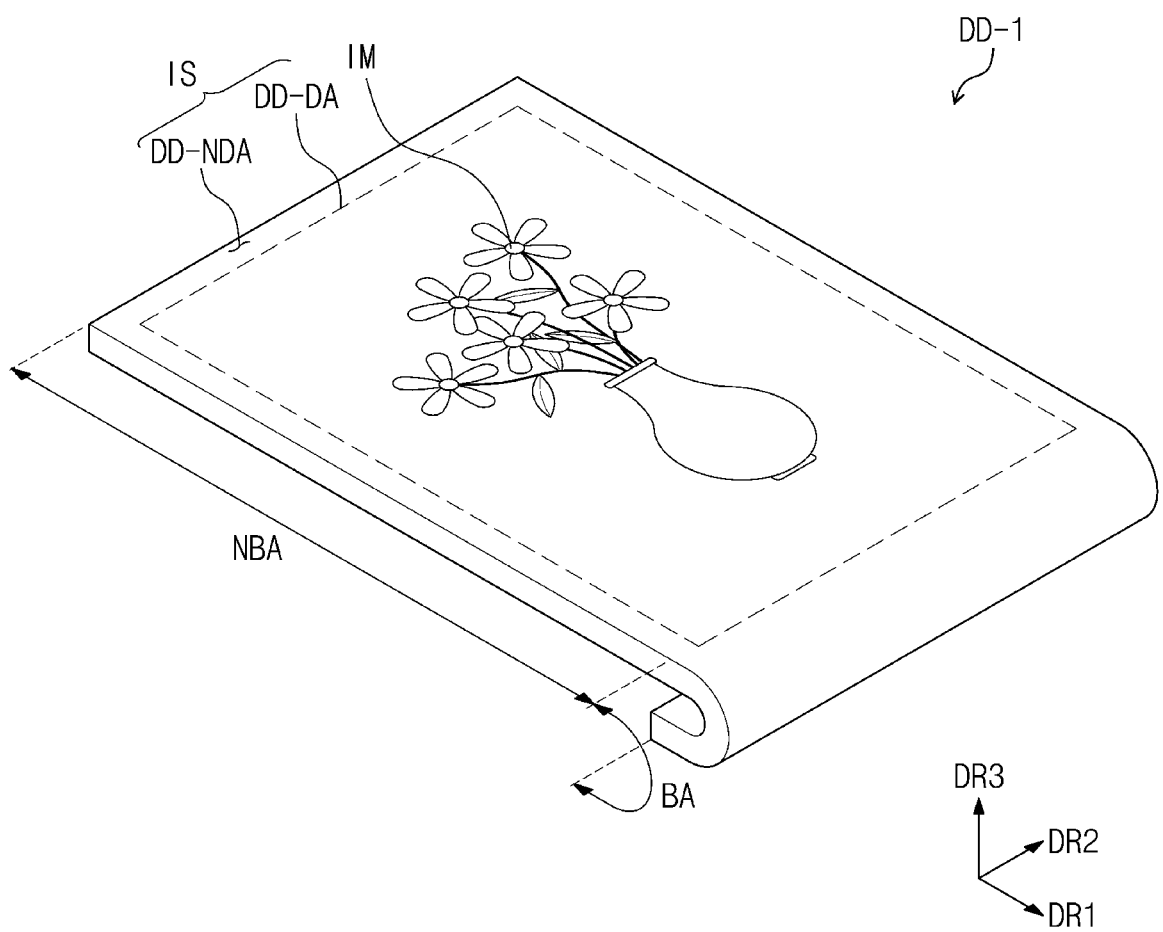

FIGS. 3A-3B are perspective views of a display apparatus DD-1 according to an embodiment of the inventive concept. FIG. 3A illustrates the display apparatus DD-1 in a spread (or opened) state (or open configuration), and FIG. 3B illustrates the display apparatus DD-1 in a bent state (or bent configuration).

Referring to FIGS. 3A-3B, the display apparatus DD-1 may include a bent area BA and a non-bent area NBA. A non-display area DD-NDA of the display apparatus DD-1 may be bent (e.g., may be configured to be bent). However, in an embodiment of the inventive concept, the bent area BA of the display apparatus DD-1 and/or its location may be changed. The non-bent area NBA is parallel to a surface that is defined by a first direction DR1 and a second direction DR2. The bent area BA may be bent (e.g., may be configured to be bent) from one side of the non-bent area NBA.

The display apparatus DD-1 according to an embodiment of the inventive concept may be fixed in one shape to operate, unlike the display apparatus DD illustrated in FIGS. 1A-1C. The display apparatus DD-1 may operate in the bent state (e.g., may be configured to operate in the bent state) as illustrated in FIG. 3B. The display apparatus DD-1 may be fixed to a frame in the bent state, and the frame may be coupled to a housing of an electronic device.

The display apparatus DD-1 according to an embodiment of the inventive concept may have the same (or substantially the same) cross-sectional structure as that of the display apparatus DD illustrated in FIG. 2. However, the non-bent area NBA and the bent area BA may have laminated structures that are different from each other. For example, the non-bent area NBA may have the same cross-sectional structure as that of the display apparatus DD illustrated in FIG. 2, and the bent area BA may have a cross-sectional structure different from that of the display apparatus DD illustrated in FIG. 2. An optical member LM and the window WM may not be disposed on (or in) the bent area BA. For example, the optical member LM and the window WM may be disposed only on (or in) the non-bent area NBA. Also, the second adhesion member AM2 and the third adhesion member AM3 may not be disposed on the bent area BA.

FIG. 4A is a perspective view of a display apparatus DD-2 according to an embodiment of the inventive concept.

Referring to FIG. 4A, a display surface IS of the display apparatus DD-2 includes a display area DD-DA, which is configured to display an image, and a non-display area DD-NDA, which is not configured to display an image. Although the non-display area DD-NDA surrounding the display area DD-DA is exemplarily illustrated, the non-display area DD-NDA may be disposed on one side of the display area DD-DA or may be omitted.

The display apparatus DD-2 may include one non-bent area NBA and one bent area BA. The bent area BA may be bent from one side of the non-bent area NBA. A main image IM may be displayed on a first surface (or a front surface) of the non-bent area NBA, and a sub-image may be displayed on a second surface (or a side surface) of the bent area BA. For example, the display area DD-DA disposed on the non-bent area NBA may extend to the bent area BA. As illustrated in FIG. 4A, a flower vase may be displayed as the main image IM. As an example, an icon providing predetermined or set information may be displayed as the sub-image.

Figure 4B:
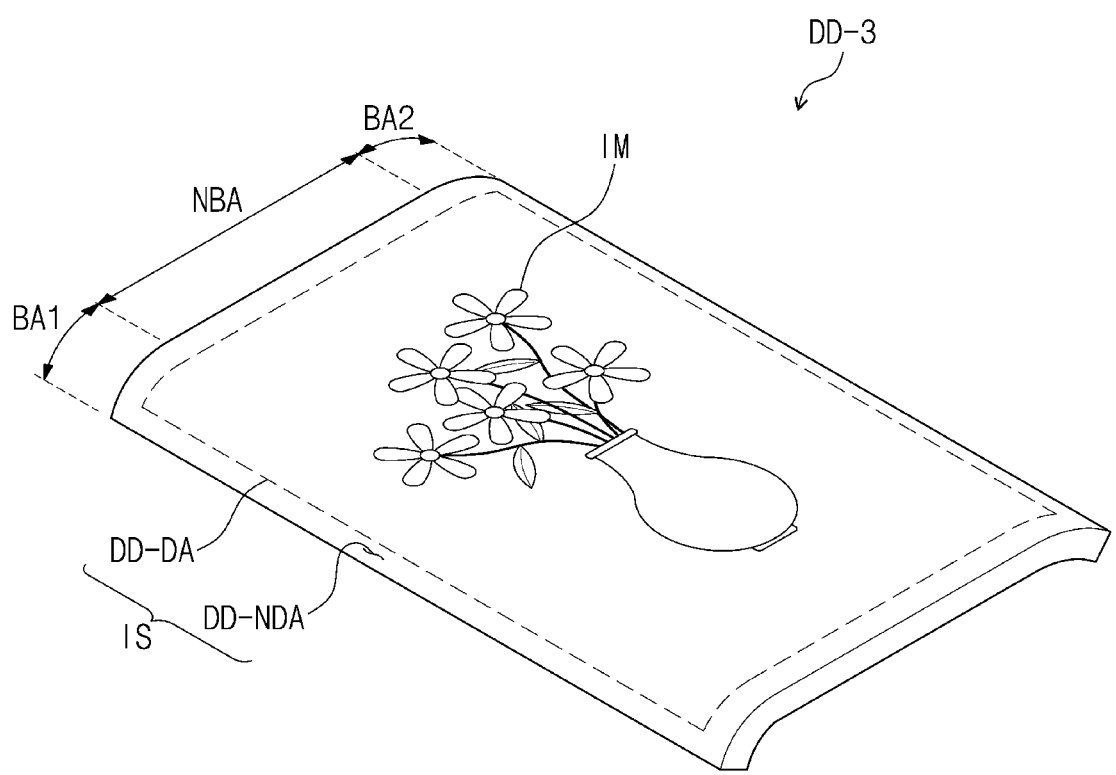
FIG. 4B is a perspective view of a display apparatus according to an embodiment of the inventive concept.

FIG. 4B is a perspective view of a display apparatus DD-3 according to an embodiment of the inventive concept.

The display apparatus DD-3 includes a non-bent area NBA, which is configured to display a main image, on a first surface (or a front surface) thereof and first and second bent areas BA1 and BA2, which are each configured to display a sub-image, on respective second surfaces (or respective side surfaces) of the first and second bent areas BA1 and BA2. The first and second bent areas BA1 and BA2 may be respectively bent from opposing sides of the non-bent area NBA.

Figure 5A:
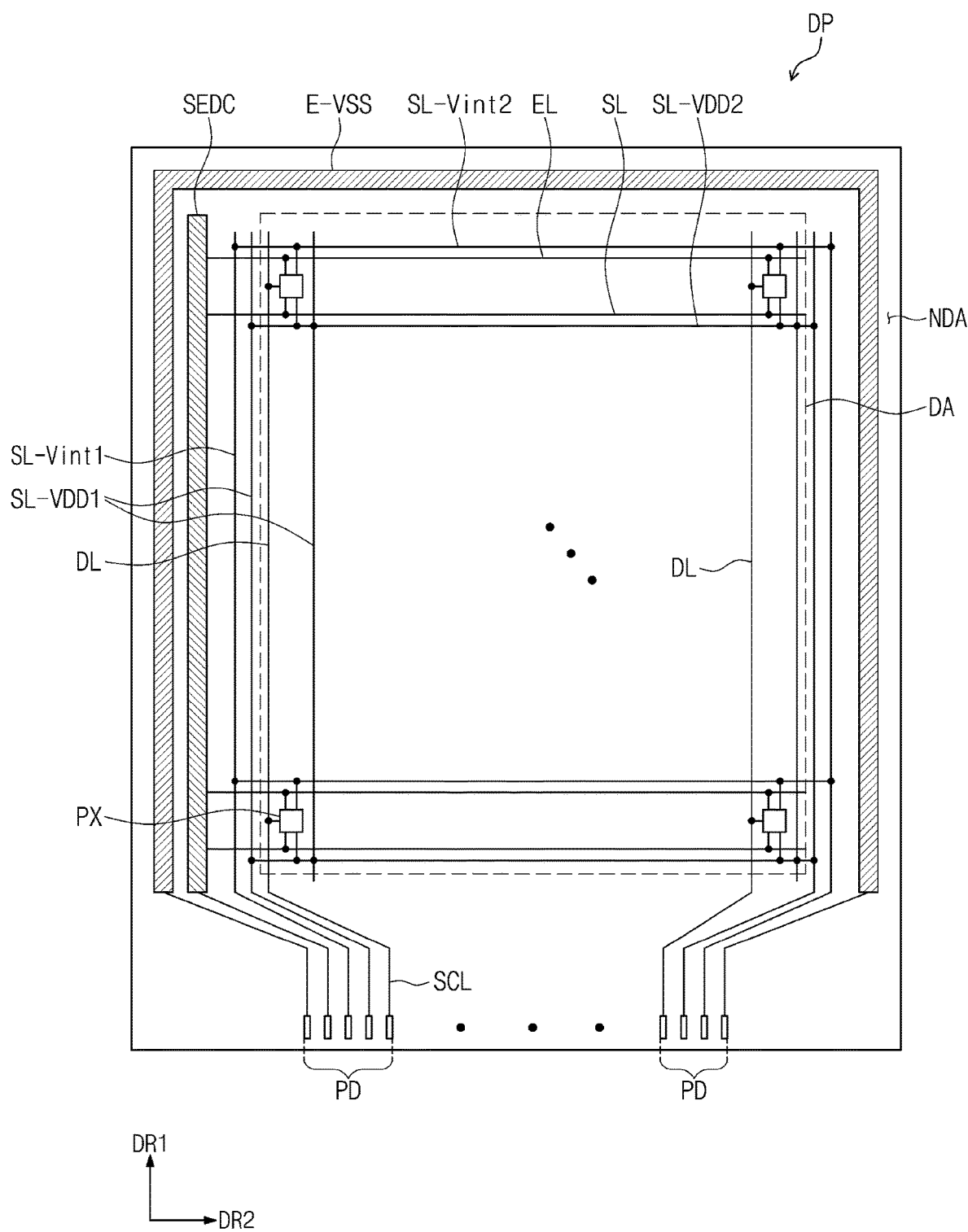
FIG. 5A is a plan view of an organic light emitting display panel according to an embodiment of the inventive concept.
Figure 5B:
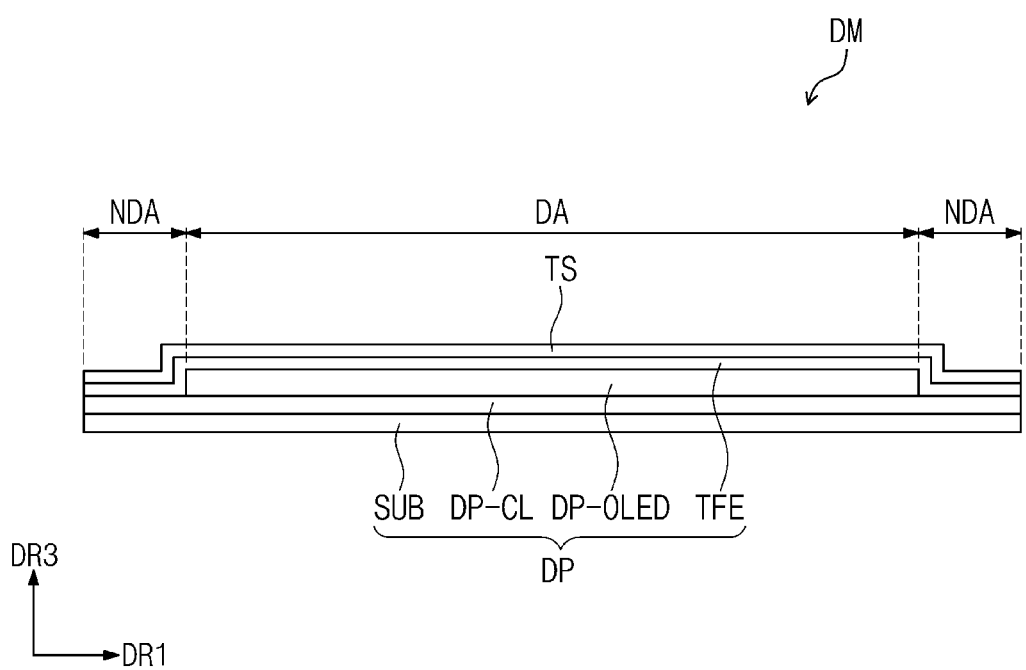
FIG. 5B is a cross-sectional view of a display module according to an embodiment of the inventive concept.

FIG. 5A is a plan view of the organic light emitting display panel DP according to an embodiment of the inventive concept. FIG. 5B is a cross-sectional view of a display module DM according to an embodiment of the inventive concept.

Referring to FIG. 5A, the organic light emitting display panel DP includes a display area DA and a non-display area NDA on a plane. The display area DA and the non-display area NDA of the organic light emitting display panel DP may correspond to the display area DD-DA and the non-display area DD-NDA of the display apparatus DD, respectively. However, embodiments of the inventive concept are not limited thereto, and it is unnecessary that the display area DA and the non-display area NDA of the organic light emitting display panel DP respectively correspond to the display area DD-DA and the non-display area DD-NDA of the display apparatus DD. For example, the display area DA and the non-display area NDA of the organic light emitting display panel DP may be changed according to a structure/design of the organic light emitting display panel DP.

The organic light emitting display panel DP includes a plurality of scan lines SL, a plurality of data lines DL, a plurality of emission lines EL, a plurality of first and second initialization lines SL-Vint1 and SL-Vint2, a plurality of first power lines SL-VDD1 and SL-VDD2, a second power line E-VSS, a plurality of pad units PD, a plurality of signal connection lines SCL, a scan-emission driving circuit SEDC, and a plurality of pixels PX.

The plurality of pixels PX may be disposed on the display area DA, and the non-display area NDA may be defined along a border of the display area DA. The scan lines SL extend in (or along) the second direction DR2 and are respectively connected to corresponding pixels PX of the plurality of pixels PX, the data lines DL extend in (or along) the first direction DR1 and are respectively connected to corresponding pixels PX of the plurality of pixels PX, and the emission lines EL extend in (or along) the second direction DR2 and are respectively connected to corresponding pixels PX of the plurality of pixels PX.

The plurality of first power lines SL-VDD1 and SL-VDD2 include a plurality of first sub-first power lines SL-VDD1 extending in (or along) the first direction DR1 and a plurality of second sub-first power lines SL-VDD2 extending in (or along) the second direction DR2 and connected to the first sub-first power lines SL-VDD1. The second sub-first power lines SL-VDD2 are connected to the pixels PX, and the first and second sub-first power lines SL-VDD1 and SL-VDD2 each receive a first voltage. The first voltage may be defined as an anode voltage.

The first initialization lines SL-Vint1 extend in (or along) the first direction DR1, and the second initialization lines SL-Vint2 extend in (or along) the second direction DR2 and are connected to the first initialization lines SL-Vint1. The second initialization lines SL-Vint2 are connected to the pixels PX and receive an initialization voltage from the first initialization lines SL-Vint1.

The scan-emission driving circuit SEDC is disposed on one side of the non-display area NDA and connected to the scan lines SL and the emission lines EL. The scan-emission driving circuit SEDC may receive a control signal through a corresponding signal connection line SCL of the signal connection lines SCL and generate scan signals and emission signals in response to the received control signal. The scan lines SL receive the scan signals, and the emission lines EL receive the emission signals.

The second power line E-VSS may receive a second voltage, and the second voltage may be defined as a cathode voltage (or a ground voltage). In some embodiments, the second voltage may be supplied to the pixel PX through the second power line E-VSS. The signal connection lines SCL connect the scan-emission driving circuit SEDC, the data lines DL, the first sub-first power lines SL-VDD1, the first initialization lines SL-Vint1, and the second power line E-VSS to the pad units PD.

Referring to FIG. 5B, the organic light emitting display panel DP includes a base layer SUB, a circuit layer DP-CL disposed on the base layer SUB, a light emitting device layer DP-OLED disposed on the circuit layer DP-CL within the display area DA, and a thin film encapsulation layer TFE disposed on the circuit layer DP-CL and the light emitting device layer DP-OLED. The base layer SUB may include at least one plastic film. The base layer SUB may include a plastic substrate, a glass substrate, a metal substrate, and/or an organic/inorganic composite substrate as a flexible substrate.

The circuit layer DP-CL may include a plurality of insulation layers, a plurality of conductive layers, and a semiconductor layer. The plurality of conductive layers of the circuit layer DP-CL may constitute (or form) signal lines or a control circuit of one of the pixels PX. The light emitting device layer DP-OLED may include organic light emitting diodes. The thin film encapsulation layer TFE seals the light emitting device layer DP-OLED.

The thin film encapsulation layer TFE may include an inorganic layer and an organic layer. The thin film encapsulation layer TFE may include at least two inorganic thin films and an organic thin film disposed between the at least two inorganic thin films. The inorganic layers protect the light emitting device layer DP-OLED from moisture and/or oxygen (or reduce the likelihood of penetration of moisture and/or oxygen), and the organic layer protects the light emitting device layer DP-OLED from foreign substances such as dust particles (or reduce the likelihood of penetration of foreign substances such as dust particles). The inorganic layer may include a silicon nitride layer, a silicon oxynitride layer, a silicon oxide layer, a titanium oxide layer, and/or an aluminum oxide layer. The organic layer may include an acrylic-based organic layer, for example, but embodiments of the inventive concept are not limited thereto.

The touch sensing unit TS may be directly disposed on the thin film encapsulation layer TFE. However, embodiments of the inventive concept are not limited thereto. For example, a buffer layer may be disposed on the thin film encapsulation layer TFE, and the touch sensing unit TS may be disposed on the buffer layer disposed on the thin film encapsulation layer TFE. The buffer layer may include an inorganic layer and/or an organic layer. The touch sensing unit TS includes touch sensors and touch signal lines. The touch sensors and the touch signal lines may have a single layer structure or a multilayered structure.

Each of the touch sensors and the touch signal lines may include indium tin oxide (ITO), indium zinc oxide (IZO), zinc oxide (ZnO), indium tin zinc oxide (ITZO), poly(3,4-ethylenedioxythiophene) (PEDOT), a metal nanowire, and/or graphene. Each of the touch sensors and the touch signal lines may include a metal layer, such as, for example, molybdenum, silver, titanium, copper, aluminum, and/or an alloy thereof. The touch sensors and the touch signal lines may have the same single layer structure or may have layer structures that are different from each other. Additional description with respect to the touch sensing unit TS is provided below.

Figure 6A:
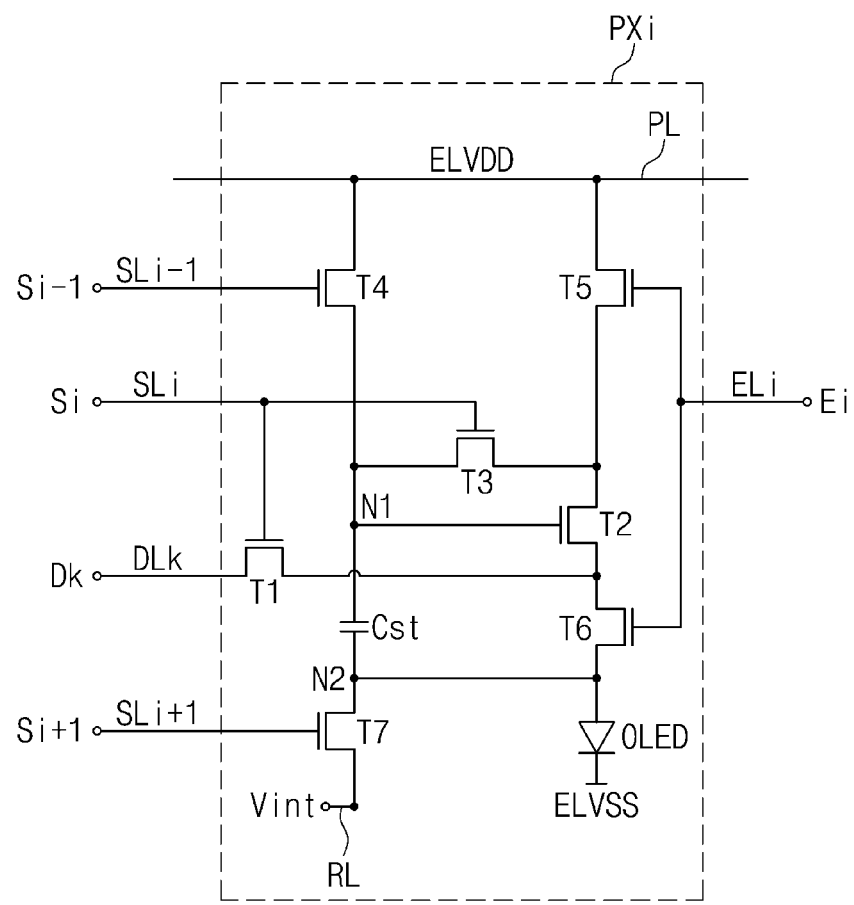
FIG. 6A is an equivalent circuit diagram of a pixel according to an embodiment of the inventive concept.
Figure 6B:
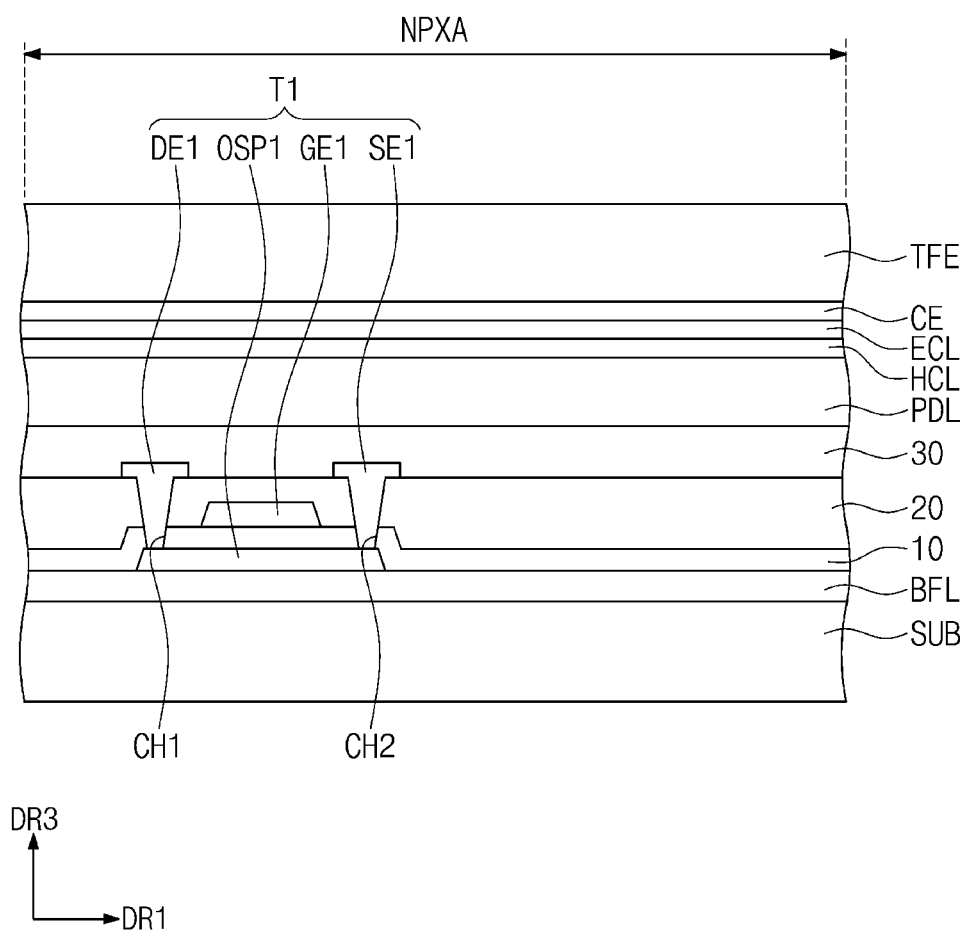
FIGS. 6B-6C are cross-sectional views of the pixel of FIG. 6A.
Figure 6C:
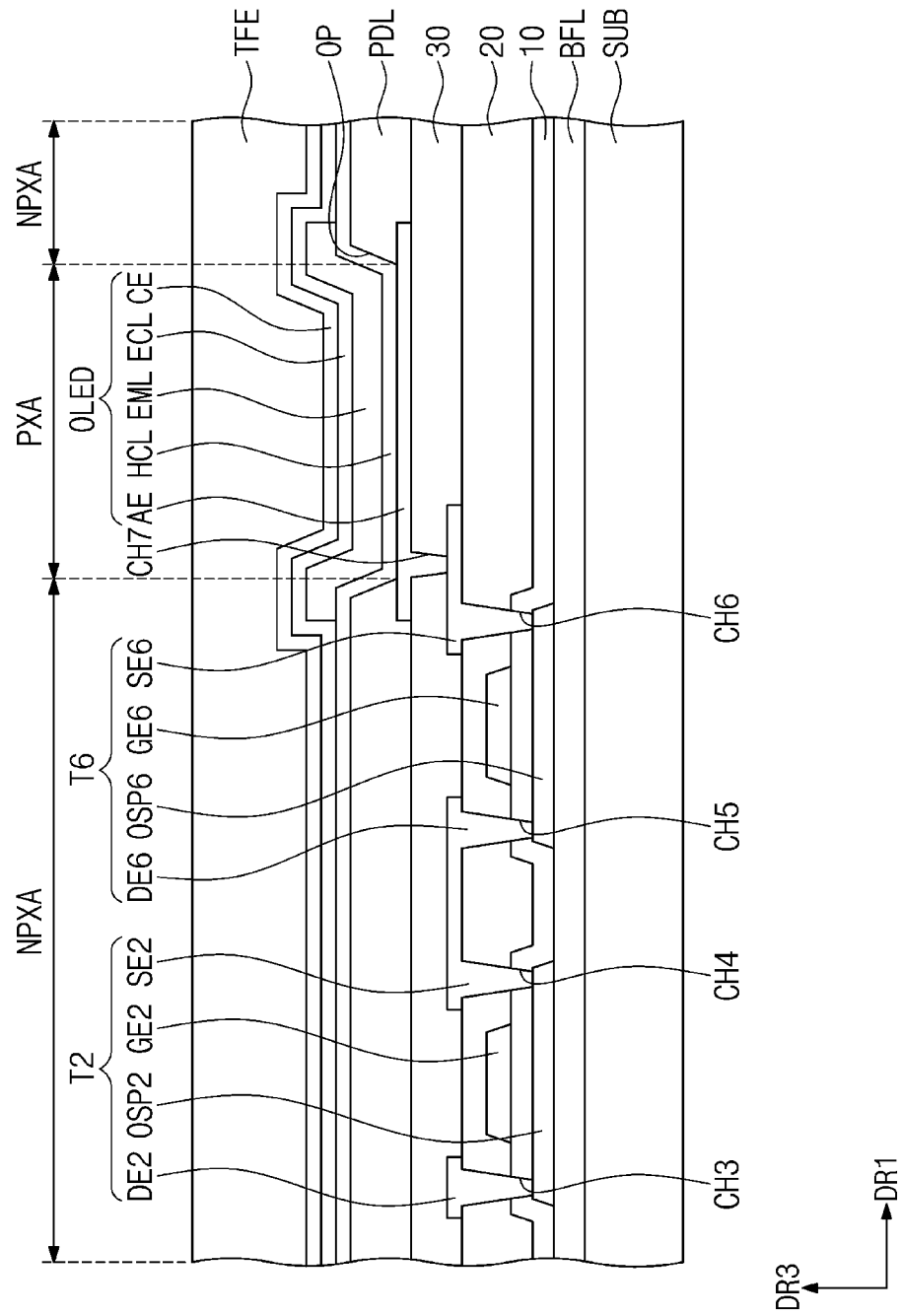

FIG. 6A is an equivalent circuit diagram of the pixel PX according to an embodiment of the inventive concept. FIGS. 6B-6C are cross-sectional views of the pixel PX of FIG. 6A.

FIG. 6A exemplarily illustrates an i-th pixel PXi connected to a k-th data line DLk of the data lines DL. FIG. 6B is a cross-sectional view of a portion of the i-th pixel PXi corresponding to a first transistor T1 of the equivalent circuit of FIG. 6A. FIG. 6C is a cross-sectional view of portions of the i-th pixel PXi corresponding to a second transistor T2, a sixth transistor T6, and an organic light emitting diode OLED of the equivalent circuit of FIG. 6A.

Referring to FIG. 6A, the i-th pixel PXi is activated (or configured to be activated) in response to an i-th scan signal Si applied to an i-th scan line SLi. The i-th pixel PXi includes an organic light emitting diode OLED and a pixel driving circuit controlling the organic light emitting diode OLED. The pixel driving circuit may include seven thin film transistors T1-T7 (e.g., a first thin film transistor T1, a second thin film transistor T2, a third thin film transistor T3, a fourth thin film transistor T4, a fifth thin film transistor T5, a sixth thin film transistor T6, and a seventh thin film transistor T7) and one capacitor Cst. Although the pixel driving circuit including the seven thin film transistors T1-T7 and the one capacitor Cst is exemplarily illustrated, in some embodiments, the i-th pixel PXi may only include the first transistor T1 (or a driving transistor), the second transistor T2 (or a switching transistor), and the capacitor Cst as a driving circuit for driving the organic light emitting diode OLED, and the pixel driving circuit may be variously modified.

The driving transistor controls driving current supplied to the organic light emitting diode OLED. An output electrode of the second transistor T2 is electrically connected to the organic light emitting diode OLED. The output electrode of the second transistor T2 may directly contact an anode of the organic light emitting diode OLED or may be connected to the anode via another transistor (e.g., the sixth transistor T6 of the present embodiment).

A control electrode of a control transistor may receive a control signal (or may be configured to receive a control signal). A control signal applied to the i-th pixel PXi may include an i−1-th scan signal Si−1, an i-th scan signal Si, an i+1-th scan signal Si+1, a k-th data signal Dk, and an i-th emission control signal Ei. In an embodiment of the inventive concept, the control transistor may include the first transistor T1 and the third to seventh transistors T3-T7.

The first transistor T1 includes an input electrode connected to a k-th data line DLk, a control electrode connected to the i-th scan line SLi, and an output electrode connected to the output electrode of the second transistor T2. The first transistor T1 is turned on by the i-th scan signal Si applied to the i-th scan line SLi to provide the k-th data signal Dk applied to the k-th data line DLk to the storage capacitor Cst.

Referring to FIGS. 6B-6C, a buffer layer BFL may be disposed on the base layer SUB. The buffer layer BFL may improve a coupling force between conductive patterns and/or semiconductor patterns. The buffer layer BFL may include an inorganic layer. In some embodiments, a barrier layer for preventing foreign substances from being introduced (or for reducing the likelihood thereof) may be further disposed on a surface (e.g., a top surface) of the base layer SUB. The buffer layer BFL and the barrier layer may be selectively disposed or may be omitted.

A first semiconductor pattern OSP1 of the first transistor T1, a second semiconductor pattern OSP2 of the second transistor T2, and a sixth semiconductor pattern OSP6 of the sixth transistor T6 may be disposed on the buffer layer BFL. Each of the first, second, and sixth semiconductor patterns OSP1, OSP2, and OSP6 may be selected from amorphous silicon, polysilicon, and/or a metal oxide semiconductor.

A first insulation layer 10 may be disposed on the first, second, and sixth semiconductor patterns OSP1, OSP2, and OSP6. Although the first insulation layer 10 may be provided in the form of a layer that covers the first, second, and sixth semiconductor patterns OSP1, OSP2, and OSP6 (see FIG. 6B and FIG. 6C), in some embodiments, the first insulation layer 10 may be provided as a pattern that is disposed to correspond to the first, second, and sixth semiconductor patterns OSP1, OSP2, and OSP6.

The first insulation layer 10 may include a plurality of inorganic layers. The plurality of inorganic layers may include a silicon nitride layer, a silicon oxynitride layer, and/or a silicon oxide layer.

A first control electrode GE1 of the first transistor T1, a second control electrode GE2 of the second transistor T2, and a sixth control electrode GE6 of the sixth transistor T6 are disposed on the first insulation layer 10. The first, second, and sixth control electrodes GE1, GE2, and GE6 may be manufactured by the same photolithography process as the scan lines SL (see FIG. 5A).

A second insulation layer 20 covering the first, second, and sixth control electrodes GE1, GE2, and GE6 may be disposed on the first insulation layer 10. The second insulation layer 20 may provide a flat or substantially flat top surface. The second insulation layer 20 may include an organic material and/or an inorganic material.

A first input electrode SE1 and a first output electrode DE1 of the first transistor T1, a second input electrode SE2 and a second output electrode DE2 of the second transistor T2, and a sixth input electrode SE6 and a sixth output electrode DE6 of the sixth transistor T6 are disposed on the second insulation layer 20.

The first output electrode DE1 and the first input electrode SE1 are connected to the first semiconductor pattern OSP1 through first and second through-holes CH1 and CH2, which pass through the first and second insulation layers 10 and 20, respectively. The second output electrode DE2 and the second input electrode SE2 are connected to the second semiconductor pattern OSP2 through third and fourth through-holes CH3 and CH4, which pass through the first and second insulation layers 10 and 20, respectively. The sixth output electrode DE6 and the sixth input electrode SE6 are connected to the sixth semiconductor pattern OSP6 through fifth and sixth through-holes CH5 and CH6, which pass through the first and second insulation layers 10 and 20, respectively. According to another embodiment of the inventive concept, a portion of the first, second, and sixth transistors T1, T2, and T6 may have a bottom gate structure.

A third insulation layer 30 covering the first, second, and sixth input electrodes SE1, SE2, and SE6 and the first, second, and sixth output electrodes DE1, DE2, and DE6 is disposed on the second insulation layer 20. The third insulation layer 30 includes an organic layer and/or an inorganic layer. The third insulation layer 30 may include an organic material to provide a flat or substantially flat surface.

One of the first, second, and third insulation layers 10, 20, and 30 may be omitted according to the circuit structure of the pixel PXi. Each of the second and third insulation layers 20 and 30 may be defined as an interlayer dielectric layer. The interlayer dielectric layer may be disposed between a lower conductive pattern, which is disposed under the interlayer dielectric layer, and an upper conductive pattern, which is disposed above the interlayer dielectric layer, to insulate the conductive patterns from each other.

A pixel defining layer PDL and the organic light emitting diode OLED are disposed on the third insulation layer 30. A first electrode AE is disposed on the third insulation layer 30. The first electrode AE is connected to the sixth input electrode SE6 through a seventh through-hole CH7 passing through the third insulation layer 30. An opening OP is defined in the pixel defining layer PDL. The opening OP of the pixel defining layer PDL exposes at least a portion of the first electrode AE.

The pixel PXi may be disposed on a pixel area on a plane. The pixel area may include an emission area PXA and a non-emission area NPXA that is adjacent to the emission area PXA. The non-emission area NPXA may be disposed to surround the emission area PXA. In the present embodiment, the emission area PXA may be defined to correspond to a portion of the first electrode AE exposed by the opening OP.

A hole control layer HCL may be commonly disposed on the emission area PXA and the non-emission area NPXA. In some embodiments, a common layer such as the hole control layer HCL may be commonly disposed on the plurality of pixels PX (see FIG. 5A and FIG. 6C).

The emission layer EML is disposed on the hole control layer HCL. The emission layer EML may be disposed on (or in) an area corresponding to the opening OP. For example, the emission layer EML may be formed to be separated from each of the plurality of pixels PX. Also, the emission layer EML may include an organic material and/or an inorganic material. Although the patterned emission layer EML is illustrated as an example in the present embodiment, the emission layer EML may be commonly disposed on the plurality of pixels PX. In some embodiments, the emission layer EML may emit white light. In some embodiments, the emission layer EML may have a multilayer structure.

An electronic control layer ECL is disposed on the emission layer EML. In some embodiments, the electronic control layer ECL may be commonly disposed on the plurality of pixels PX (see FIG. 5A). A second electrode CE is disposed on the electronic control layer ECL. The second electrode CE may be commonly disposed on the plurality of pixels PX.

The thin film encapsulation layer TFE is disposed on the second electrode CE. The thin film encapsulation layer TFE may be commonly disposed on the plurality of pixels PX. In the present embodiment, the thin film encapsulation layer TFE directly covers the second electrode CE. In some embodiments of the inventive concept, a capping layer covering the second electrode CE may be further disposed between the thin film encapsulation layer TFE and the second electrode CE. In some embodiments, the thin film encapsulation layer TFE may directly cover the capping layer.

Figure 7A:
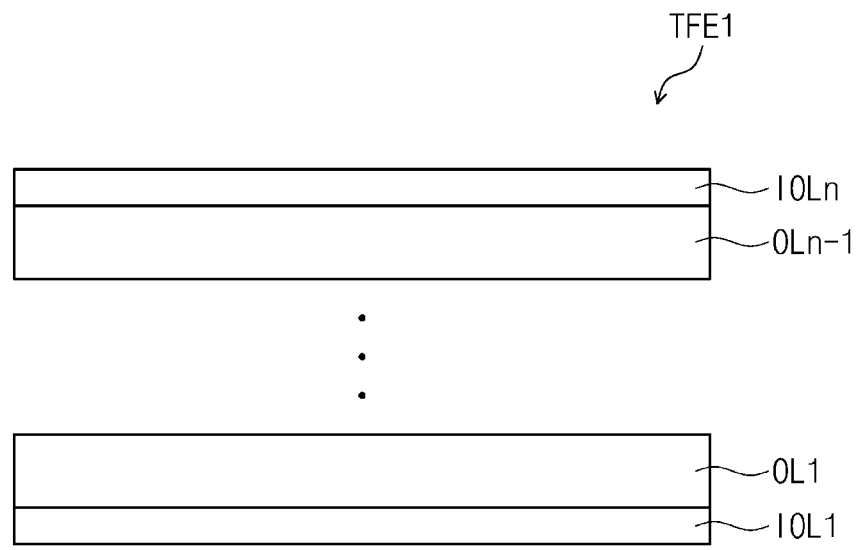
FIGS. 7A-7C are cross-sectional views of thin film encapsulation layers according to an embodiment of the inventive concept.
Figure 7B:
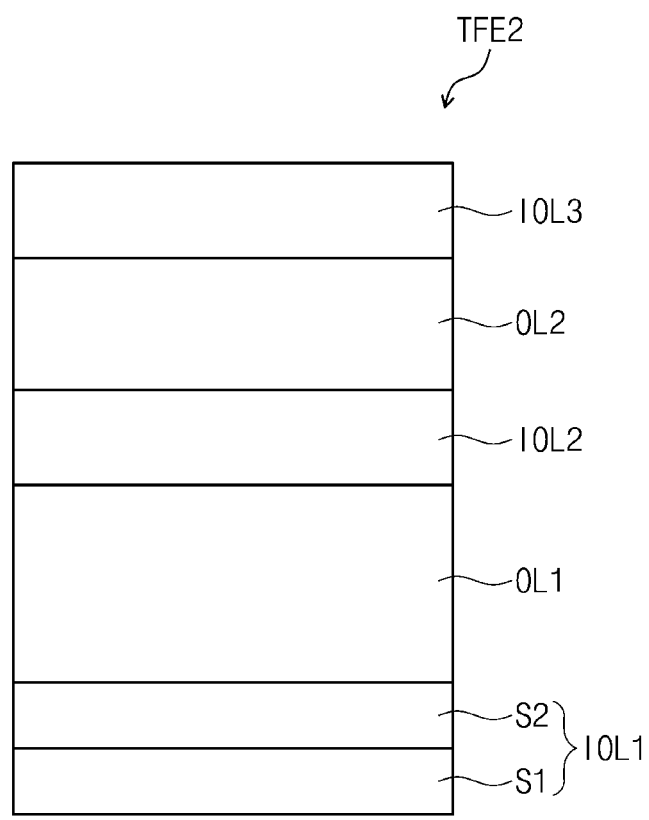
Figure 7C:
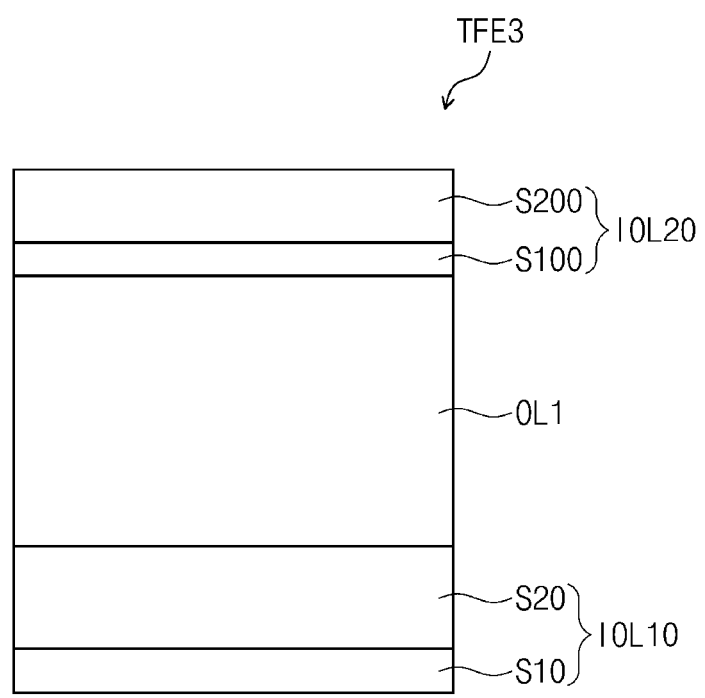

FIGS. 7A-7C are cross-sectional views of thin film encapsulation layers TFE1, TFE2, and TFE3 according to an embodiment of the inventive concept.

Referring to FIG. 7A, the thin film encapsulation layer TFE1 may include n inorganic layers (or inorganic thin films) IOL1 to IOLn. The thin film encapsulation layer TFE1 may include n−1 organic layers (or organic thin films) OL1 to OLn−1, and the n−1 organic layers OL1 to OLn−1 and the n inorganic layers IOL1 to IOLn may be alternately disposed with respect to each other. Each of the n−1 organic layers OL1 to OLn−1 may generally have a thickness that is greater than a thickness of each of the n inorganic layers IOL1 to IOLn.

Each of the n inorganic thin films IOL1 to IOLn may have a single layered structure including one material or may have a multi-layered structure respectively including materials that are different from each other. Each of the n−1 organic thin films OL1 to OLn−1 may be formed by providing an organic monomer. For example, each of the n−1 organic layers OL1 to OLn−1 may be formed by using an inkjet printing manner or may be formed by applying a composition including an acrylic-based monomer.

Referring to FIGS. 7B-7C, the inorganic layers provided in each of the thin film encapsulation layers TFE2 and TFE3 may be formed of the same material or of materials that are different from each other and may have the same thickness or may have thicknesses that are different from each other. The organic layers provided in each of the thin film encapsulation layers TFE2 and TFE3 may be formed of the same organic material or may be formed of organic materials that are different from each other and may have the same thickness or may have thicknesses that are different from each other.

As illustrated in FIG. 7B, the thin film encapsulation layer TFE2 may include a first inorganic layer IOL1, a first organic layer OL1, a second inorganic layer IOL2, a second organic layer OL2, and a third inorganic layer IOL3, which are successively laminated. The first inorganic layer IOL1 may have a two-layered structure. A first sub-layer S1 and a second sub-layer S2 of the first inorganic layer IOL1 may include inorganic materials that are different from each other.

As illustrated in FIG. 7C, the thin film encapsulation layer TFE3 may include a first inorganic layer IOL10, a first organic layer OL1, and a second inorganic layer IOL20, which are successively laminated. The first inorganic layer IOL10 may have a two-layered structure. A first sub-layer S10 and a second sub-layer S20 of the first inorganic layer IOL10 may include inorganic materials that are different from each other.

The second inorganic layer IOL20 may have a two-layered structure. The second inorganic layer IOL20 may include a first sub-layer S100 and a second sub-layer S200, which may be deposited under deposition environments that are different from each other. The first sub-layer S100 may be deposited under a lower power condition, and the second sub-layer S200 may be deposited under a high power condition. The first sub-layer S100 and the second sub-layer S200 may include the same material.

Figure 8A:
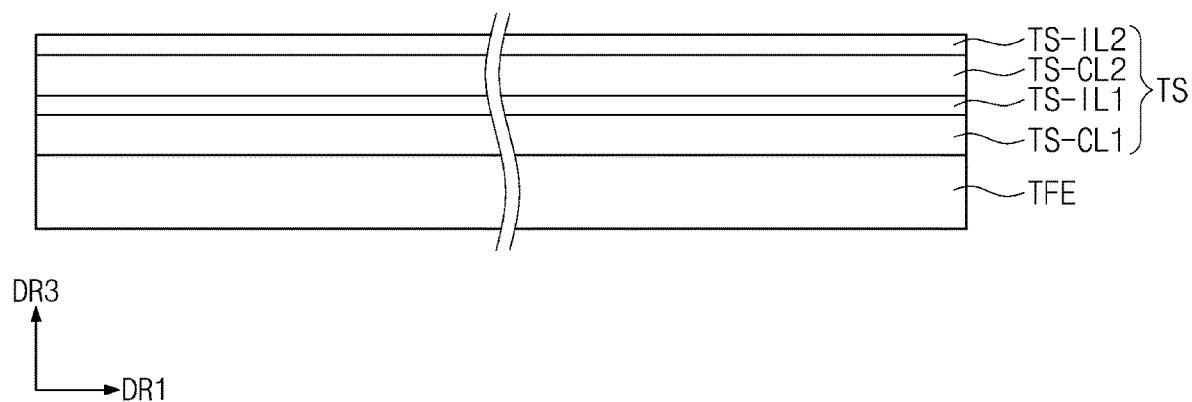
FIG. 8A is a cross-sectional view of a touch sensing unit according to an embodiment of the inventive concept.
Figure 8B:
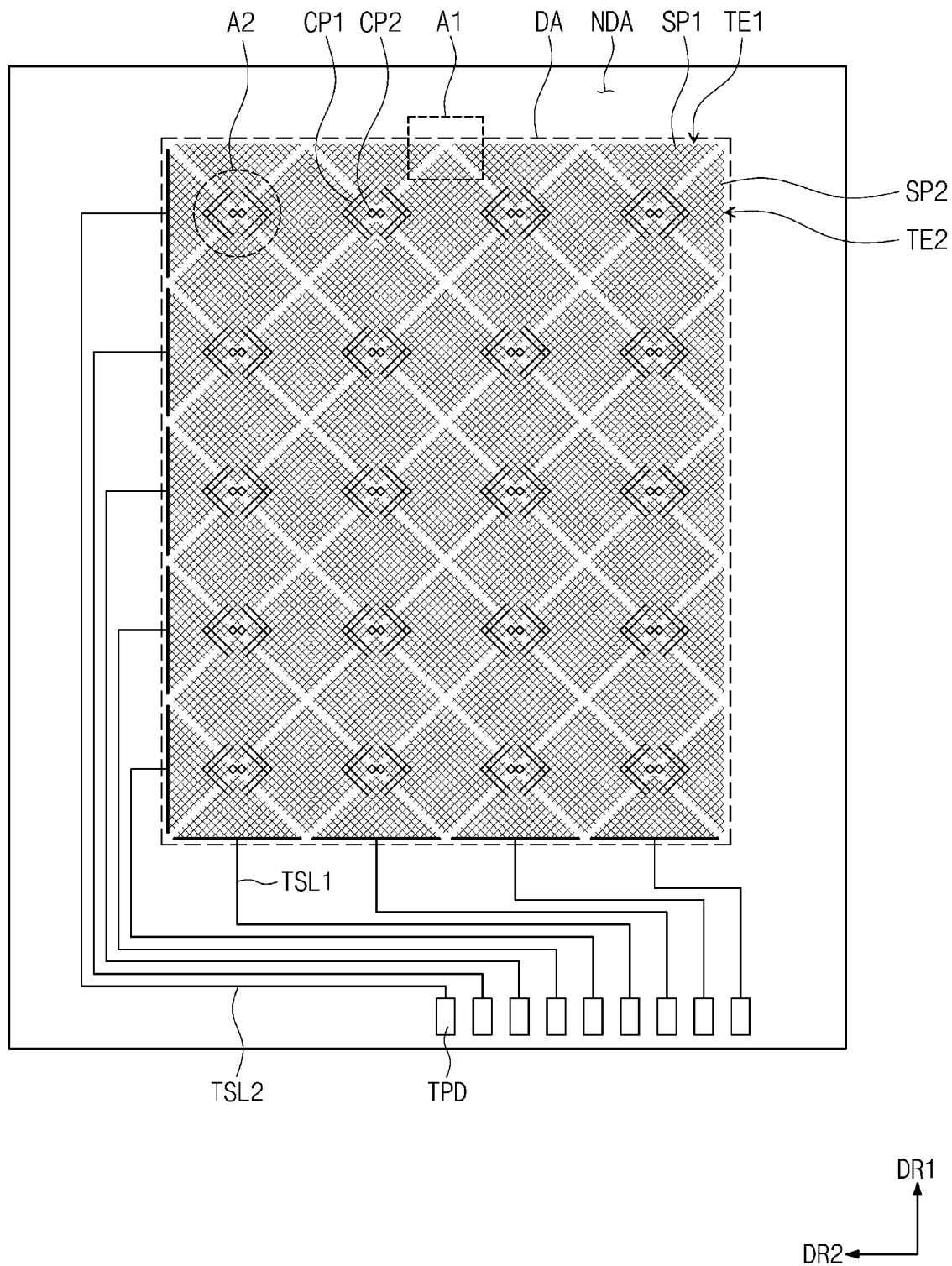
FIG. 8B is a plan view of a touch sensing unit according to an embodiment of the inventive concept.
Figure 8C:
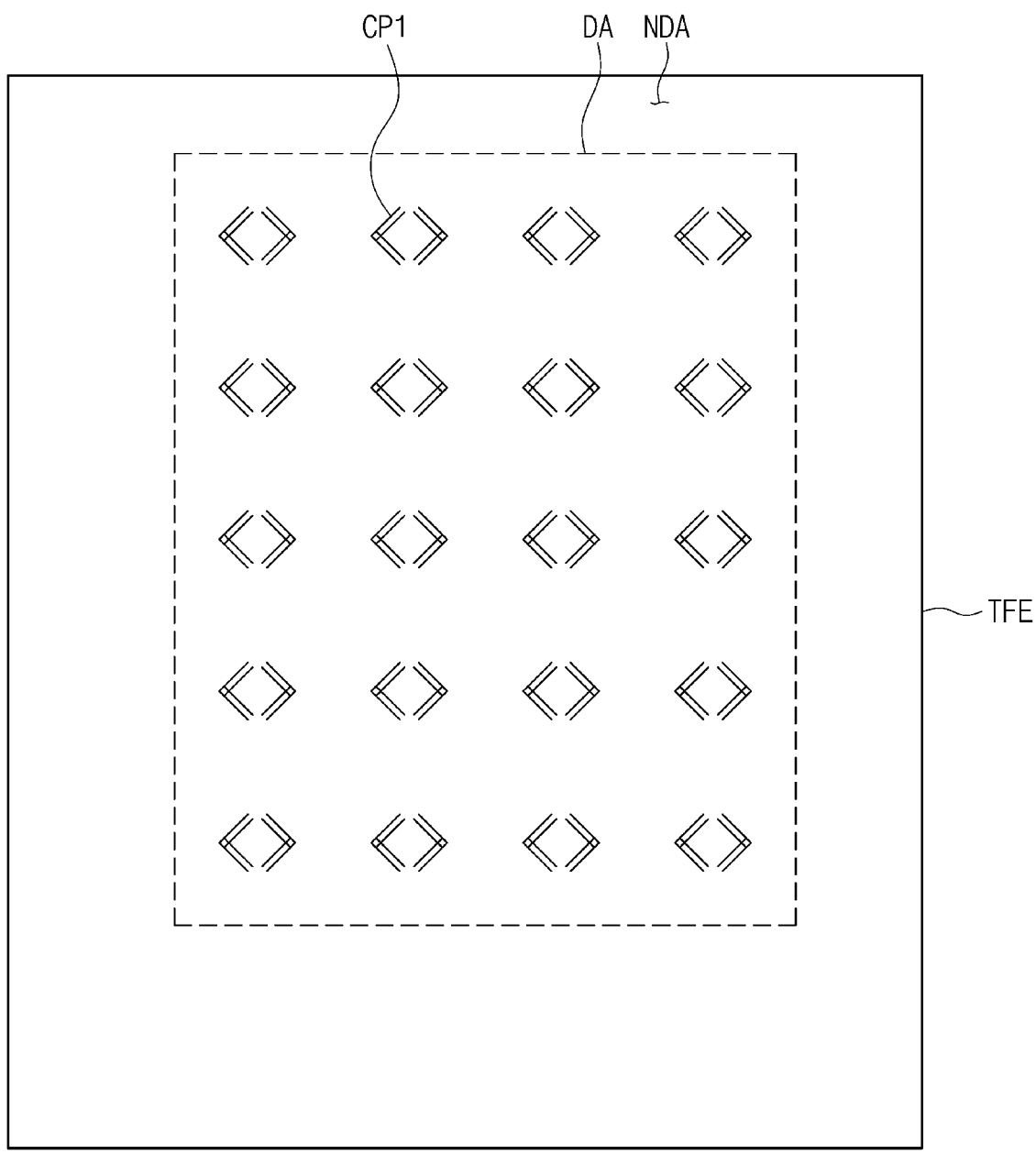
FIGS. 8C-8E are plan views respectively illustrating layers of the touch sensing unit of FIG. 8B.
Figure 8D:
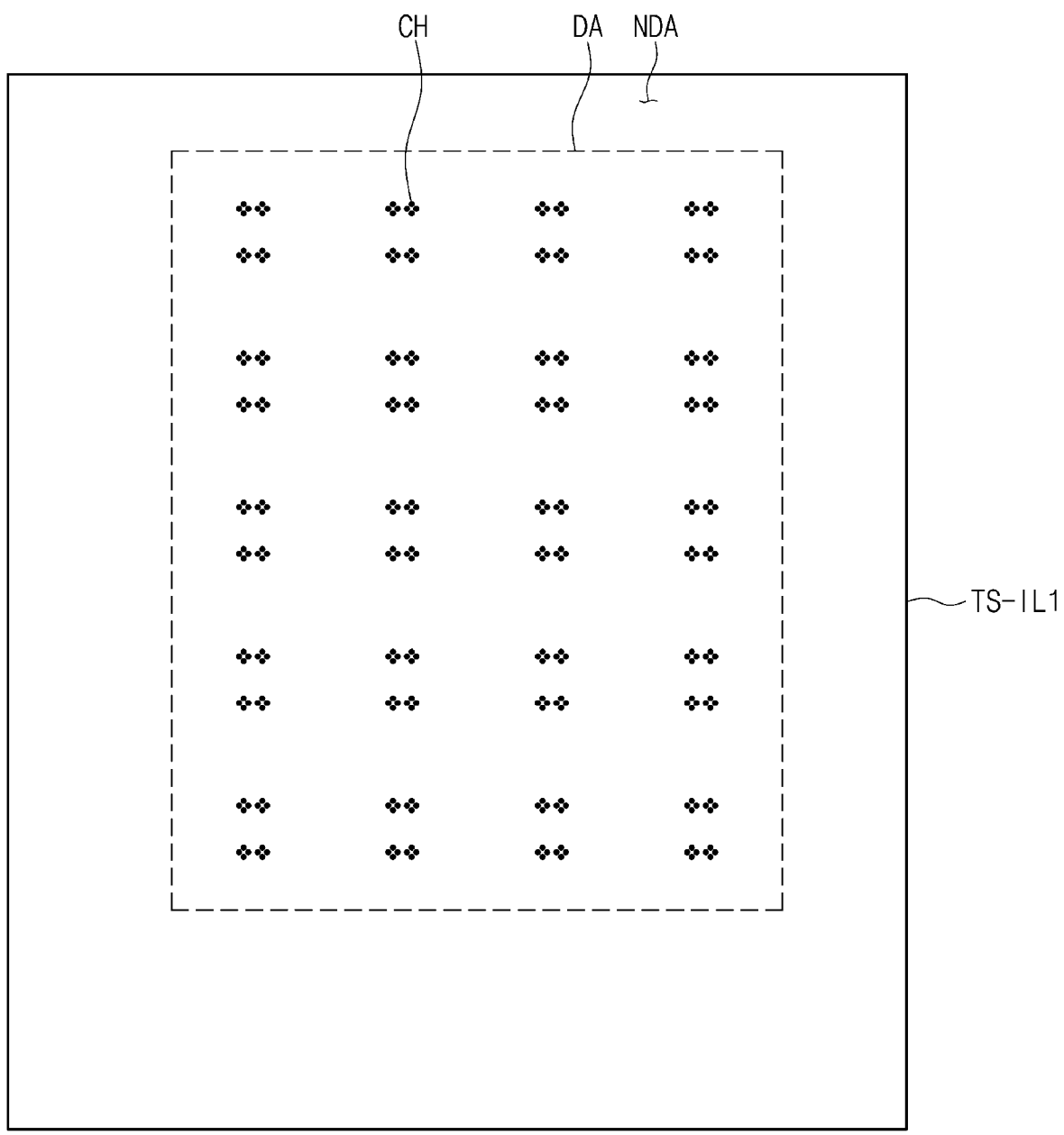
Figure 8E:
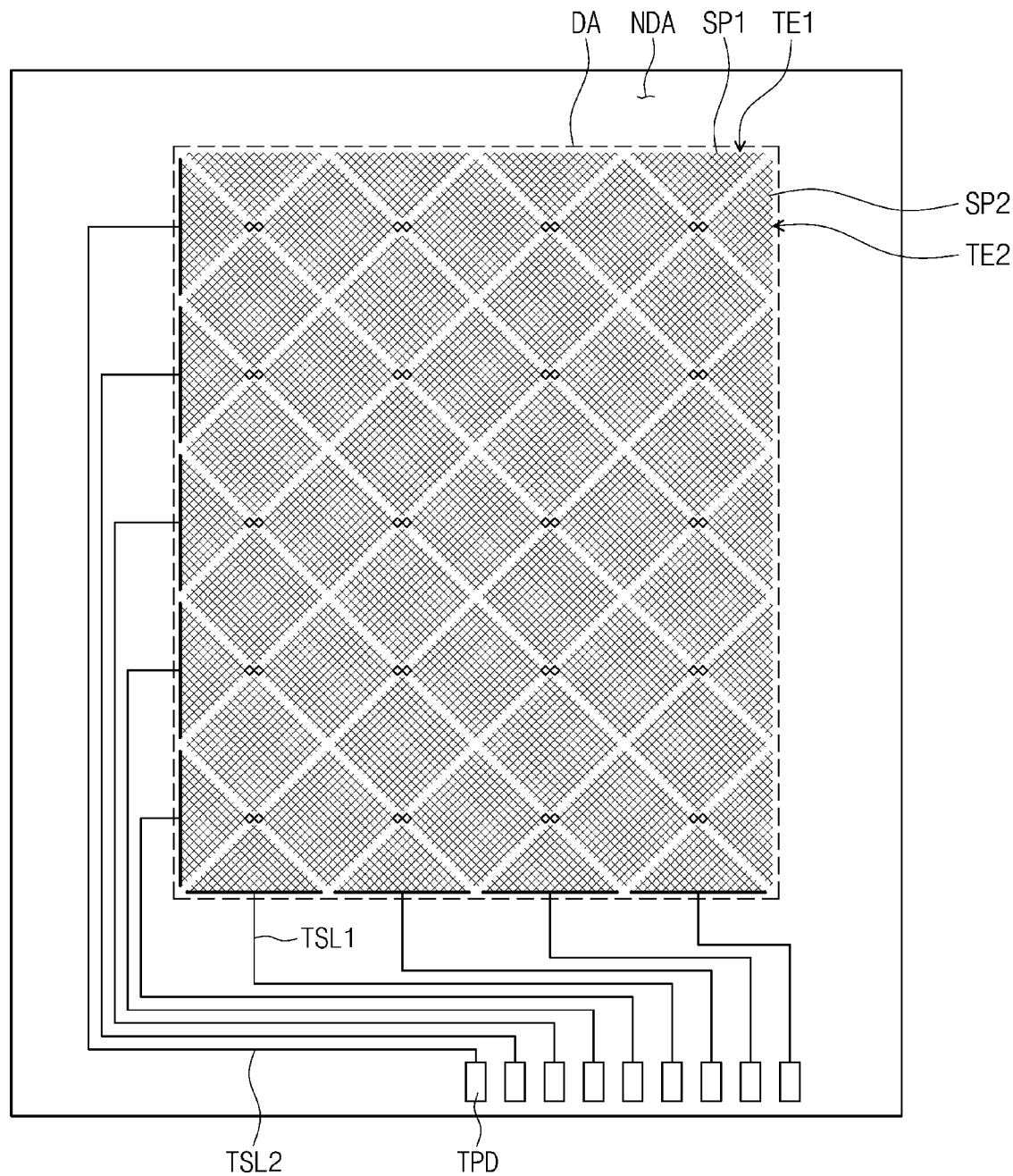

FIG. 8A is a cross-sectional view of the touch sensing unit TS according to an embodiment of the inventive concept. FIG. 8B is a plan view of the touch sensing unit TS of FIG. 8A. FIGS. 8C-8E are plan views respectively illustrating layers of the touch sensing unit TS of FIG. 8B.

Referring to FIG. 8A, the touch sensing unit TS may include a first conductive layer (or first conductive patterns) TS-CL1, a first touch insulation layer TS-IL1, a second conductive layer (or second conductive patterns) TS-CL2, and a second touch insulation layer TS-IL2. The first conductive layer TS-CL1 may be directly disposed on the thin film encapsulation layer TFE. However, embodiments of the inventive concept are not limited thereto. For example, a buffer layer may be disposed between the first conductive layer TS-CL1 and the thin film encapsulation layer TFE, and the first conductive layer TS-CL1 may be disposed on the buffer layer. The buffer layer may include an inorganic layer and/or an organic layer.

Each of the first conductive layer TS-CL1 and the second conductive layer TS-CL2 may have a single-layered structure or a multi-layered structure in which a plurality of layers are stacked in the third directional axis DR3. The conductive layer having the multi-layered structure may include a transparent conductive layer and at least two metal layers. The at least two metal layers may include metals that are different from each other. The transparent conductive layer may include indium tin oxide (ITO), indium zinc oxide (IZO), zinc oxide (ZnO), indium tin zinc oxide (ITZO), poly(3,4-ethylenedioxythiophene) (PEDOT), a metal nanowire, and/or graphene. The metal layer may be formed of molybdenum, silver, titanium, copper, aluminum, and/or an alloy thereof.

Each of the first and second conductive layers TS-CL1 and TS-CL2 may include a plurality of patterns. Hereinafter, an example in which the first conductive layer TS-CL1 includes first conductive patterns, and the second conducive layer TS-CL2 includes second conductive patterns is described. Each of the first and second conductive layers TS-CL1 and TS-CL2 may include touch electrodes and touch signal lines.

Each of the first and second touch insulation layers TS-IL1 and TS-IL2 may be formed of inorganic and/or organic material. The inorganic material may include at least one of oxide, such as titanium oxide, silicon oxide, silicon oxide nitride, zirconium oxide and hafnium oxide. The organic material may include at least one of an acrylic-based resin, a methacrylic-based resin, a polyisoprene-based resin, a vinyl-based resin, an epoxy-based resin, a urethane-based resin, a cellulose-based resin, a siloxane-based resin, a polyimide-based resin, a polyamide-based resin, and a perylene-based resin.

Each of the first and second touch insulation layers TS-IL1 and TS-IL2 may have a single layer structure or multi-layered structure. Each of the first and second touch insulation layers TS-IL1 and TS-IL2 may include at least one of an inorganic layer and an organic layer. The inorganic layer and the organic layer may be formed through a chemical vapor deposition method.

When the first touch insulation layer TS-IL1 insulates the first and second conductive layers TS-CL1 and TS-CL2 from each other, embodiments of the inventive concept are not limited to the shape of the first touch insulation layer TS-IL1 as depicted in FIG. 8A. For example, the first touch insulation layer TS-IL1 may have any suitable shape according to the shapes of the first and second conductive patterns. The first touch insulation layer TS-IL1 may entirely cover the thin film encapsulation layer TFE (or may cover the thin film encapsulation layer TFE in its entirety) or may include a plurality of insulation patterns. The plurality of insulation patterns may only overlap first connection parts CP1 or may only overlap second connection parts CP2.

Although a two-layered touch sensing unit is illustrated as an example in the present embodiment, embodiments of the inventive concept are not limited thereto. A single layer touch sensing unit may include a conductive layer and an insulation layer covering the conductive layer. The conductive layer may include touch sensors and touch signal lines connected to the touch sensors. The single layer touch sensing unit may acquire coordinate information in a self-capacitance manner.

Referring to FIG. 8B, the touch sensing unit TS includes first touch electrodes TE1, first touch signal lines TSL1 connected to the first touch electrodes TE1, second touch electrodes TE2, second touch signal lines TSL2 connected to the second touch electrodes TE2, and touch pad parts TPD, each touch pad part TPD being connected to one of the first touch signal lines TSL1 or one of the second touch signal lines TSL2. The first touch electrodes TE1, the second touch electrodes TE2, and the first and second touch signal lines TSL1 and TSL2 may be disposed on (or in) the display area DA, and the touch pad parts TPD may be disposed on (or in) the non-display area NDA.

Each of the first touch electrodes TE1 may have a mesh shape in which a plurality of touch openings is defined. The first touch electrodes TE1 extend in (or along) the first direction DR1 and are arranged in (or along) the second direction DR2. Each of the first touch electrodes TE1 includes a plurality of first touch sensing parts SP1 and a plurality of first connection parts CP1. The first touch sensing parts SP1 are arranged in (or along) the first direction DR1. Each of the first connection parts CP1 connects two adjacent first touch sensing parts SP1. In some embodiments, each of the first touch signal lines TSL1 may also have a mesh shape.

The second touch electrodes TE2 are insulated from the first touch electrodes TE1 and cross the first touch electrodes TE1. Each of the second touch electrodes TE2 may have a mesh shape in which a plurality of touch openings is defined. The second touch electrodes TE2 extend in (or along) the second direction DR2 and are arranged in (or along) the first direction DR1. Each of the second touch electrodes TE2 includes a plurality of second touch sensing parts SP2 and a plurality of second connection parts CP2. The second touch sensing parts SP2 are arranged in (or along) the second direction DR2. Each of the second connection parts CP2 connects two adjacent second touch sensing parts SP2. In some embodiments, each of the second touch signal lines TSL2 may also have a mesh shape.

The first touch electrodes TE1 and the second touch electrodes TE2 are alternately disposed without overlapping each other. The first and second touch electrodes TE1 and TE2 are capacitance-coupled to each other. Because touch detection signals are applied to the first touch electrodes TE1, capacitors are disposed between the first touch sensing parts SP1 and the second touch sensing parts SP2.

Portions of the first touch sensing parts SP1, the first connection parts CP1, and the first touch signal lines TSL1 and portions of the second touch sensing parts SP2, the second connection parts CP2, and the second touch signal lines TSL2 may be formed by patterning the first conductive layer TS-CL1 (see FIG. 8A), and remaining portions of the first touch sensing parts SP1, the first connection parts CP1, and the first touch signal lines TSL1 and remaining portions of the second touch sensing parts SP2, the second connection parts CP2, and the second touch signal lines TSL2 may be formed by patterning the second conductive layer TS-CL2 (see FIG. 8A). To electrically connect the conductive patterns disposed on layers different from each other, a contact hole CH passing through the first touch insulation layer TS-IL1 (see FIG. 8D) may be defined.

Referring to FIG. 8C, the first conductive patterns TS-CL1 are disposed on the thin film encapsulation layer TFE. The first conductive patterns TS-CL1 may include bridge patterns CP1 corresponding to the first connection parts CP1 of FIG. 8B. The bridge patterns CP1 may be disposed on the thin film encapsulation layer TFE.

The first connection parts CP1 may not cross the second connection parts CP2, but may extend to cross the adjacent second touch sensing parts SP2. A specific shape of each of the first connection parts CP1 is described further below with reference to FIGS. 10A-10C.

Referring to FIG. 8D, the first touch insulation layer TS-IL1 covering the bridge patterns CP1 is disposed on the thin film encapsulation layer TFE. The contact holes CH that partially expose the bridge patterns CP1 are defined in the first touch insulation layer TS-IL1. The contact holes CH may be formed through a photolithography process.

Referring to FIG. 8E, the second conductive layer TS-CL2 is disposed on the first touch insulation layer TS-IL1. The second conductive layer TS-CL2 may include the first touch sensing parts SP1, the second connection parts CP2, the first touch signal lines TSL1, the second touch sensing part SP2, and the second touch signal lines TSL2. In some embodiments, the second touch insulation layer TS-IL2 covering the second conductive layer TS-CL2 is disposed on the first touch insulation layer TS-IL1. The first connection parts CP1 may connect the first touch sensing parts SP1 to each other through the plurality of contact holes CH defined to pass through the first touch insulation layer TS-IL1.

However, embodiments of the inventive concept are not limited thereto. For example, the first conductive layer TS-CL1 may include the first touch electrodes TE1, the first connection parts CP1, and the first touch signal lines TSL1. The second conductive layer TS-CL2 may include the second touch electrodes TE2, the second connection parts CP2, and the second touch signal lines TSL2. As such, the contact holes CH may not be defined in the first touch insulation layer TS-IL1 (e.g., the contact holes CH may be omitted). Also, in an embodiment of the inventive concept, the first conductive layer TS-CL1 and the second conductive layer TS-CL2 may be exchanged with each other. For example, the second conductive layer TS-CL2 may include the bridge patterns CP1.

Figure 9:
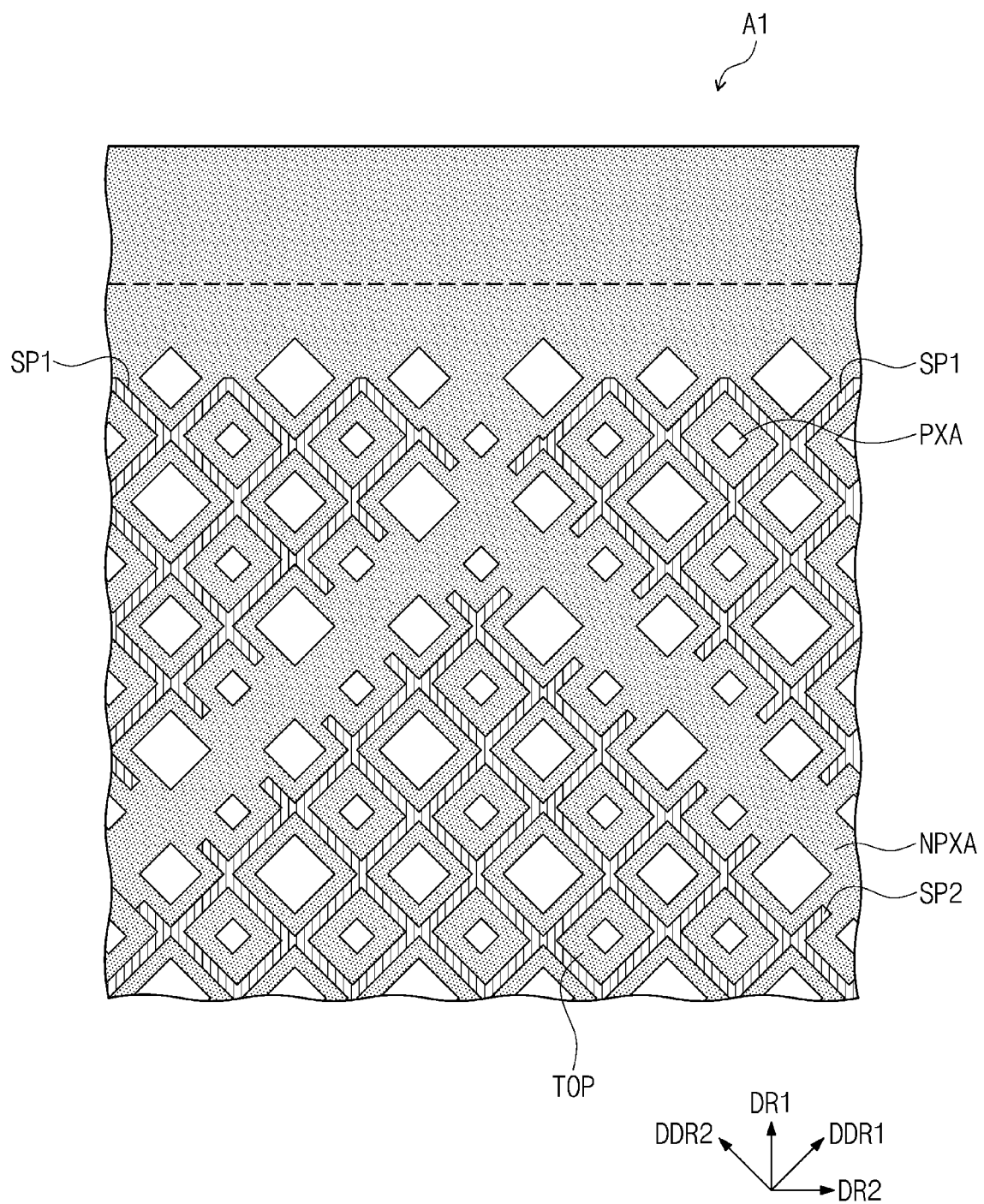
FIG. 9 is an enlarged view of a first area of FIG. 8B.

FIG. 9 is an enlarged view of a first area A1 illustrated in FIG. 8B.

FIG. 9 illustrates a shape of each of the pixels PX according to an embodiment of the inventive concept. For convenience of description, FIG. 9 illustrates a plan view of the pixels PX together with the first and second touch sensing parts SP1 and SP2.

The pixels PX include a plurality of pixel areas PXA and non-pixel areas NPXA around the pixel areas PXA. Each of the pixel areas PXA may correspond to the emission area PXA of FIG. 6C. The pixel areas PXA may display a red, a green, and/or a blue color. However, embodiments of the inventive concept are not limited thereto. For example, the pixel areas PXA may further include pixels for displaying a magenta, a cyan, and/or a white color. Each of the pixel areas PXA may have various sizes according to a color to be displayed thereon.

A direction crossing the first and second directions DR1 and DR2 on a plane parallel to the first and second directions DR1 and DR2 may be defined as a first diagonal direction DDR1. Also, a direction crossing the first diagonal direction DDR1 on the plane parallel to the first and second directions DR1 and DR2 may be defined as a second diagonal direction DDR2. Each of the pixel areas PXA may have a diamond shape, and the pixel areas PXA may be arranged in (or along) the first and second diagonal directions DDR1 and DDR2.

The first and second touch sensing parts SP1 and SP2 having the mesh shape may be disposed to overlap the non-pixel area NPXA. The first and second touch sensing parts SP1 and SP2 may define touch openings TOP. Each of the touch openings TOP of the first and second touch sensing parts SP1 and SP2 may have a shape corresponding to that of each of the pixel areas PXA, for example, each of the touch openings TOP may have a parallelogram or a diamond shape corresponding to that of each of the pixel areas PXA. The pixel areas PXA except for the pixel areas PXA, which are adjacent to surroundings of the first and second touch sensing parts SP1 and SP2, of the pixel areas PXA may overlap the touch openings TOP of the first and second touch sensing parts SP1 and SP2. Each of the touch openings TOP may have a size corresponding to that of the pixel areas PXA.

Figure 10A:
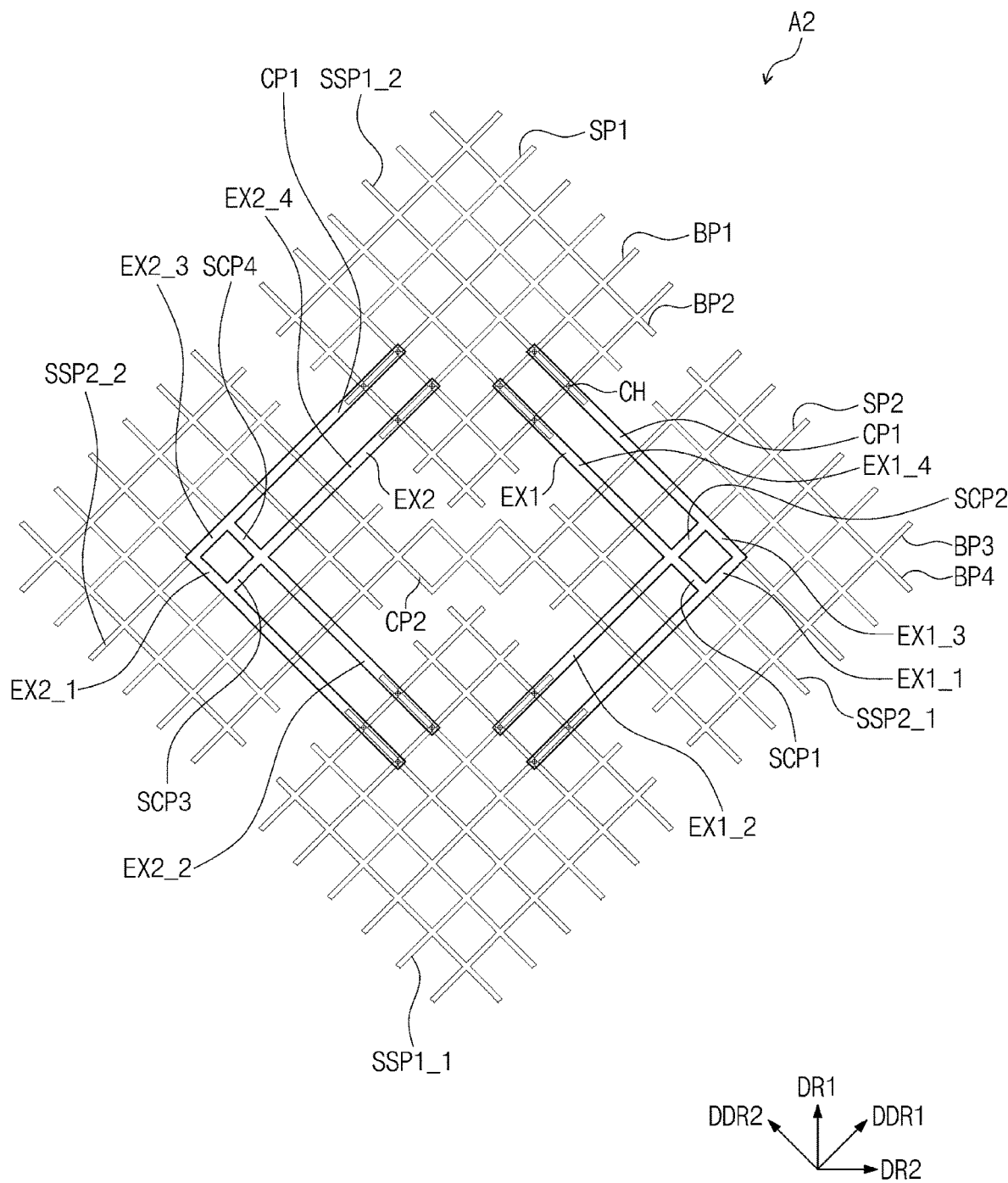
FIG. 10A is an enlarged view of a second area of FIG. 8B.
Figure 10B:
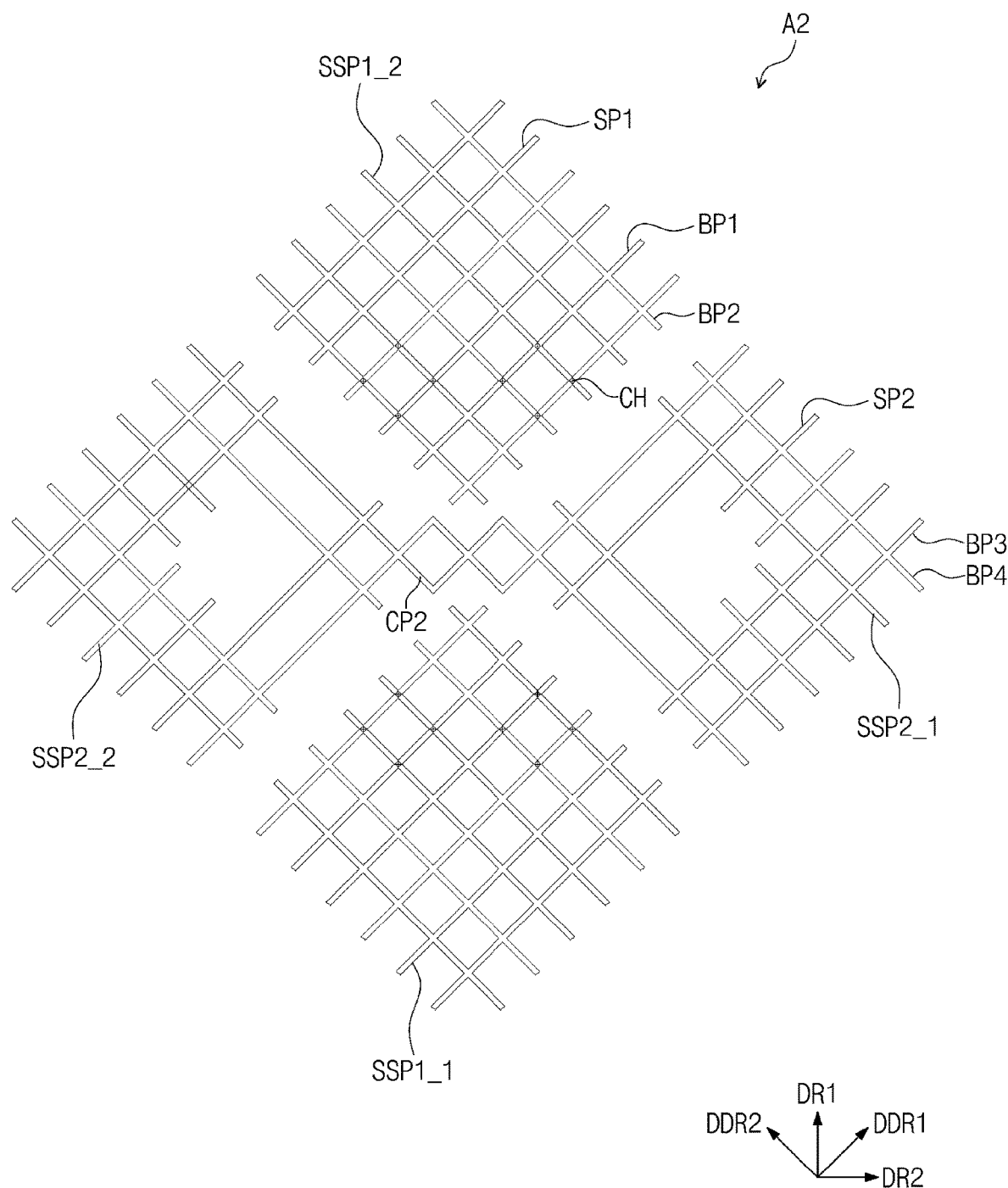
FIG. 10B is a plan view illustrating first and second touch sensing parts and a second connection part of the second area of FIG. 10A.
Figure 10C:
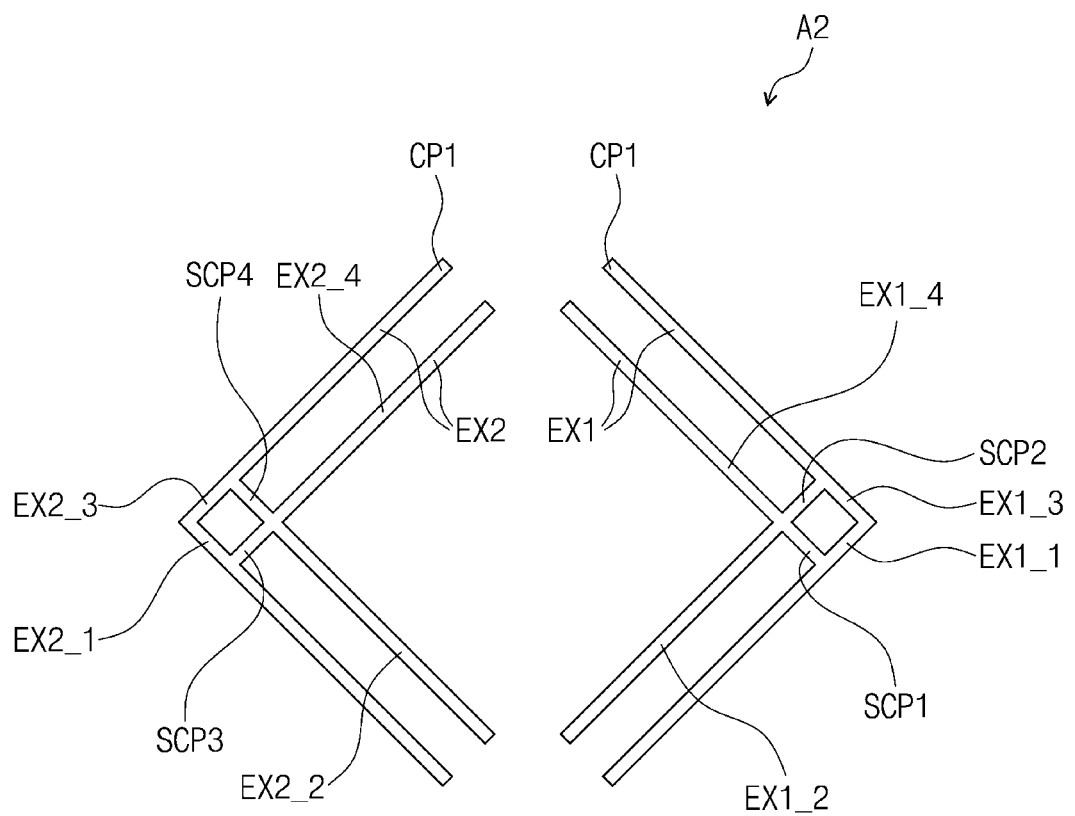
FIG. 10C is a plan view illustrating a first connection part of the second area of FIG. 10A.

FIG. 10A is an enlarged plan view of a second area A2 of FIG. 8B. FIG. 10B is a plan view illustrating the first and second touch sensing parts SP1 and SP2 and the second connection part CP2 of FIG. 10A. FIG. 10C is a plan view illustrating the first connection part CP1 of FIG. 10A.

For convenience of description, touch openings TOP of FIGS. 10A and 10B are illustrated in the same size and shape so that only the mesh shape is illustrated without the touch openings have sizes that are different from each other. However, embodiments of the present disclosure are not limited thereto.

Referring to FIGS. 10A, 10B, and 10C, the first connection part CP1 extends to connect two adjacent first touch sensing parts SP1 to each other without overlapping the second connection part CP2. The second connection part CP2 connects two adjacent second touch sensing parts SP2 to each other.

The second connection part CP2, the first touch sensing parts SP1, and the second touch sensing parts SP2 may be patterned at the same time (or concurrently) by using the same material. The first connection part CP1 extends to cross the second touch sensing parts SP2 at an area (e.g., a predetermined area) of each of the second touch sensing parts SP2 adjacent to the second connection part CP2 to connect the first touch sensing parts SP1 to each other. The first connection part CP1 is insulated from the second touch sensing parts SP2 by the first touch insulation layer TS-IL1. For example, in some areas of adjacent ones of the second touch sensing parts SP2, the first connection part CP1 extends parallel to a part of mesh lines of the adjacent ones of the second touch sensing parts SP2 and to cross another part of the mesh lines of adjacent ones of the second touch sensing parts SP2. As such, the first connection part CP1 may extend to cross the second touch sensing parts SP2 with the first touch insulation layer TS-IL1 therebetween.

For example, each of the first touch sensing parts SP1 includes a plurality of first branch parts BP1 extending in (or along) the first diagonal direction DDR1 and a plurality of second branch parts BP2 extending in (or along) the second diagonal direction DDR2 to cross the first branch parts BP1. The first branch parts BP1 and the second branch parts BP2 may be connected to each other to define the plurality of touch openings TOP. The first branch parts BP1 and the second branch parts BP2 may be integrated with each other (e.g., may be integrally formed). Each of the first and second branch parts BP1 and BP2 may be defined as a mesh line.

The first branch parts BP1 may extend further outwardly in (or along) the first diagonal direction DDR1 than outermost second branch parts BP2. The second branch parts BP2 may extend further outwardly in (or along) the second diagonal direction DDR2 than outermost first branch parts BP1.

Each of the second touch sensing parts SP2 may include a plurality of third branch parts BP3 extending in (or along) the first diagonal direction DDR1 and a plurality of fourth branch parts BP4 extending in (or along) the second diagonal direction DDR2 to cross the third branch parts BP3. The third branch parts BP3 and the fourth branch parts BP4 may be connected to each other to define the plurality of touch openings TOP. The third branch parts BP3 and the fourth branch parts BP4 may be integrated with each other (e.g., may be integrally formed). Each of the third branch parts BP3 and the fourth branch parts BP4 may be defined as a mesh line. The mesh line may have a line width of several micrometers.

The third branch parts BP3 may extend further outwardly in (or along) the first diagonal direction DDR1 than outermost fourth branch parts BP4. The fourth branch parts BP4 may extend further outwardly in (or along) the second diagonal direction DDR2 than outermost third branch parts BP3.

The first connection part CP1 includes a first extension part EX1 and a second extension part EX2 having a shape that is symmetrical (or substantially symmetrical) to that of the first extension part EX1. The first extension part EX1 and the second extension part EX2 may be disposed with the second connection part CP2 therebetween and thus may not overlap the second connection part CP2.

The adjacent first touch sensing parts SP1 may include a first sub-touch sensing part SSP1_1 and a second sub-touch sensing part SSP1_2 disposed above the first sub-touch sensing part SSP1_1 on the plane parallel to the first and second directions DR1 and DR2. The adjacent second touch sensing parts SP2 may include a third sub-touch sensing part SSP2_1 and a fourth sub-touch sensing part SSP2_2 disposed at a left side of the third sub-touch sensing part SSP2_1 on the plane parallel to the first and second directions DR1 and DR2.

The first extension part EX1 may cross one second touch sensing part SP2 (e.g., may cross the third sub-touch sensing part SSP2_1) of the adjacent second touch sensing parts SP2 to connect the adjacent first touch sensing parts SP1 to each other. The second extension part EX2 may cross the other second touch sensing part SP2 (e.g., may cross the fourth sub-touch sensing part SSP2_2) of the adjacent second touch sensing parts SP2 to connect the adjacent first touch sensing parts SP1 to each other.

An area (e.g., a predetermined area) of the first extension part EX1 at or near an end of the first extension part EX1 is connected to the first sub-touch sensing part SSP1_1 through the plurality of contact holes CH. An area (e.g., a predetermined area) of the first extension part EX1 at or near an opposite end of the first extension part EX1 is connected to the second sub-touch sensing part SSP1_2 through the plurality of contact holes CH.

An area (e.g., a predetermined area) of the second extension part EX2 at or near an end of the second extension part EX2 is connected to the first sub-touch sensing part SSP1_1 through the plurality of contact holes CH. An area (e.g., a predetermined area) of the second extension part EX2 at or near an opposite end of the second extension part EX2 is connected to the second sub-touch sensing part SSP1_2 through the plurality of contact holes CH. The first extension part EX1 may extend to cross the third sub-touch sensing part SSP2_1. The second extension part EX2 may extend to cross the fourth sub-touch sensing part SSP2_2.

The first extension part EX1 includes first and second sub-extension parts EX1_1 and EX1_2 extending in (or along) the first diagonal direction DDR1, third and fourth sub-extension parts EX1_3 and EX1_4 extending in (or along) the second diagonal direction DDR2, a first sub-connection part SCP1 extending in (or along) the second diagonal direction DDR2, and a second sub-connection part SCP2 extending in (or along) the first diagonal direction DDR1. The second sub-extension part EX1_2 has a length that is less than that of the first sub-extension part EX1_1, and the fourth sub-extension part EX1_4 has a length that is less than that of the third sub-extension part EX1_3. According to some embodiments of the present invention, a length of the first sub-extension part EX1_1 may be equal to that of the third sub-extension part EX1_3, and a length of the second sub-extension part EX1_2 may be equal to that of the fourth sub-extension part EX1_4.

An area (e.g., a predetermined area) of the first sub-extension part EX1_1 at or near a first end of the first sub-extension part EX1_1 is connected to the first sub-touch sensing part SSP1_1 through the plurality of contact holes CH. An area (e.g., a predetermined area) of the second sub-extension part EX1_2 at or near a first end of the second sub-extension part EX1_2 is connected to the first sub-touch sensing part SSP1_1 through the plurality of contact holes CH. For example, although the first and second sub-extension parts EX1_1 and EX1_2 may be connected to the first sub-touch sensing part SSP1_1 through two contact holes CH, respectively, the number of contact holes CH is not limited thereto. For example, additional contact holes CH may be provided.

An area (e.g., a predetermined area) of the third sub-extension part EX1_3 at or near a first end of the third sub-extension part EX1_3 is connected to the second sub-touch sensing part SSP1_2 through the plurality of contact holes CH. An area (e.g., a predetermined area) of the fourth sub-extension part EX1_4 at or near a first end of the fourth sub-extension part EX1_4 is connected to the second sub-touch sensing part SSP1_2 through the plurality of contact holes CH. For example, although the third and fourth sub-extension parts EX1_3 and EX1_4 may be connected to the second sub-touch sensing part SSP1_2 through two contact holes CH, respectively, the number of contact holes CH is not limited thereto. For example, additional contact holes CH may be provided.

A second end (e.g., an end opposite to the first end) of the first sub-extension part EX1_1 is connected to a second end (e.g., an end opposite to the first end) of the third sub-extension part EX1_3, and a second end (e.g., an end opposite to the first end) of the second sub-extension part EX1_2 is connected to a second end (e.g., an end opposite to the first end) of the fourth sub-extension part EX1_4. The first sub-connection part SCP1 extends from a second end (e.g., an end opposite to the first end) of the fourth sub-extension part EX1_4 in (or along) the second diagonal direction DDR2 and is connected to the first sub-extension part EX1_1. The second sub-connection part SCP2 extends from a second end (e.g., an end opposite to the first end) of the second sub-extension part EX1_2 in (or along) the first diagonal direction DDR1 and is connected to the third sub-extension part EX1_3.

The first sub-extension part EX1_1, the second sub-extension part EX1_2, the third sub-extension part EX1_3, the fourth sub-extension part EX1_4, the first sub-connection part SCP1, and the second sub-connection part SCP2 may be integrated with each other (e.g., may be integrally formed).

The first and second sub-extension parts EX1_1 and EX1_2 may extend to cross ones of the fourth branch parts BP4 (e.g., a predetermined number of the fourth branch parts BP4) of the third sub-touch sensing part SSP2_1. For example, although two of the fourth branch parts BP4 cross the first and second sub-extension parts EX1_1 and EX1_2 in FIG. 10A, the number of fourth branch parts BP4 that cross the first and second sub-extension parts EX1_1 and EX1_2 is not limited thereto. The third branch parts BP3 of the third sub-touch sensing part SSP2_1 may not be disposed on (or in) areas that overlap the first and second sub-extension parts EX1_1 and EX1_2 and the second sub-connection part SCP2.

The third and fourth sub-extension parts EX1_3 and EX1_4 may extend to cross ones of the third branch parts BP3 (e.g., a predetermined number of third branch parts BP3) of the third sub-touch sensing part SSP2_1. For example, although two of the third branch parts BP3 cross the third and fourth sub-extension parts EX1_3 and EX1_4 in FIG. 10A, the number of third branch parts BP3 that cross the third and fourth sub-extension parts EX1_3 and EX1_4 is not limited thereto. The fourth branch parts BP4 of the third sub-touch sensing part SSP2_1 may not be disposed on areas that overlap the third and fourth sub-extension parts EX1_3 and EX1_4 and the first sub-connection part SCP1.

As used herein, each of a configuration in which the first and second sub-extension parts EX1_1 and EX1_2 are disposed to cross the fourth branch parts BP4 and a configuration in which the third and fourth sub-extension parts EX1_3 and EX1_4 are disposed to cross the third branch parts BP3 may be referred to as a "point-overlapping" configuration.

The second extension part EX2 includes fifth and sixth sub-extension parts EX2_1 and EX2_2 extending in (or along) the second diagonal direction DDR2, seventh and eighth sub-extension parts EX2_3 and EX2_4 extending in (or along) the first diagonal direction DDR1, a third sub-connection part SCP3 extending in (or along) the first diagonal direction DDR1, and a fourth sub-connection part SCP4 extending in (or along) the second diagonal direction DDR2.

Because the second extension part EX2 has a structure that is symmetrical (or substantially symmetrical) to the first extension part EX1, the fifth to eighth sub-extension parts EX2_1, EX2_2, EX2_3 and EX2_4 and the third and fourth sub-connection parts SCP3 and SCP4 may have structures that are symmetrical (or substantially symmetrical) to the first to fourth sub-extension parts EX1_1, EX1_2, EX1_3, and EX1_4 and the first and second sub-connection parts SCP1 and SCP2, respectively. Thus, an area (e.g., a predetermined area) of each of the fifth to eighth sub-extension parts EX2_1, EX2_2, EX2_3, and EX2_4, at or near a first end of each of the fifth to eighth sub-extension parts EX2_1, EX2_2, EX2_3, and EX2_4, is connected to one of the first and second sub-touch sensing parts SSP1_1 and SSP1_2 through the plurality of contact holes CH.

The fifth to eighth sub-extension parts EX2_1, EX2_2, EX2_3, and EX2_4 may connect the first and second sub-touch sensing parts SSP1_1 and SSP1_2 to each other via the fourth sub-touch sensing part SSP2_2 in the same (or substantially the same) manner in which the first to fourth sub-extension parts EX1_1, EX1_2, EX1_3, and EX1_4 connect the first and second sub-touch sensing parts SSP1_1 and SSP1_2 to each other via the third sub-touch sensing part SSP2_1. The third and fourth branch parts BP3 and BP4 of the fourth sub-touch sensing part SSP2_2 may not be disposed on areas that overlap the fifth to eighth sub-extension parts EX2_1, EX2_2, EX2_3, and EX2_4 and the third and fourth connection parts SCP3 and SCP4.

Because the second extension part EX2 has a structure that is symmetrical (or substantially symmetrical) to the first extension part EX1, additional description of the second extension part EX2 may be omitted.

The second connection part CP2 has a mesh structure and connects the third sub-touch sensing part SSP2_1 to the fourth sub-touch sensing part SSP2_2. Although the second connection part CP2 having a configuration in which two diamond (or parallelogram) shapes are connected to each other is illustrated in FIG. 10A, the configuration of the second connection part CP2 is not limited thereto.

When the first connection part CP1 having the mesh shape extends to overlap the second connection part CP2 and is connected to the first touch sensing parts SP1, a portion (e.g., a predetermined portion) of the first connection part CP1 may line-overlap a portion (e.g., a predetermined portion) of the second connection part CP2. As used herein, the term "line-overlapping" may be defined as a state in which a branch part of the first connection part CP1 and a branch part of the second connection part CP2, which extend in the same direction, overlap each other.

In some embodiments, a capacitor may be disposed between the first connection part CP1 and the second connection part CP2 to increase parasitic capacitance. When the parasitic capacitance increases, the touch sensing signal may not be normally outputted. Also, the first connection part CP1 and the second connection part CP2 may be short-circuited at the line-overlapping portion during the manufacturing process. As a result, the touch sensing unit TS may have reduced reliability.

In an embodiment of the inventive concept, the first connection part CP1 does not overlap the second connection part CP2 and extends to point-overlap the second touch sensing parts SP2 adjacent thereto to connect the adjacent first touch sensing parts SP1 to each other. Thus, the parasitic capacitance of the touch sensing unit TS may be reduced. Also, because the short-circuit between the first and second connection parts CP1 and CP2 during the manufacturing process is prevented (or a likelihood thereof is reduced), the touch sensing unit TS may have improved reliability. As a result, the display apparatus DD may have improved reliability.

FIGS. 11-24 are plan views illustrating a portion of the touch sensing unit according to various embodiments of the inventive concept.

For convenience of description, FIGS. 11-24 illustrate plan views corresponding to the second area A2 of FIG. 10A.

Hereinafter, constitutions of the touch sensing unit according to various embodiments of the inventive concept will be described with reference to FIGS. 11-24. Differences between the touch sensing unit of FIGS. 11-24 according to various embodiments and the touch sensing unit TS of FIGS. 10A-10C are primarily described, and non-explained portions refer to the descriptions related to the touch sensing unit TS of FIG. 8B and FIGS. 10A-10C.

Figure 11:
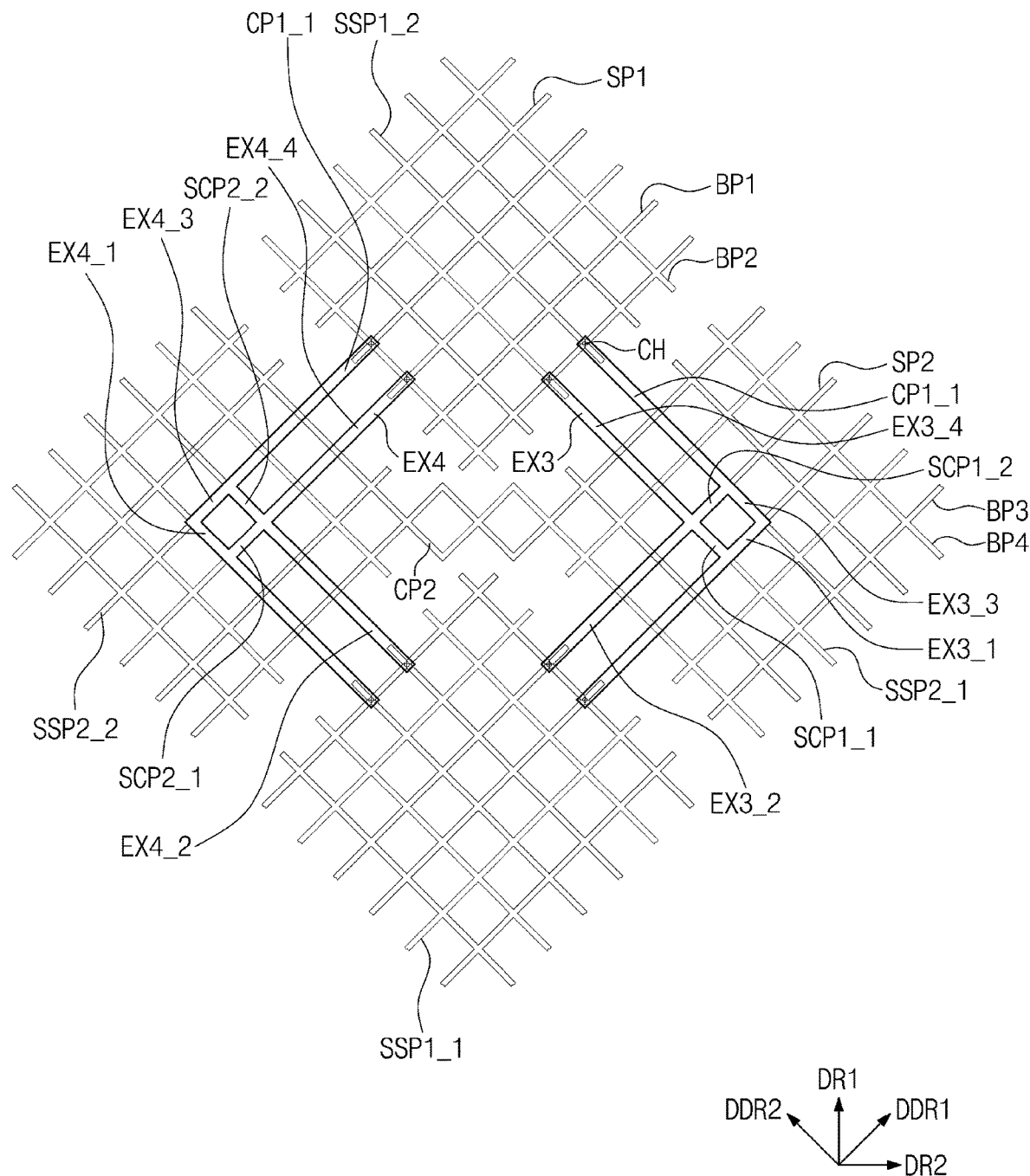
FIGS. 11-24 are plan views illustrating a portion of a touch sensing unit according to various embodiments of the inventive concept.

Referring to FIG. 11, a first connection part CP1_1 includes first and second extension parts EX3 and EX4 with a second connection part CP2 therebetween. The first and second extension parts EX3 and EX4 are symmetrical (or substantially symmetrical) to each other.

The first extension part EX3 includes first, second, third, and fourth sub-extension parts EX3_1, EX3_2, EX3_3, and EX3_4 and first and second sub-connection parts SCP1_1 and SCP1_2. Each of the first and third sub-extension parts EX3_1 and EX3_3 has a length that is less than that of each of the first and third sub-extension parts EX1_1 and EX1_3 of FIG. 10A, and each of the second and fourth sub-extension parts EX3_2 and EX3_4 has a length that is less than that of each of the second and fourth sub-extension parts EX1_2 and EX1_4 of FIG. 10A. Each of the second and fourth sub-extension parts EX3_2 and EX3_4 has a length that is less than that of each of the first and third sub-extension parts EX3_1 and EX3_3.

An area (e.g., a predetermined area) of each of the first to fourth sub-extension parts EX3_1, EX3_2, EX3_3, and EX3_4 at or near respective first ends of each of the first to fourth sub-extension parts EX3_1, EX3_2, EX3_3, and EX3_4 is respectively connected to one of the first and second sub-touch sensing parts SSP1_1 and SSP1_2 through one contact hole CH. Other constituents of the first extension part EX3 may be substantially the same as those of the first extension part EX1 of FIG. 10A, and thus, additional description with respect to the first extension part EX3 may be omitted.

The second extension part EX4 includes fifth, sixth, seventh, and eighth sub-extension parts EX4_1, EX4_2, EX4_3, and EX4_4 and third and fourth sub-connection parts SCP2_1 and SCP2_2. Each of the fifth and seventh sub-extension parts EX4_1 and EX4_3 has a length that is less than that of each of the fifth and seventh sub-extension parts EX2_1 and EX2_3 of FIG. 10A, and each of the sixth and eighth sub-extension parts EX4_2 and EX4_4 has a length that is less than that of each of the sixth and eighth sub-extension parts EX2_2 and EX2_4 of FIG. 10A. Each of the sixth and eighth sub-extension parts EX4_2 and EX4_4 has a length that is less than that of each of the fifth and seventh sub-extension parts EX4_1 and EX4_3.

An area (e.g., a predetermined area) of each of the fifth to eighth sub-extension parts EX4_1, EX4_2, EX4_3, and EX4_4 at or near respective first ends of each of the fifth to eighth sub-extension parts EX4_1, EX4_2, EX4_3, and EX4_4, is respectively connected to one of the first and second sub-touch sensing parts SSP1_1 and SSP1_2 through one contact hole CH. Other constituents of the second extension part EX4 may be substantially the same as those of the second extension part EX2 of FIG. 10A, and thus, additional description with respect to the second extension part EX4 may be omitted.

Figure 12:
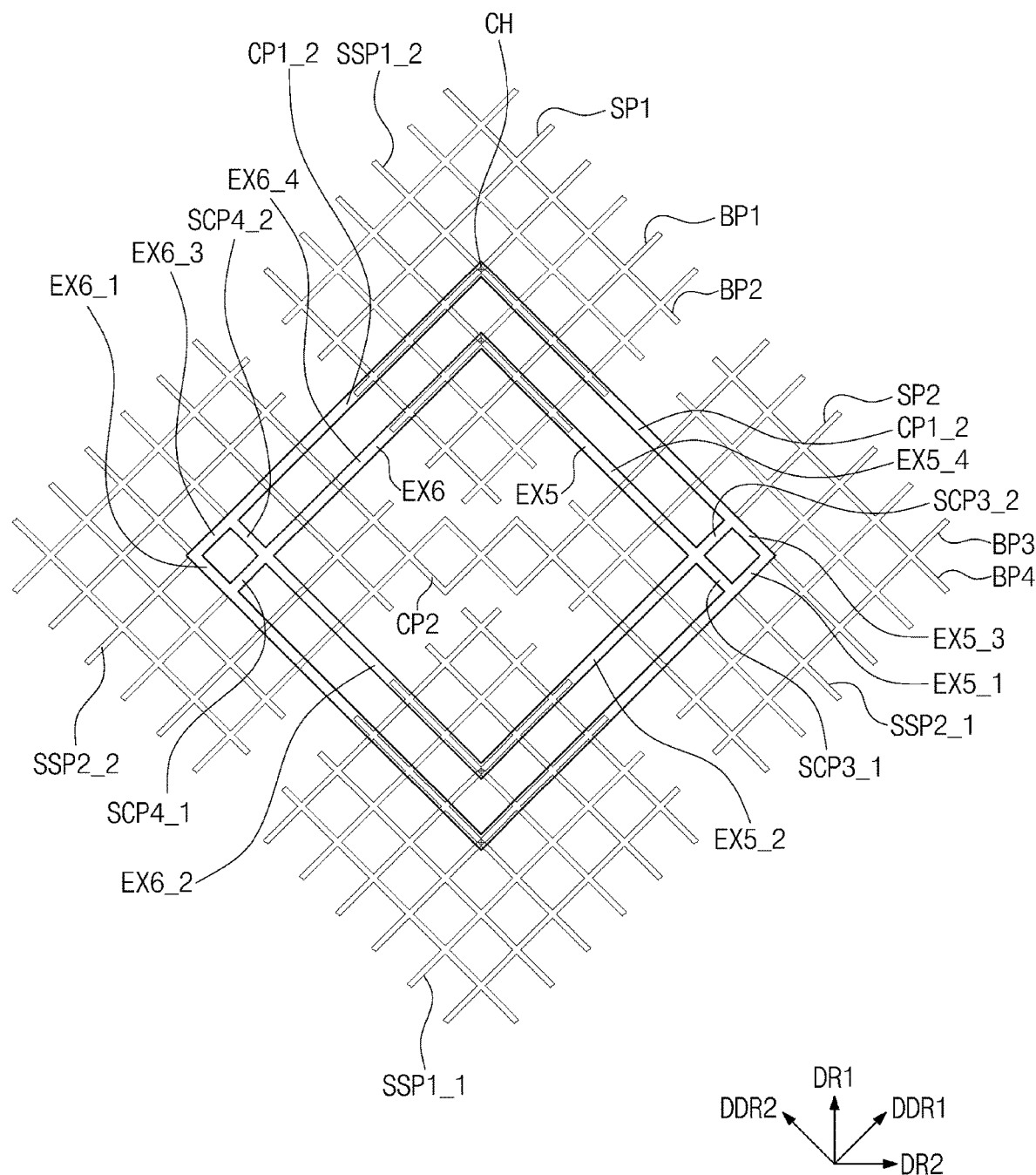

Referring to FIG. 12, a first connection part CP1_2 includes first and second extension parts EX5 and EX6 with a second connection part CP2 therebetween. The first and second extension parts EX5 and EX6 are symmetrical (or substantially symmetrical) to each other.

The first extension part EX5 includes first, second, third, and fourth sub-extension parts EX5_1, EX5_2, EX5_3, and EX5_4 and first and second sub-connection parts SCP3_1 and SCP3_2. Each of the first and third sub-extension parts EX5_1 and EX5_3 has a length that is greater than that of each of the first and third sub-extension parts EX1_1 and EX1_3 of FIG. 10A, and each of the second and fourth sub-extension parts EX5_2 and EX5_4 has a length that is greater than that of each of the second and fourth sub-extension parts EX1_2 and EX1_4 of FIG. 10A. Each of the second and fourth sub-extension parts EX5_2 and EX5_4 has a length that is less than that of each of the first and third sub-extension parts EX5_1 and EX5_3.

The second extension part EX6 includes fifth, sixth, seventh, and eighth sub-extension parts EX6_1, EX6_2, EX6_3, and EX6_4 and third and fourth sub-connection parts SCP4_1 and SCP4_2. Each of the fifth and seventh sub-extension parts EX6_1 and EX6_3 has a length that is greater than that of each of the fifth and seventh sub-extension parts EX2_1 and EX2_3 of FIG. 10A, and each of the sixth and eighth sub-extension parts EX6_2 and EX6_4 has a length that is greater than that of each of the sixth and eighth sub-extension parts EX2_2 and EX2_4 of FIG. 10A. Each of the sixth and eighth sub-extension parts EX6_2 and EX6_4 has a length that is less than that of each of the fifth and seventh sub-extension parts EX6_1 and EX6_3.

A first end of the first sub-extension part EX5_1 is connected to a first end of the fifth sub-extension part EX6_1, and a first end of the second sub-extension part EX5_2 is connected to a first end of the sixth sub-extension part EX6_2. A first end of the third sub-extension part EX5_3 is connected to a first end of the seventh sub-extension part EX6_3, and a first end of the fourth sub-extension part EX5_4 is connected to a first end of the eighth sub-extension part EX6_4.

The first end of the first sub-extension part EX5_1 and the first end of the fifth sub-extension part EX6_1 may share one contact hole CH and may be connected to the first sub-touch sensing part SSP1_1. The first end of the second sub-extension part EX5_2 and the first end of the sixth sub-extension part EX6_2 may share one contact hole CH and may be connected to the first sub-touch sensing part SSP1_1.

The first end of the third sub-extension part EX5_3 and the first end of the seventh sub-extension part EX6_3 may share one contact hole CH and may be connected to the second sub-touch sensing part SSP1_2. The first end of the fourth sub-extension part EX5_4 and the first end of the eighth sub-extension part EX6_4 may share one contact hole CH and may be connected to the second sub-touch sensing part SSP1_2. Other constituents of the first and second extension parts EX5 and EX6 may be substantially the same as those of the first and second extension part EX1 and EX2 of FIG. 10A, and thus, additional descriptions with respect to the first and second extension parts EX5 and EX6 may be omitted.

Figure 13:
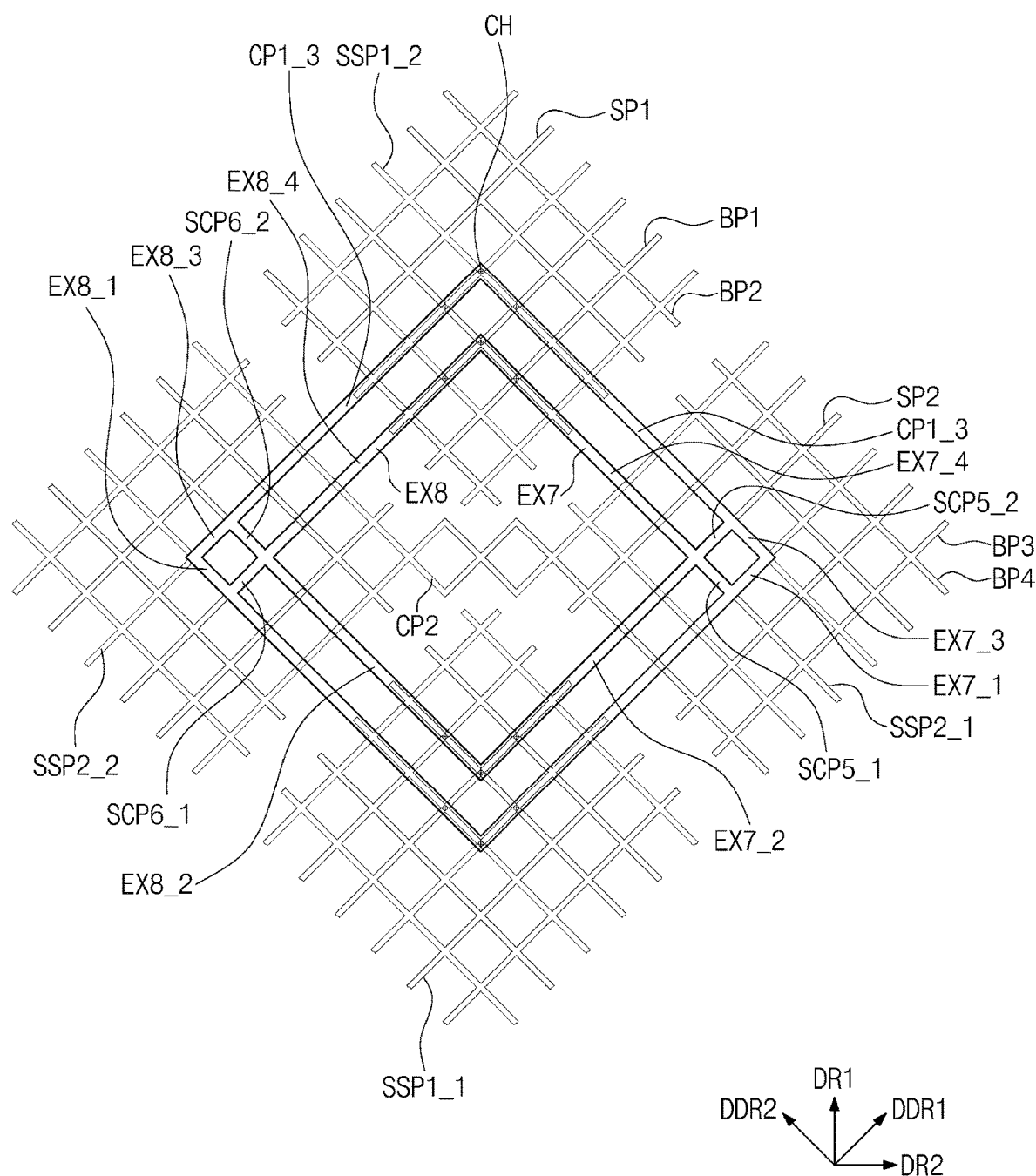

Referring to FIG. 13, a first extension part EX7 of a first connection part CP1_3 includes first, second, third, and fourth sub-extension parts EX7_1, EX7_2, EX7_3, and EX7_4 and first and second sub-connection parts SCPS_1 and SCPS_2, and a second extension part EX8 of the first connection part CP1_3 includes fifth, sixth, seventh, and eighth sub-extension parts EX8_1, EX8_2, EX8_3, and EX8_4 and third and fourth sub-connection parts SCP6_1 and SCP6_2.

The first and second extension parts EX7 and EX8 may have substantially the same constitution as the first and second extension parts EX5 and EX6 of FIG. 12 except for the number of contact holes CH that are provided to connect the first and second extension parts EX7 and EX8 to the first and second sub-touch sensing parts SSP1_1 and SSP1_2.

For example, first ends of the first and fifth sub-extension parts EX7_1 and EX8_1 may share one contact hole CH and may be connected to the first sub-touch sensing part SSP1_1, and first ends of the second and sixth sub-extension parts EX7_2 and EX8_2 may share one contact hole CH and may be connected to the first sub-touch sensing part SSP1_1. For example, first ends of the third and seventh sub-extension parts EX7_3 and EX8_3 may share one contact hole CH and may be connected to the second sub-touch sensing part SSP1_2, and first ends of the fourth and eighth sub-extension parts EX7_4 and EX8_4 may share one contact hole CH and may be connected to the second sub-touch sensing part SSP1_2.

Also, an area (e.g., a predetermined area) of the first sub-extension part EX7_1 at or near the first end of the first sub-extension part EX7_1, an area (e.g., a predetermined area) of the second sub-extension part EX7_2 at or near the first end of the second sub-extension part EX7_2, an area (e.g., a predetermined area) of the fifth sub-extension part EX8_1 at or near the first end of the fifth sub-extension part EX8_1, and an area (e.g., a predetermined area) of the sixth sub-extension part EX8_2 at or near the first end of the sixth sub-extension part EX8_2 may be connected to the first sub-touch sensing part SSP1_1 through the plurality of contact holes CH. Although four contact holes CH are illustrated in FIG. 13, the number of contact holes CH is not limited thereto.

Also, an area (e.g., a predetermined area) of the third sub-extension part EX7_3 at or near the first end of the third sub-extension part EX7_3, an area (e.g., a predetermined area) of the fourth sub-extension part EX7_4 at or near the first end of the fourth sub-extension part EX7_4, an area (e.g., a predetermined area) of the seventh sub-extension part EX8_3 at or near the first end of the seventh sub-extension part EX8_3, and an area (e.g., a predetermined area) of the eighth sub-extension part EX8_4 at or near the first end of the eighth sub-extension part EX8_4 may be connected to the second sub-touch sensing part SSP1_2 through the plurality of contact holes CH. Although four contact holes CH are illustrated in FIG. 13, the number of contact holes CH is not limited thereto.

Figure 14:
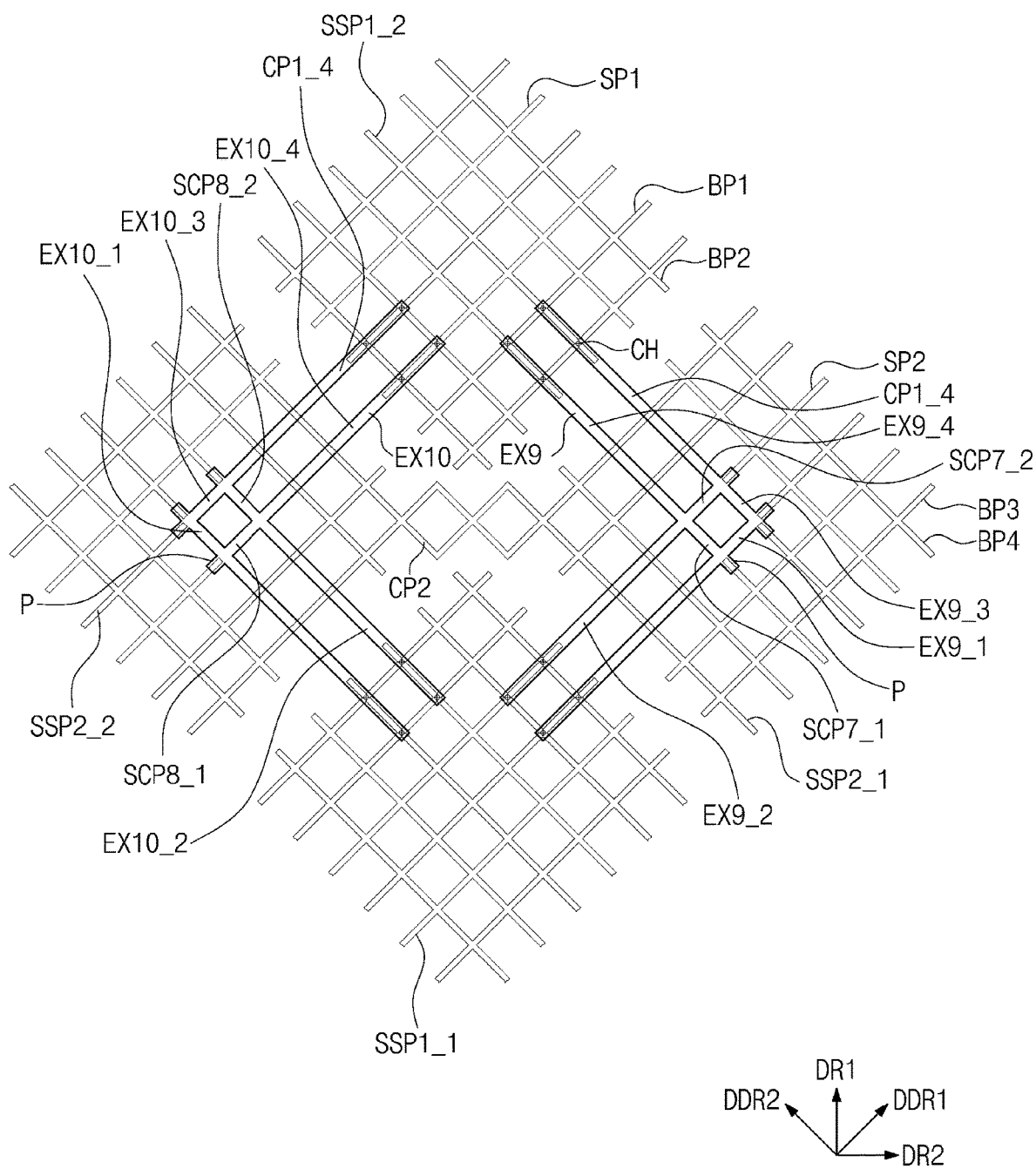

Referring to FIG. 14, the first and second touch sensing parts SP1 and SP2 and the first and second connection parts CP1_4 and CP2, which are illustrated in FIG. 14, are disposed on the bent area BA. Referring to FIG. 14, a first extension part EX9 of a first connection part CP1_4 includes first, second, third, and fourth sub-extension parts EX9_1, EX9_2, EX9_3, and EX9_4 and first and second sub-connection parts SCP7_1 and SCP7_2, and a second extension part EX10 of the first connection part CP1_4 includes fifth, sixth, seventh, and eighth sub-extension parts EX10_1, EX10_2, EX10_3, and EX10_4 and third and fourth sub-connection parts SCP8_1 and SCP8_2.

Also, the first extension part EX9 includes a plurality of protrusions P, which respectively protrude from a connection portion between the first sub-extension part EX9_1 and the third sub-extension part EX9_3 in (or along) the first and second diagonal directions DDR1 and DDR2, from the first sub-connection part SCP7_1 in (or along) the second diagonal direction DDR2 to protrude further outwardly than the first sub-extension part EX9_1, and from the second sub-connection part SCP7_2 in (or along) the first diagonal direction DDR1 to protrude further outwardly than the third sub-extension part EX9_3.

Because the second extension parts EX10 are symmetrical (or substantially symmetrical) to the first extension parts EX9 and have substantially the same constitution as the first extension parts EX9, the second extension parts EX10 may also include a plurality of protrusions P that are symmetrical (or substantially symmetrical) to the protrusions P of the first extension parts EX9. The first and second extension parts EX9 and EX10 may have the same (or substantially the same) constitution (or configuration) as the first and second extension parts EX1 and EX2 of FIG. 10A except for the protrusions P.

The protrusions P are disposed to overlap adjacent third and fourth branch parts BP3 and BP4. When the protrusions P are not provided, and the bent area BA is bent, cracks may occur in boundaries between the first and third sub-extension parts EX9_1 and EX9_3 and boundaries between the fifth and seventh sub-extension parts EX10_1 and EX10_3 at the third and fourth branch parts BP3 and BP4. However, because the protrusions P are disposed to overlap the adjacent third and fourth branch parts BP3 and BP4, the occurrence of cracks in the boundaries between the first and third sub-extension parts EX9_1 and EX9_3 and the boundaries between the fifth and seventh sub-extension parts EX10_1 and EX10_3 at the third and fourth branch parts BP3 and BP4 may be prevented (or the likelihood thereof may be reduced).

Figure 15:
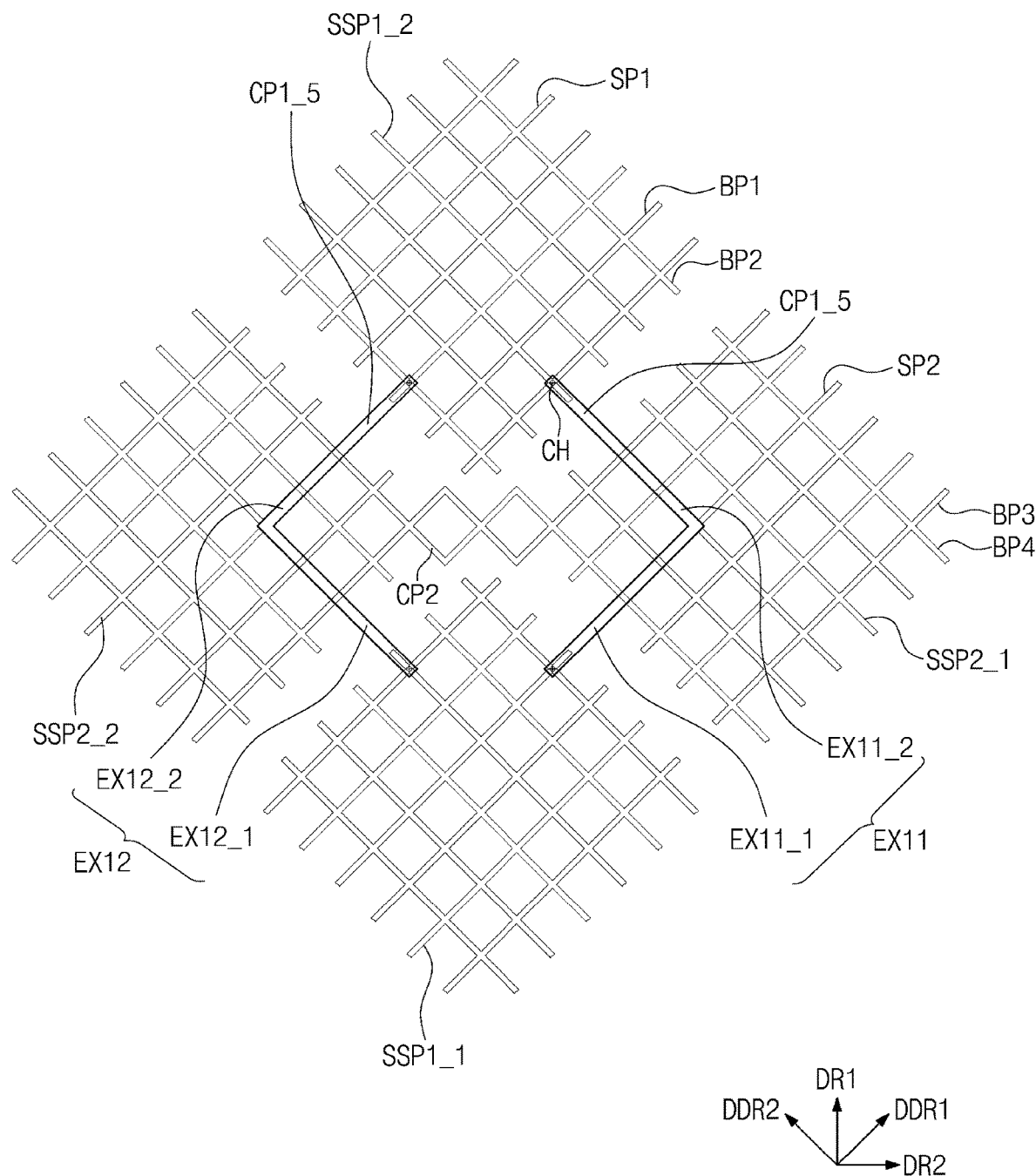

Referring to FIG. 15, a first connection part CP1_5 includes first and second extension parts EX11 and EX12 with a second connection part CP2 therebetween.

The first extension part EX11 includes first and second sub-extension parts EX11_1 and EX11_2 respectively extending in (or along) the first and second diagonal directions DDR1 and DDR2, and the second extension part EX12 includes third and fourth sub-extension parts EX12_1 and EX12_2 respectively extending in (or along) the second and first diagonal directions DDR2 and DDR1. The first and second sub-extension parts EX11_1 and EX11_2 are symmetrical (or substantially symmetrical) to the third and fourth sub-extension parts EX12_1 and EX12_2, respectively.

An area (e.g., a predetermined area) of each of the first and third sub-extension parts EX11_1 and EX12_1 at or near respective first ends of each of the first and third sub-extension parts EX11_1 and EX12_1 is respectively connected to the first sub-touch sensing part SSP1_1. An area (e.g., a predetermined area) of each of the second and fourth sub-extension parts EX11_2 and EX12_2 at or near respective first ends of each of the second and fourth sub-extension parts EX11_2 and EX12_2 is respectively connected to the second sub-touch sensing part SSP1_2. A second end (e.g., an end opposite to the first end) of the first sub-extension part EX11_1 is connected to a second end (e.g., an end opposite to the first end) of the second sub-extension part EX11_2, and a second end (e.g., an end opposite to the first end) of the third sub-extension part EX12_1 is connected to a second end (e.g., an end opposite to the first end) of the fourth sub-extension part EX12_2.

An area (e.g., a predetermined area) of each of the first to fourth sub-extension parts EX11_1, EX11_2, EX12_1, and EX12_2 at or near the respective first ends of each of the first to fourth sub-extension parts EX11_1, EX11_2, EX12_1, and EX12_2 is respectively connected to one of the first or second sub-touch sensing parts SSP1_1 or SSP1_2 through one contact hole CH.

A configuration in which the first extension part EX11 crosses the third sub-touch sensing part SSP2_1 and a configuration in which the second extension part EX12 crosses the fourth sub-touch sensing part SSP2_2 are substantially the same as that in which the first and second extension parts EX1 and EX2 of FIG. 10A cross the third and fourth sub-touch sensing parts SSP2_1 and SSP2_2, and thus, additional description thereof may be omitted.

Figure 16:
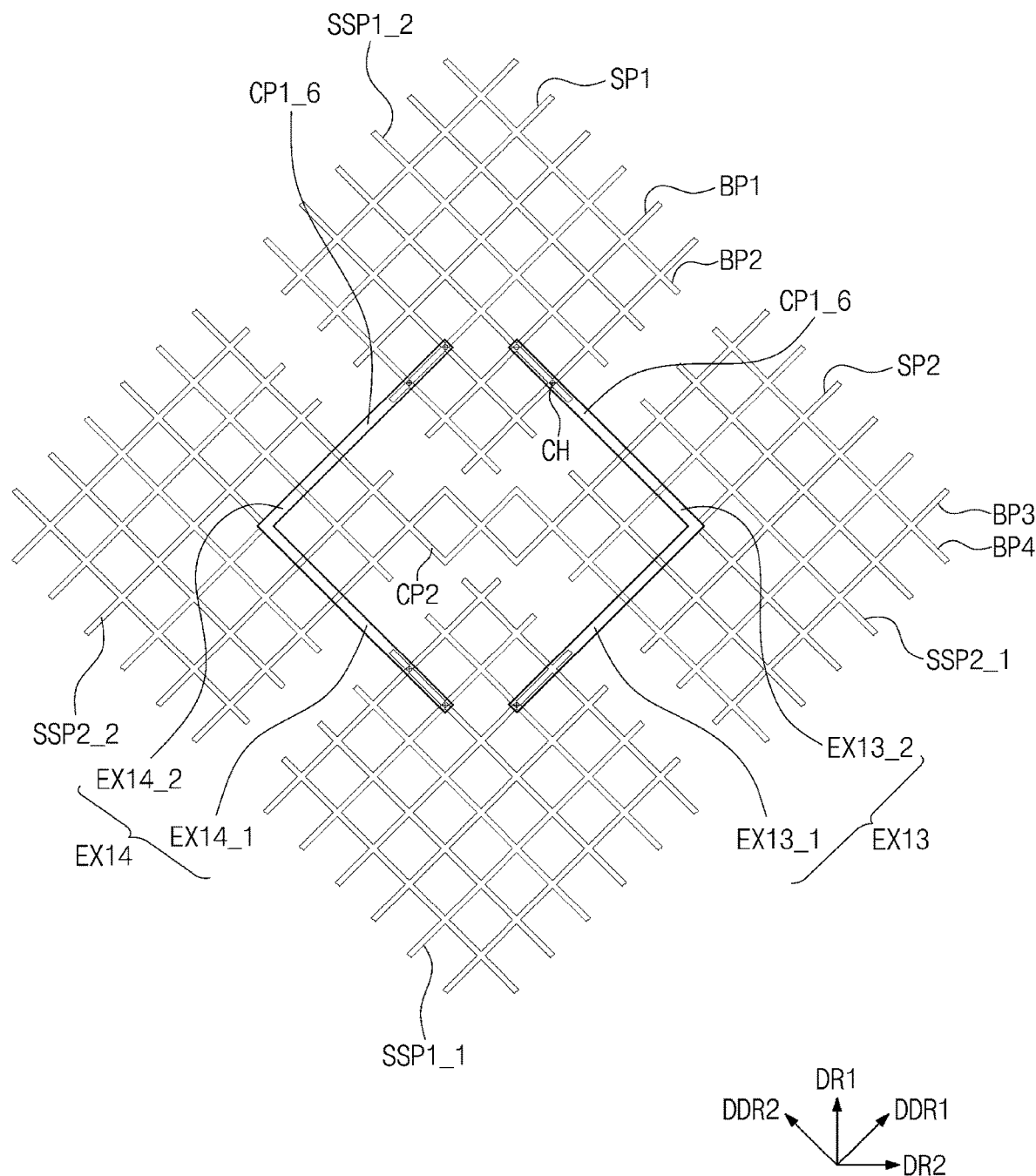

Referring to FIG. 16, a first extension part EX13 of a first connection part CP1_6 includes first and second sub-extension parts EX13_1 and EX13_2, and a second extension part EX14 of the first connection part CP1_6 includes third and fourth sub-extension parts EX14_1 and EX14_2. Each of the first to fourth sub-extension parts EX13_1, EX13_2, EX14_1, and EX14_2 has a length that is greater than that of each of the first to fourth sub-extension parts EX11_1, EX11_2, EX12_1, and EX12_2 of FIG. 15.

An area (e.g., a predetermined area) of each of the first to fourth sub-extension parts EX13_1, EX13_2, EX14_1, and EX14_2 at or near respective first ends of each of the first to fourth sub-extension parts EX13_1, EX13_2, EX14_1, and EX14_2 is respectively connected to one of the first or second sub-touch sensing parts SSP1_1 or SSP1_2 through one contact hole CH. Other constituents of the first and second extension parts EX13 and EX14 may be substantially the same as those of the first and second extension part EX11 and EX12 of FIG. 15, and thus, additional descriptions with respect to the first and second extension parts EX13 and EX14 may be omitted.

Figure 17:
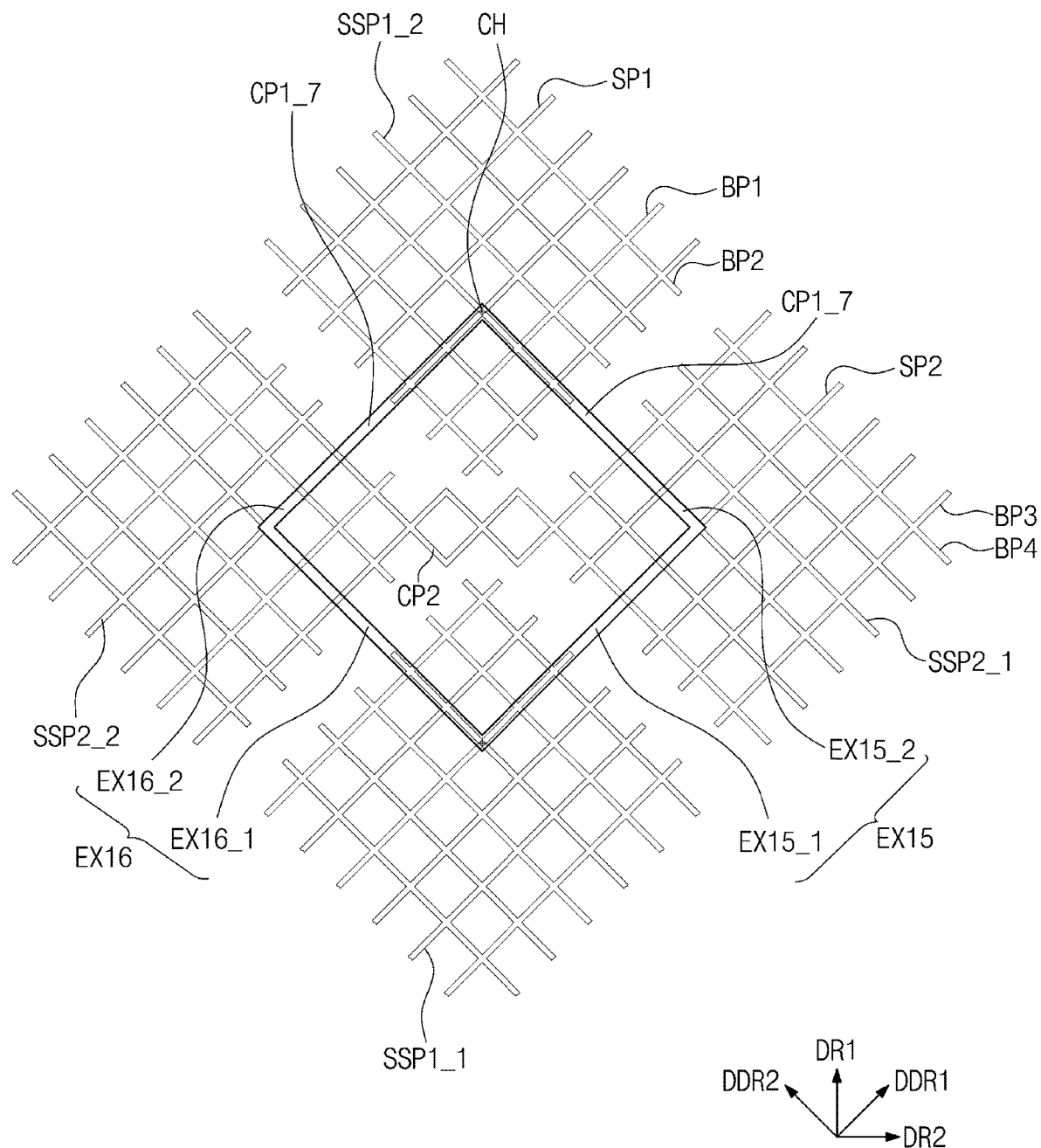

Referring to FIG. 17, a first extension part EX15 of a first connection part CP1_7 includes first and second sub-extension parts EX15_1 and EX15_2, and a second extension part EX16 of the first connection part CP1_7 includes third and fourth sub-extension parts EX16_1 and EX16_2. Each of the first to fourth sub-extension parts EX15_1, EX15_2, EX16_1, and EX16_2 has a length that is greater than that of each of the first to fourth sub-extension parts EX13_1, EX13_2, EX14_1, and EX14_2 of FIG. 16.

A first end of the first sub-extension part EX15_1 is connected to a first end of the third sub-extension part EX16_1, and a first end of the second sub-extension part EX15_2 is connected to a first end of the fourth sub-extension part EX16_2. The first end of the first sub-extension part EX15_1 and the first end of the third sub-extension part EX16_1 may share one contact hole CH and may be connected to the first sub-touch sensing part SSP1_1. The first end of the second sub-extension part EX15_2 and the first end of the fourth sub-extension part EX16_2 may share one contact hole CH and may be connected to the second sub-touch sensing part SSP1_2.

Other constituents of the first and second extension parts EX15 and EX16 may be substantially the same as those of the first and second extension part EX13 and EX14 of FIG. 16, and thus, additional descriptions with respect to the first and second extension parts EX15 and EX16 may be omitted.

Figure 18:
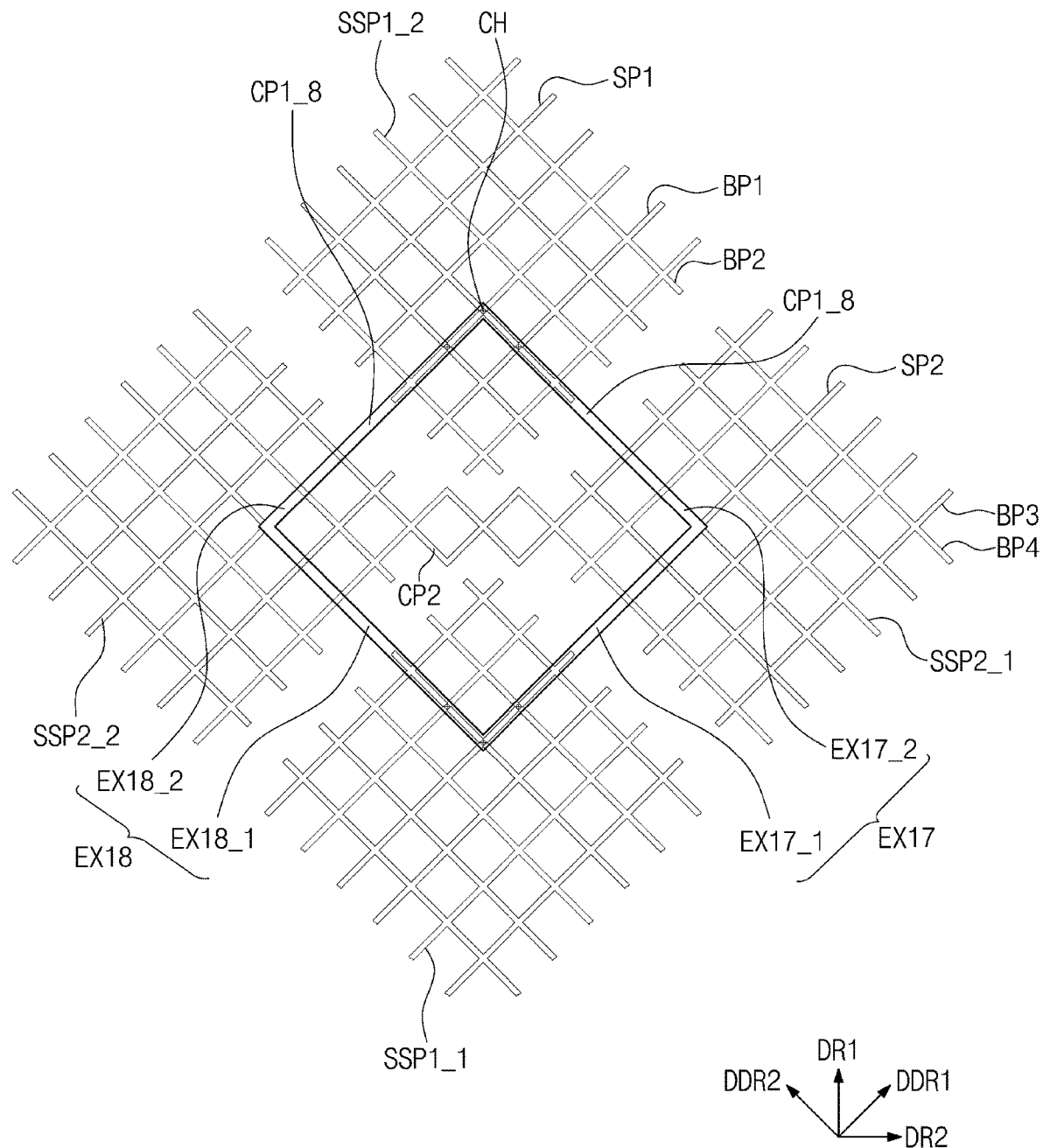

Referring to FIG. 18, a first extension part EX17 of a first connection part CP1_8 includes first and second sub-extension parts EX17_1 and EX17_2, and a second extension part EX18 of the first connection part CP1_8 includes third and fourth sub-extension parts EX18_1 and EX18_2.

The first and second extension parts EX17 and EX18 have substantially the same constitution as the first and second extension parts EX15 and EX16 of FIG. 17 except for the number of contact holes CH that are provided to connect the first and second extension parts EX17 and EX18 to the first and second sub-touch sensing parts SSP1_1 and SSP1_2.

Particularly, first ends of the first and third sub-extension parts EX17_1 and EX18_1 may share one contact hole CH and may be connected to the first sub-touch sensing part SSP1_1, and first ends of the second and fourth sub-extension parts EX17_2 and EX18_2 may share one contact hole CH and may be connected to the second sub-touch sensing part SSP1_2.

Also, an area (e.g., a predetermined area) of the first sub-extension part EX17_1 at or near the first end of the first sub-extension part EX17_1, and an area (e.g., a predetermined area) of the third sub-extension part EX18_1 at or near the first end of the third sub-extension part EX18_1 are connected to the first sub-touch sensing part SSP1_1 through the plurality of contact holes CH. For example, although two contact holes CH are illustrated, the number of contact holes CH is not limited thereto.

Also, an area (e.g., a predetermined area) of the second sub-extension part EX17_2 at or near the first end of the second sub-extension part EX17_2, and an area (e.g., a predetermined area) of the fourth sub-extension part EX18_2 at or near the first end of the fourth sub-extension part EX18_2 are connected to the second sub-touch sensing part SSP1_2 through the plurality of contact holes CH. For example, although two contact holes CH are illustrated, the number of contact holes CH is not limited thereto.

Figure 19:
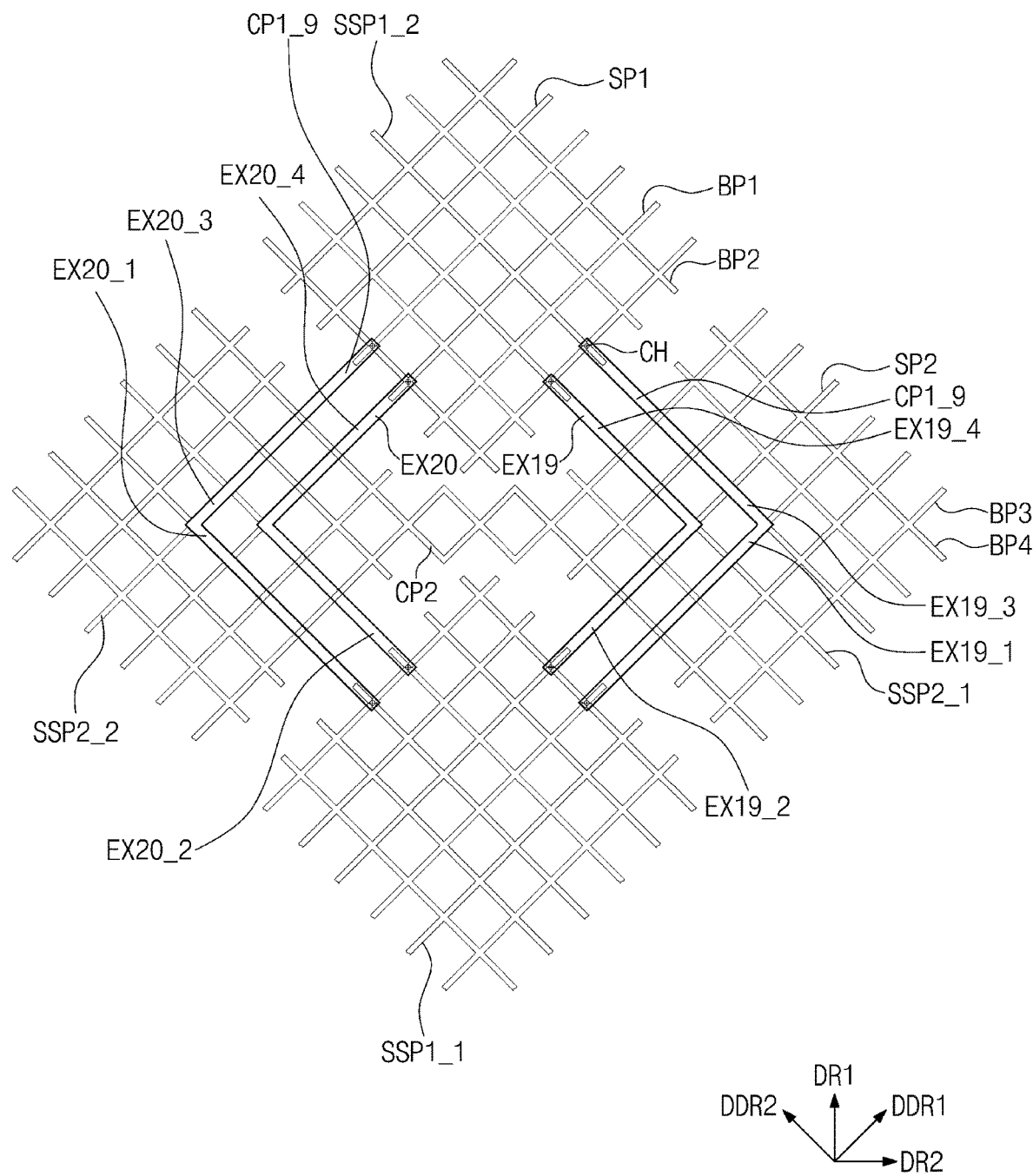

Referring to FIG. 19, a first extension part EX19 of a first connection part CP1_9 includes first, second, third, and fourth sub-extension parts EX19_1, EX19_2, EX19_3, and EX19_4, and a second extension part EX20 of the first connection part CP1_9 includes fifth, sixth, seventh, and eighth sub-extension parts EX20_1, EX20_2, EX20_3, and EX20_4.

Because the first and second extension parts EX19 and EX20 have substantially the same constitution as the first and second extension parts EX3 and EX4 of FIG. 11 except for the first to fourth sub-connection parts SCP1_1, SCP1_2, SCP2_1, and SCP2_2 of FIG. 11, additional descriptions with respect to the first and second extension parts EX19 and EX20 may be omitted.

Figure 20:
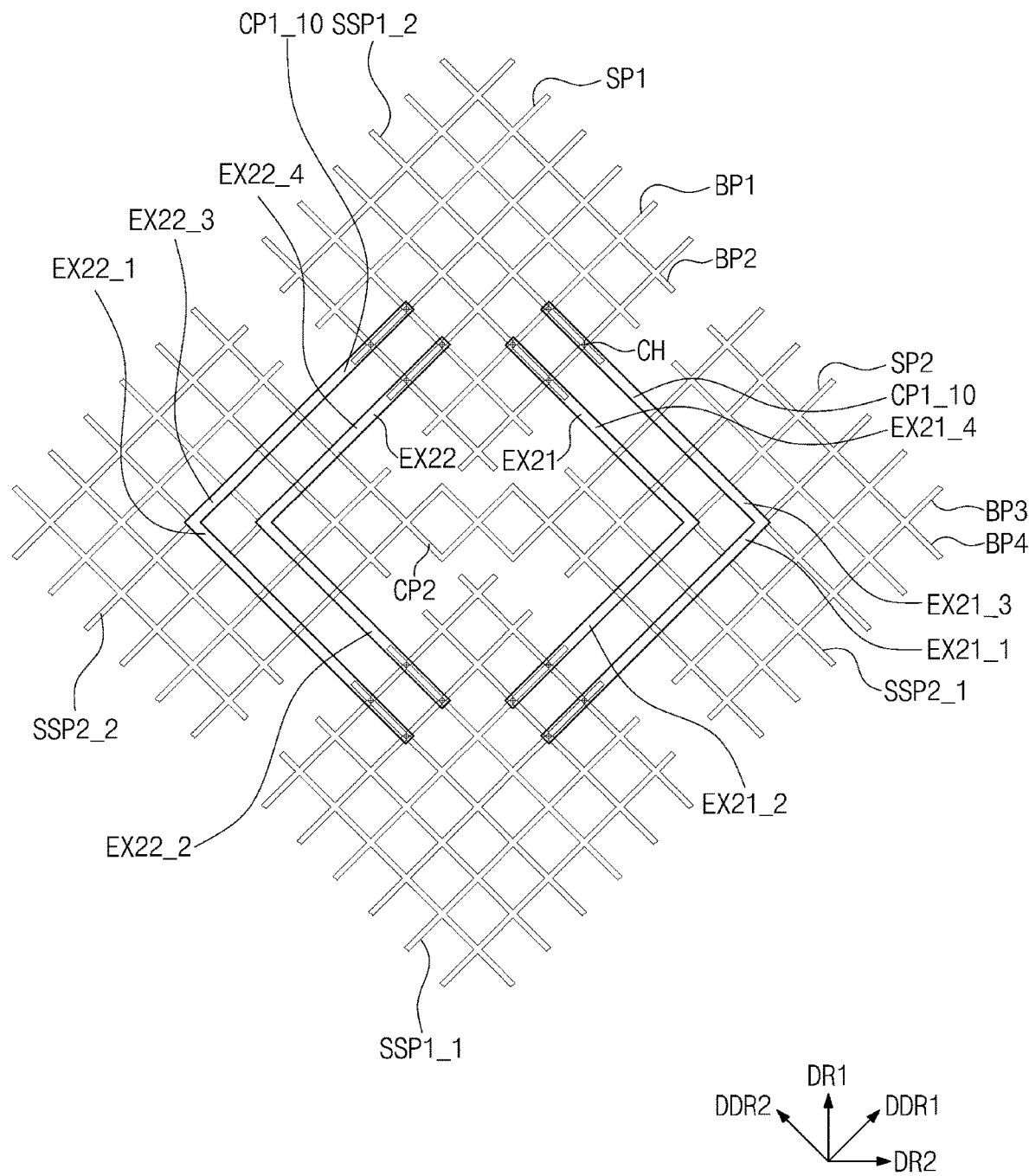

Referring to FIG. 20, a first extension part EX21 of a first connection part CP1_10 includes first, second, third, and fourth sub-extension parts EX21_1, EX21_2, EX21_3, and EX21_4, and a second extension part EX22 of the first connection part CP1_10 includes fifth, sixth, seventh, and eighth sub-extension parts EX22_1, EX22_2, EX22_3, and EX22_4.

Because the first and second extension parts EX21 and EX22 have substantially the same constitution as the first and second extension parts EX1 and EX2 of FIG. 10A except for the first to fourth sub-connection parts SCP1, SCP2, SCP3, and SCP4 of FIG. 10A, additional descriptions with respect to the first and second extension parts EX21 and EX22 may be omitted.

Figure 21:
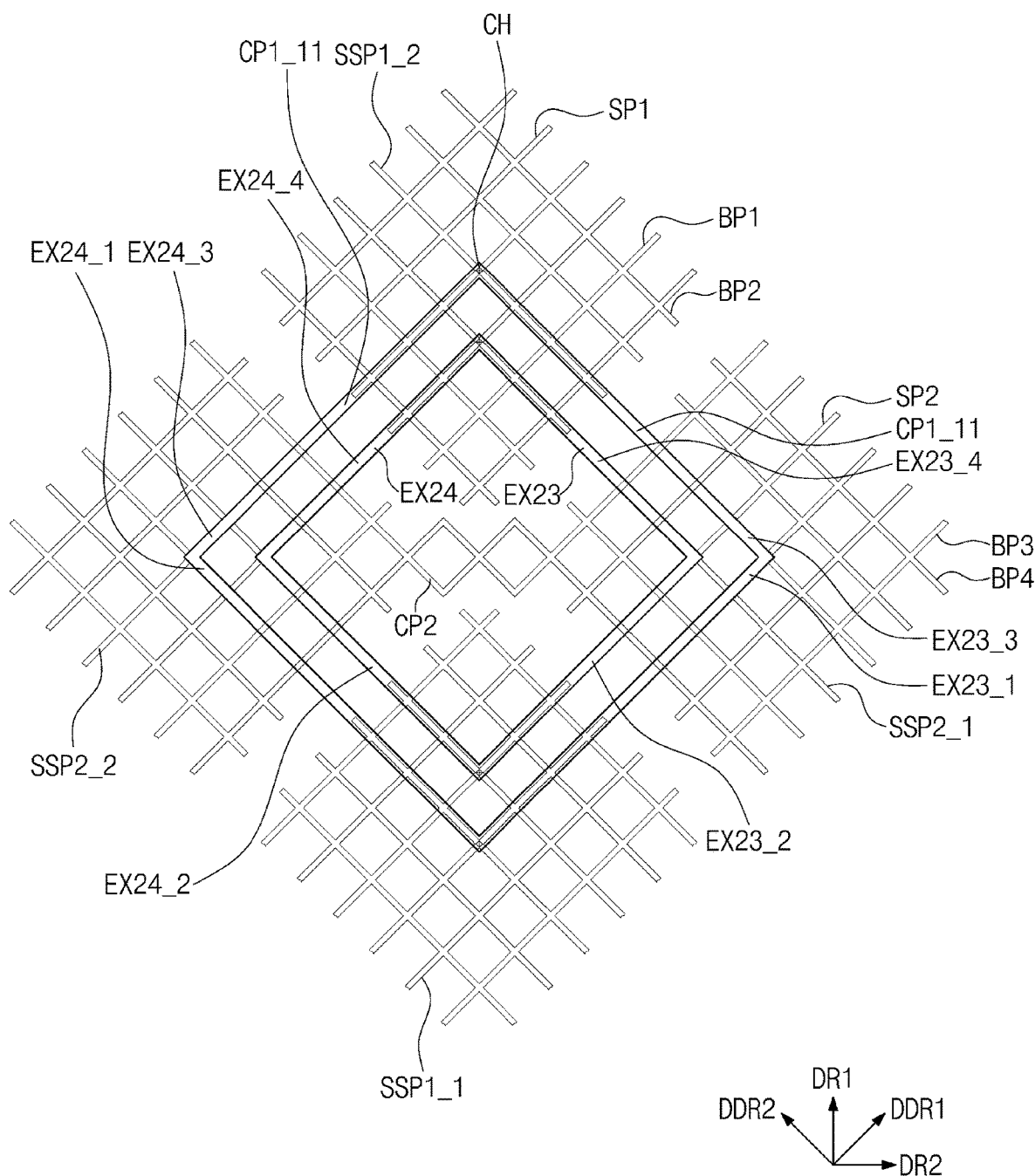

Referring to FIG. 21, a first extension part EX23 of a first connection part CP1_11 includes first, second, third, and fourth sub-extension parts EX23_1, EX23_2, EX23_3, and EX23_4, and a second extension part EX24 of the first connection part CP1_11 includes fifth, sixth, seventh, and eighth sub-extension parts EX24_1, EX24_2, EX24_3, and EX24_4.

Because the first and second extension parts EX23 and EX24 have substantially the same constitution as the first and second extension parts EX5 and EX6 of FIG. 12 except for the first to fourth sub-connection parts SCP3_1, SCP3_2, SCP4_1, and SCP4_2 of FIG. 12, additional descriptions with respect to the first and second extension parts EX23 and EX24 may be omitted.

Figure 22:
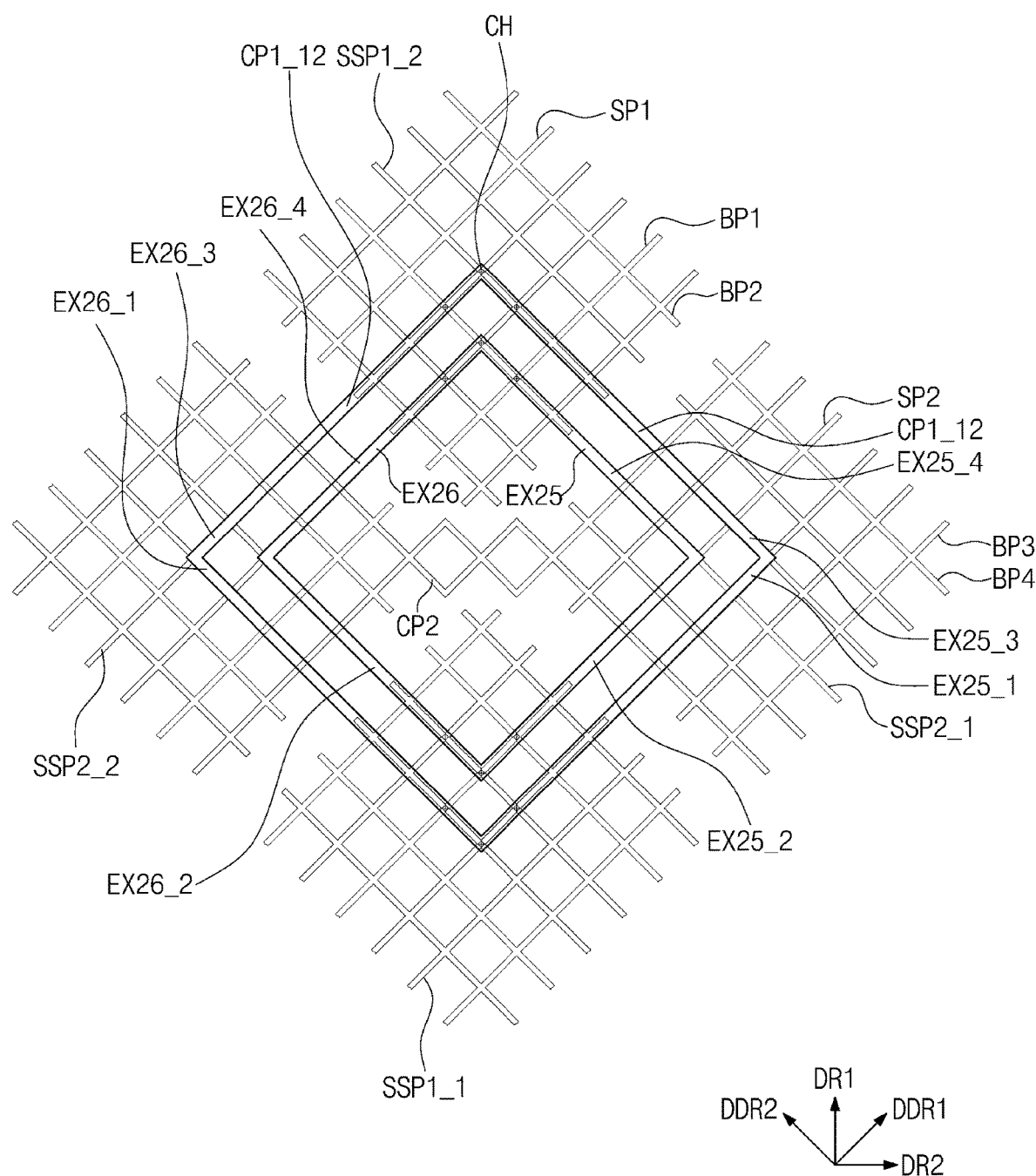

Referring to FIG. 22, a first extension part EX25 of a first connection part CP1_12 includes first, second, third, and fourth sub-extension parts EX25_1, EX25_2, EX25_3, and EX25_4, and a second extension part EX26 of the first connection part CP1_12 includes fifth, sixth, seventh, and eighth sub-extension parts EX26_1, EX26_2, EX26_3, and EX26_4.

Because the first and second extension parts EX25 and EX26 have substantially the same constitution as the first and second extension parts EX7 and EX8 of FIG. 13 except for the first to fourth sub-connection parts SCPS_1, SCPS_2, SCP6_1, and SCP6_2 of FIG. 13, additional descriptions with respect to the first and second extension parts EX25 and EX26 may be omitted.

Figure 23:
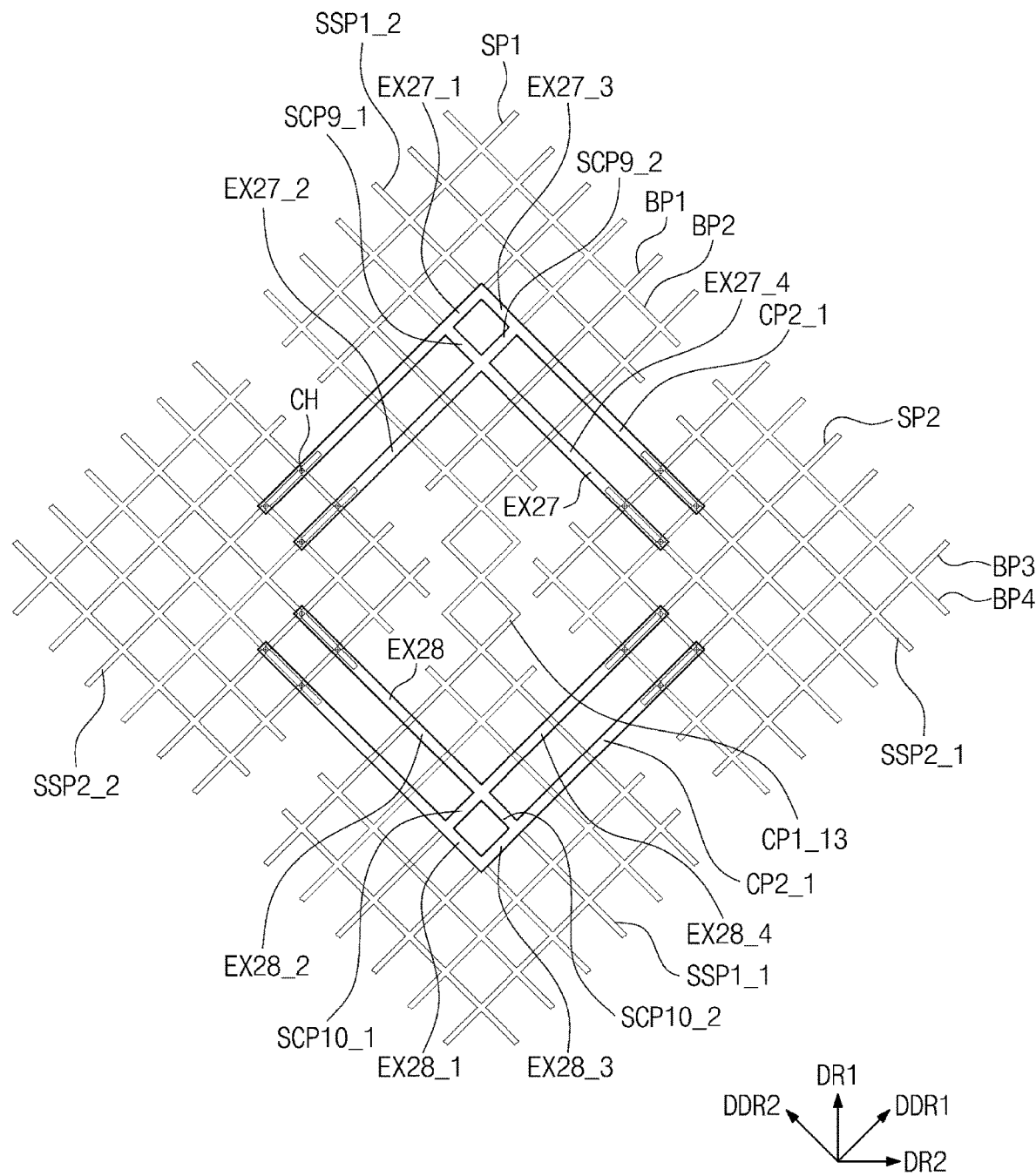

Referring to FIG. 23, a first connection part CP1_13 has a mesh structure that is equal to (or the same as) that of the second connection part CP2 of FIG. 10A and that connects the first touch sensing parts SP1 to each other. A second connection part CP2_1 has substantially the same constitution as the first connection part CP1 of FIG. 10A and connects the second touch sensing parts SP2 to each other.

For example, the second connection part CP2_1 may be equal to (or the same as) a configuration in which the first connection part CP1 of FIG. 10A rotates by about 90 degrees and also may extend to cross the first touch sensing parts SP1 and be connected to the second touch sensing parts SP2. A constitution (or configuration) in which the second connection part CP2_1 crosses the first touch sensing parts SP1 is substantially the same as that in which the first connection part CP1 of FIG. 10A crosses the second touch sensing parts SP2. Thus, additional descriptions with respect to the first and second connection parts CP1_13 and CP2_1 and the first and second touch sensing parts SP1 and SP2 may be omitted.

Figure 24:
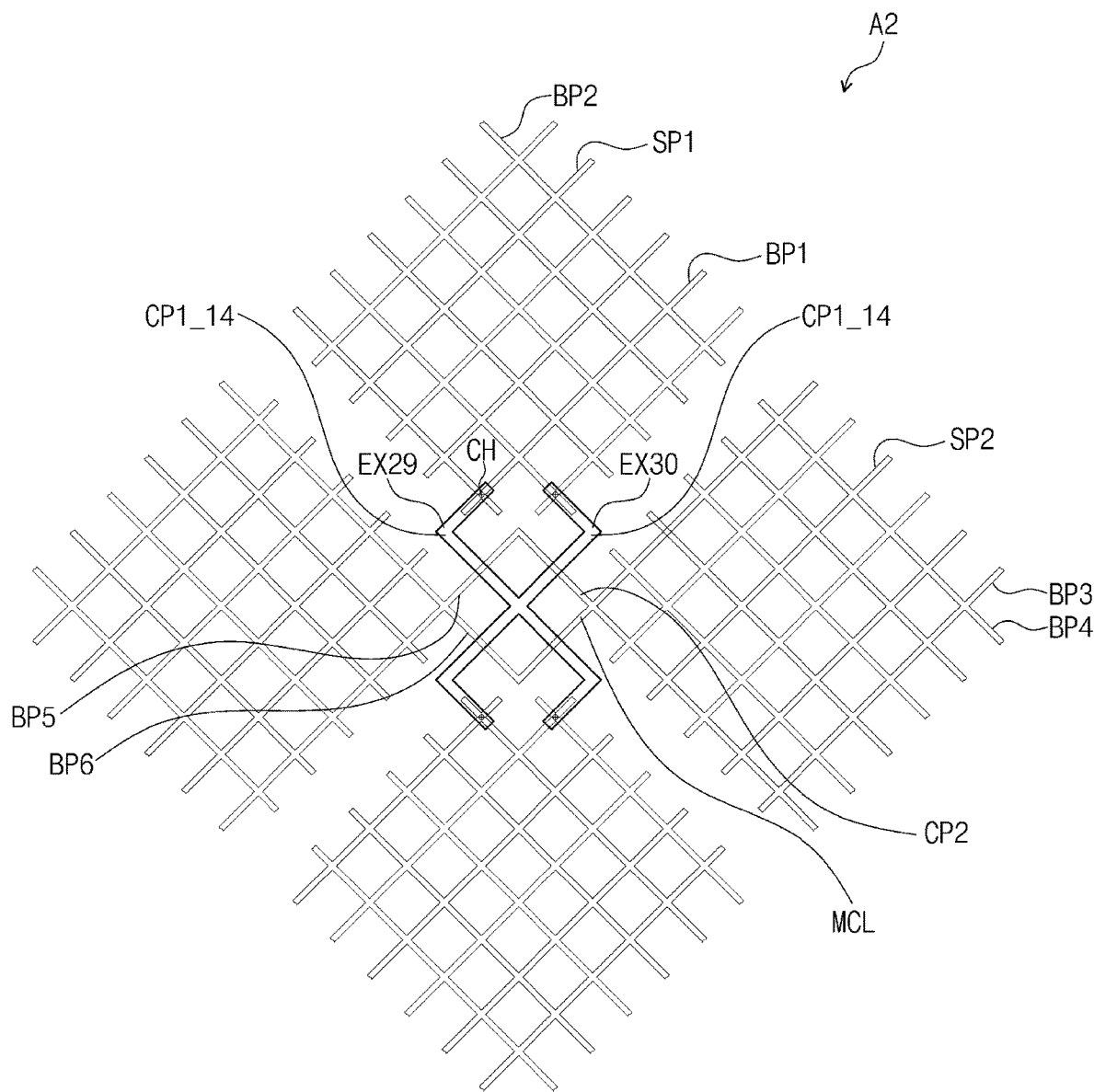

Referring to FIG. 24, a first connection part CP1_14 connects adjacent first touch sensing parts SP1 to each other in (or along) the first direction DR1. A second connection part CP2 connects adjacent second touch sensing parts SP2 to each other in (or along) the second direction DR2.

The first connection part CP1_14 may be bent at least one time to extend from one of the first and second diagonal directions DDR1 and DDR2 to the other of the second and first diagonal directions DDR2 and DDR1. The first connection part CP1_14 includes first and second extension parts EX29 and EX30, which are symmetrical (or substantially symmetrical) to each other. Each of the first and second extension parts EX29 and EX30 may bent at least one time to extend from one of the first and second diagonal directions DDR1 and DDR2 to the other of the second and first diagonal directions DDR2 and DDR1.

For example, the first extension part EX29 may be bent to extend from the first diagonal direction DDR1 to the second diagonal direction DDR2 and from the second diagonal direction DDR2 to the first diagonal direction DDR1. The second extension part EX30 may be bent to extend from the second diagonal direction DDR2 to the first diagonal direction DDR1 to and from the first diagonal direction DDR1 to the second diagonal direction DDR2.

In an embodiment of the inventive concept, each of the first and second extension parts EX29 and EX30 may be bent to extend at least three times from the first and second diagonal directions DDR1 and DDR2 to the second and first diagonal directions DDR2 and DDR1. However, embodiments of the present disclosure are not limited thereto. For example, each of the first and second extension parts EX29 and EX30 may be bent to extend at least one time. A central portion of the first extension part EX29 and a central portion of the second extension part EX30 may be formed as bent portions and may be connected to each other.

The second connection part CP2 includes a mesh line MCL having a diamond shape (or a parallelogram shape). The mesh line MCL includes a plurality of fifth branch parts BP5 extending in (or along) the first diagonal direction DDR1 and a plurality of sixth branch parts BP6 extending in (or along) the second diagonal direction DDR2. The fifth and sixth branch parts BP5 and BP6 may be connected to each other to form a diamond shape (or a parallelogram shape). For example, although the mesh line MCL having one diamond (or parallelogram) shape is illustrated in FIG. 24, the number of diamond (or parallelogram) shapes is not limited thereto. When a plurality of diamond (or parallelogram) shapes is provided, the mesh lines MCL may have the mesh shape.

The first and second extension parts EX29 and EX30 of the first connection part CP1_14 are insulated from the second connection part CP2 by the first touch insulation layer TS-IL1 and extend to cross the mesh lines MCL of the second connection part CP2. For example, the first connection part CP1_14 may not line-overlap the second connection part CP2, but may point-overlap the second connection part CP2. Thus, the parasitic capacitance may be reduced, and a short-circuit between the first and second connection parts CP1_14 and CP2 (e.g., during a manufacturing process) may be prevented, or the likelihood thereof may be reduced.

According to embodiments of the inventive concept, the first connection part of the touch sensing unit may extend to point overlap the second touch sensing parts that are adjacent to each other without line overlapping the second connection part, thereby connecting the first touch sensing parts to each other. Thus, the parasitic capacitance of the touch sensing unit may be reduced, and a short-circuit between the first and second connection parts (e.g., during the manufacturing process) may be prevented (or the likelihood thereof may be reduced), thereby improving reliability of the display apparatus.

It will be apparent to those skilled in the art that various modifications and variations can be made in the inventive concept. Thus, it is intended that the present disclosure covers the modifications and variations of this invention provided they come within the scope of the appended claims and their equivalents. Thus, to the maximum extent allowed by law, the scope of the present invention is to be determined by the broadest permissible interpretation of the following claims and their equivalents, and shall not be restricted or limited by the foregoing detailed description.

What is claimed is:
1. A display apparatus comprising:
a display panel; and
a touch sensing unit on the display panel, the touch sensing unit comprising:

a plurality of first touch sensing parts arranged with each other along a first direction and having a mesh shape;
a first connection part configured to connect adjacent ones of the first touch sensing parts to each other along the first direction;
a plurality of second touch sensing parts arranged with each other along a second direction crossing the first direction and having the mesh shape; and
a second connection part configured to connect adjacent ones of the second touch sensing parts to each other along the second direction,
wherein the first connection part extends toward portions of the adjacent ones of the second touch sensing parts,
wherein the first connection part comprises a plurality of extension parts respectively overlapping the adjacent ones of the second touch sensing parts, each of the extension parts comprising a plurality of sub-extension parts extending parallel to each other,
wherein the plurality of extension parts comprises a first extension part,
wherein the plurality of sub-extension parts of the first extension part comprises a first sub-extension part and a second sub-extension part extending parallel to each other,
wherein the first sub-extension part overlaps at least a portion of a first sub-touch sensing part from among the adjacent ones of the first touch sensing parts and overlaps at least a portion of a third sub-touch sensing part from among the adjacent ones of the second touch sensing parts, and
wherein the second sub-extension part overlaps at least a portion of the first sub-touch sensing part and overlaps at least a portion of the third sub-touch sensing part.

2. The display apparatus of claim 1, wherein the first connection part does not overlap the second connection part.

3. The display apparatus of claim 1, further comprising an insulation layer on the first connection part, and
wherein the plurality of first touch sensing parts, the plurality of second touch sensing parts, and the second connection part are on the insulation layer.

4. The display apparatus of claim 3,
wherein the adjacent ones of the second touch sensing parts comprise:
the third sub-touch sensing part; and
a fourth sub-touch sensing part,
wherein the first extension part crosses the third sub-touch sensing part to connect the adjacent ones of the first touch sensing parts to each other,
wherein the plurality of extension parts further comprises a second extension part having a structure that is substantially symmetrical to the first extension part and crossing the fourth sub-touch sensing part to connect the adjacent ones of the first touch sensing parts to each other, and
wherein the second connection part is located between the first extension part and the second extension part.

5. The display apparatus of claim 4, wherein the adjacent ones of the first touch sensing parts comprise:
the first sub-touch sensing part; and
a second sub-touch sensing part with the first sub-touch sensing part on a plane that is parallel to the first and second directions.

6. The display apparatus of claim 5, wherein the second connection part has a mesh structure and connects the third sub-touch sensing part to the fourth sub-touch sensing part.

7. The display apparatus of claim 5, wherein an area of the first extension part near a first end of the first extension part is connected to the first sub-touch sensing part,
wherein an area of the first extension part near a second end opposite to the first end of the first extension part is connected to the second sub-touch sensing part, and
wherein the first extension part extends to cross the third sub-touch sensing part.

8. The display apparatus of claim 5, wherein an area of the second extension part near a first end of the second extension part is connected to the first sub-touch sensing part,
wherein an area of the second extension part near a second end opposite to the first end of the second extension part is connected to the second sub-touch sensing part, and
wherein the second extension part extends to cross the fourth sub-touch sensing part.

9. The display apparatus of claim 5, wherein each of the first and second sub-touch sensing parts comprises:
a plurality of first branch parts extending in a first diagonal direction crossing the first and second directions on the plane; and
a plurality of second branch parts extending in a second diagonal direction crossing the first diagonal direction on the plane to cross the first branch parts, the second branch parts being connected to the first branch parts, and
wherein each of the third and fourth sub-touch sensing parts comprises:
a plurality of third branch parts extending in the first diagonal direction; and
a plurality of fourth branch parts extending in the second diagonal direction to cross the third branch parts, the fourth branch parts being connected to the third branch parts.

10. The display apparatus of claim 9,
wherein the first sub-extension part extends in the first diagonal direction,
wherein the second sub-extension part extends in the first diagonal direction, the second sub-extension part having a length that is less than a length of the first sub-extension part,
wherein the first extension part further comprises:
a third sub-extension part extending in the second diagonal direction;
a fourth sub-extension part extending in the second diagonal direction, the fourth sub-extension part having a length that is less than a length of the third sub-extension part;
a first sub-connection part extending in the second diagonal direction; and
a second sub-connection part extending in the first diagonal direction,
wherein an area of the first sub-extension part near a first end of the first sub-extension part and an area of the second sub-extension part near a first end of the second sub-extension part are connected to the first sub-touch sensing part,
wherein an area of the third sub-extension part near a first end of the third sub-extension part and an area of the fourth sub-extension part near a first end of the fourth sub-extension part are connected to the second sub-touch sensing part,
wherein a second end of the first sub-extension part opposite to the first end of the first sub-extension part is connected a second end of the third sub-extension part opposite to the first end of the third sub-extension part, wherein a second end of the second sub-extension part opposite to the first end of the second sub-extension part is connected to a second end of the fourth sub-extension part opposite to the first end of the fourth sub-extension part, wherein the first sub-connection part extends from the second end of the fourth sub-extension part in the second diagonal direction and is connected to the first sub-extension part, and wherein the second sub-connection part extends from the second end of the second sub-extension part in the first diagonal direction and is connected to the third sub-extension part.

11. The display apparatus of claim 10, wherein the first to fourth sub-extension parts and the first and second sub-connection parts are integrated with each other.

12. The display apparatus of claim 10, wherein the first and second sub-extension parts extend to cross ones of the fourth branch parts from among the plurality of fourth branch parts of the third sub-touch sensing part, and wherein the third and fourth sub-extension parts extend to cross ones of the third branch parts from among the plurality of third branch parts of the third sub-touch sensing part.

13. The display apparatus of claim 10, wherein the third branch parts of the third sub-touch sensing part do not overlap the first and second sub-extension parts and the second sub-connection part, wherein the fourth branch parts of the third sub-touch sensing part do not overlap the third and fourth sub-extension parts and the first sub-connection part, and wherein the fourth sub-touch sensing part has a structure that is substantially symmetrical to a structure of the third sub-touch sensing part.

14. The display apparatus of claim 10, wherein the plurality of sub-extension parts of the second extension part comprises a fifth sub-extension part, a sixth sub-extension part, a seventh sub-extension part, and an eighth sub-extension part, and wherein the second extension part further comprises a third sub-connection part and a fourth sub-connection part, which respectively have structures that are respectively symmetrical to the first sub-extension part, the second sub-extension part, the third sub-extension part, the fourth sub-extension part, the first sub-connection part, and the second sub-connection part.

15. The display apparatus of claim 14, wherein an area of each of the first to eighth sub-extension parts near respective first ends of the first to eighth sub-extension parts is respectively connected to one of the first sub-touch sensing part or the second sub-touch sensing part through a plurality of contact holes defined in the insulation layer.

16. The display apparatus of claim 14, wherein an area of each of the first to eighth sub-extension parts near respective first ends of the first to eighth sub-extension parts is respectively connected to one of the first sub-touch sensing part or the second sub-touch sensing part through one contact hole defined in the insulation layer.

17. The display apparatus of claim 14, wherein the first end of the first sub-extension part is connected to a first end of the fifth sub-extension part, the first end of the second sub-extension part is connected to a first end of the sixth sub-extension part, the first end of the third sub-extension part is connected to a first end of the seventh sub-extension part, and the first end of the fourth sub-extension part is connected to a first end of the eighth sub-extension part, wherein the first ends of the first and fifth sub-extension parts share one contact hole defined in the insulation layer and are connected to the first sub-touch sensing part, wherein the first ends of the second and sixth sub-extension parts share one contact hole defined in the insulation layer and are connected to the first sub-touch sensing part, wherein the first ends of the third and seventh sub-extension parts share one contact hole defined in the insulation layer and are connected to the second sub-touch sensing part, and wherein the first ends of the fourth and eighth sub-extension parts share one contact hole defined in the insulation layer and are connected to the second sub-touch sensing part.

18. The display apparatus of claim 17, wherein the area of the first sub-extension part near the first end of the first sub-extension part, the area of the second sub-extension part near the first end of the second sub-extension part, an area of the fifth sub-extension part near the first end of the fifth sub-extension part, and an area of the sixth sub-extension part near the first end of the sixth sub-extension part are connected to the first sub-touch sensing part through a plurality of contact holes defined in the insulation layer, and wherein the area of the third sub-extension part near the first end of the third extension part, the area of the fourth sub-extension part near the first end of the fourth extension part, an area of the seventh sub-extension part near the first end of the seventh sub-extension part, and an area of the eighth sub-extension part near the first end of the eighth sub-extension part are connected to the second sub-touch sensing part through a plurality of contact holes defined in the insulation layer.

19. The display apparatus of claim 10, wherein the display panel comprises a non-bent area and a bent area that is adjacent to the non-bent area, wherein the first connection part is located in the bent area and comprises a plurality of protrusions, which respectively protrude from a connection portion between the first sub-extension part and the third sub-extension part in each of the first and second diagonal directions, from the first sub-connection part in the second diagonal direction to protrude further outwardly than the first sub-extension part, and from the second sub-connection part in the first diagonal direction to protrude further outwardly than the third sub-extension part, and wherein the protrusions overlap adjacent third and fourth branch parts.

20. A display apparatus comprising:
a display panel;
a touch sensing unit on the display panel, the touch sensing unit comprising:
a plurality of first touch sensing parts arranged with each other along a first direction and having a mesh shape;
a first connection part configured to connect adjacent ones of the first touch sensing parts to each other along the first direction;
a plurality of second touch sensing parts arranged with each other along a second direction crossing the first direction and having the mesh shape; and
a second connection part configured to connect adjacent ones of the second touch sensing parts to each other along the second direction; and an insulation layer on the first connection part,
wherein the first connection part extends toward portions of the adjacent ones of the second touch sensing parts,
wherein the first connection part comprises a plurality of extension parts respectively overlapping the adjacent ones of the second touch sensing parts,
wherein the plurality of first touch sensing parts, the plurality of second touch sensing parts, and the second connection part are on the insulation layer,
wherein the adjacent ones of the second touch sensing parts comprise:
 a third sub-touch sensing part; and
 a fourth sub-touch sensing part,
wherein the adjacent ones of the first touch sensing parts comprise:
 a first sub-touch sensing part; and
 a second sub-touch sensing part with the first sub-touch sensing part on a plane that is parallel to the first and second directions,
wherein the extension parts comprise:
 a first extension part crossing the third sub-touch sensing part to connect the adjacent ones of the first touch sensing parts to each other; and
 a second extension part having a structure that is substantially symmetrical to the first extension part and crossing the fourth sub-touch sensing part to connect the adjacent ones of the first touch sensing parts to each other, and
wherein the second connection part is located between the first extension part and the second extension part,
wherein the first extension part comprises:
 a first sub-extension part extending in a first diagonal direction crossing the first and second directions on the plane; and
a second sub-extension part extending in a second diagonal direction crossing the first diagonal direction on the plane,
wherein the second extension part comprises a third sub-extension part and a fourth sub-extension part, each of which has a structure substantially symmetrical to a structure of the first sub-extension part and the second sub-extension part, respectively,
wherein an area of the first sub-extension part near a first end of the first sub-extension part and an area of the third sub-extension part near a first end of the third sub-extension part are connected to the first sub-touch sensing part,
wherein an area of the second sub-extension part near a first end of the second sub-extension part and an area of the fourth sub-extension part near a first end of the fourth sub-extension part are connected to the second sub-touch sensing part,
wherein a second end of the first sub-extension part opposite to the first end of the first sub-extension part is connected to a second end of the second sub-extension part opposite to the first end of the second sub-extension part, and
wherein a second end of the third sub-extension part opposite to the first end of the third sub-extension part is connected to a second end of the fourth sub-extension part opposite to the first end of the fourth sub-extension part.

21. The display apparatus of claim 20, wherein the areas of each of the first to eighth sub-extension parts are respectively connected to one of the first sub-touch sensing part or the second sub-touch sensing part through one contact hole defined in the insulation layer.

22. The display apparatus of claim 20, wherein the areas of each of the first to eighth sub-extension parts are respectively connected to one of the first sub-touch sensing part or the second sub-touch sensing part through a plurality of contact holes defined in the insulation layer.

23. The display apparatus of claim 20, wherein the first end of the first sub-extension part is connected to the first end of the third sub-extension part,
wherein the first end of the second sub-extension part is connected to the first end of the fourth sub-extension part,
wherein the first end of the first and third sub-extension parts share one contact hole defined in the insulation layer and are connected to the first sub-touch sensing part, and
wherein the first ends of the second and fourth sub-extension parts share one contact hole defined in the insulation layer and are connected to the second sub-touch sensing part.

24. The display apparatus of claim 23, wherein the area of the first sub-extension part and the area of the third sub-extension part are connected to the first sub-touch sensing part through a plurality of contact holes defined in the insulation layer, and
wherein the area of the second sub-extension part and the area of the fourth sub-extension part are connected to the second sub-touch sensing part through a plurality of contact holes defined in the insulation layer.

25. The display apparatus of claim 5,
wherein the first sub-extension part extends in a first diagonal direction crossing the first and second directions on the plane,
wherein the second sub-extension part has a length that is less than a length of the first sub-extension part and extending in the first diagonal direction,
wherein the plurality of sub-extension parts of the first extension parts further comprises:
 a third sub-extension part extending in a second diagonal direction crossing the first diagonal direction on the plane; and
 a fourth sub-extension part having a length that is less than a length of the third sub-extension part and extending in the second diagonal direction,
wherein the second extension part comprises fifth, sixth, seventh, and eighth sub-extension parts, which respectively have structures that are substantially symmetrical to the first, second, third, and fourth sub-extension parts,
wherein an area of each of the first, second, fifth, and sixth sub-extension parts near respective first ends of each of the first, second, fifth, and sixth sub-extension parts is respectively connected to the first sub-touch sensing part,
wherein an area of each of the third, fourth, seventh, and eighth sub-extension parts near respective first ends of each of the third, fourth, seventh, and eighth sub-extension parts is respectively connected to the second sub-touch sensing part,
wherein a second end of the first sub-extension part opposite to the first end of the first sub-extension part is connected to a second end of the third sub-extension part opposite to the first end of the third sub-extension part,
wherein a second end of the second sub-extension part opposite to the first end of the second sub-extension part is connected to a second end of fourth sub-extension part opposite to the first end of the fourth sub-extension part, wherein a second end of the fifth sub-extension part opposite to the first end of the fifth sub-extension part is connected to a second end of the seventh sub-extension part opposite to the first end of the seventh sub-extension part, and wherein a second end of the sixth sub-extension part opposite to the first end of the sixth sub-extension part is connected to a second end of the eighth sub-extension part opposite to the first end of the eighth sub-extension part.

26. The display apparatus of claim 25, wherein the areas of each of the first to eighth sub-extension parts are respectively connected to one of the first sub-touch sensing part or the second sub-touch sensing part through one contact hole defined in the insulation layer.

27. The display apparatus of claim 25, wherein the areas of each of the first to eighth sub-extension parts are respectively connected to one of the first sub-touch sensing part or the second sub-touch sensing part through a plurality of contact holes defined in the insulation layer.

28. The display apparatus of claim 25, wherein the first end of the first sub-extension part is connected to the first end of the fifth sub-extension part, the first end of the second sub-extension part is connected to the first end of the sixth sub-extension part, the first end of the third sub-extension part is connected to the first end of the seventh sub-extension part, and the first end of the fourth sub-extension part is connected to the first end of the eighth sub-extension part, wherein the first ends of the first and fifth sub-extension parts share one contact hole defined in the insulation layer and are connected to the first sub-touch sensing part, and the first ends of the second and sixth sub-extension parts share one contact hole defined in the insulation layer and are connected to the first sub-touch sensing part, and wherein the first ends of the third and seventh sub-extension parts share one contact hole defined in the insulation layer and are connected to the second sub-touch sensing part, and the first ends of the fourth and eighth sub-extension parts share one contact hole defined in the insulation layer and are connected to the second sub-touch sensing part.

29. The display apparatus of claim 28, wherein the area of the first sub-extension part, the area of the second sub-extension part, the area of the fifth sub-extension part, and the area of the sixth sub-extension part, are respectively connected to the first sub-touch sensing part through a plurality of contact holes defined in the insulation layer, and wherein the area of the third sub-extension part, the area of the fourth sub-extension part, the area of the seventh sub-extension part, and the area of the eighth sub-extension part are respectively connected to the second sub-touch sensing part through a plurality of control holes defined in the insulation layer.

30. The display apparatus of claim 1, wherein the display panel comprises:

a plurality of pixel areas each of the pixel areas having a parallelogram shape; and a non-pixel area between the pixel areas, wherein the pixel areas have sizes that are different from each other according to colors to be displayed, and wherein the first and second touch sensing parts having the mesh shape overlap the non-pixel area.

* * * * *